(12) United States Patent
Haraguchi et al.

(10) Patent No.: US 7,272,647 B2
(45) Date of Patent: Sep. 18, 2007

(54) PRINT SYSTEM BY MOBILE TERMINAL, AND NETWORK SYSTEM USING MOBILE TERMINAL

(75) Inventors: Tatsuya Haraguchi, Yokohama (JP); Kazuhiro Ogura, Kawasaki (JP); Akinori Iwase, Yokosuka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 995 days.

(21) Appl. No.: 09/956,196

(22) Filed: Sep. 20, 2001

(65) Prior Publication Data

US 2002/0122201 A1 Sep. 5, 2002

(30) Foreign Application Priority Data

Mar. 5, 2001 (JP) .............................. 2001-060768

(51) Int. Cl.
*G06F 15/173* (2006.01)

(52) U.S. Cl. ...................... 709/224; 709/203; 709/219; 358/1.14; 358/1.15

(58) Field of Classification Search ................ 709/203, 709/217, 219; 358/1.14–1.15
See application file for complete search history.

(56) References Cited

U.S. PATENT DOCUMENTS

| | | | |
|---|---|---|---|
| 6,160,631 A * | 12/2000 | Okimoto et al. ........... 358/1.15 |
| 6,208,427 B1 * | 3/2001 | Lee ........................... 358/1.15 |
| 6,369,909 B1 * | 4/2002 | Shima ....................... 358/1.15 |
| 6,628,430 B1 * | 9/2003 | Silverbrook et al. ........ 358/473 |
| 6,738,841 B1 * | 5/2004 | Wolff ......................... 710/62 |
| 6,741,871 B1 * | 5/2004 | Silverbrook et al. ........ 455/557 |
| 6,744,528 B2 * | 6/2004 | Picoult et al. .............. 358/1.15 |
| 6,862,597 B2 * | 3/2005 | Ogaki et al. .................. 707/10 |
| 6,909,518 B2 * | 6/2005 | Miller et al. ............... 358/1.13 |
| 6,922,258 B2 * | 7/2005 | Pineau ....................... 358/1.15 |
| 6,947,995 B2 * | 9/2005 | Chang et al. ................. 709/231 |
| 7,006,242 B2 * | 2/2006 | Smith et al. ................ 358/1.15 |
| 7,016,062 B2 * | 3/2006 | Ishizuka ..................... 358/1.15 |
| 2002/0113994 A1 * | 8/2002 | Smith et al. ................ 358/1.15 |
| 2003/0038963 A1 * | 2/2003 | Yamaguchi ................. 358/1.15 |
| 2004/0001217 A1 * | 1/2004 | Wu ........................... 358/1.15 |

FOREIGN PATENT DOCUMENTS

| | | |
|---|---|---|
| JP | 9-231022 A | 9/1997 |
| JP | 11-73295 A | 3/1999 |
| JP | 11-146118 | 5/1999 |
| JP | 11-355498 A | 12/1999 |

OTHER PUBLICATIONS

"Speedup the Combination of Mobile and Network", Nikkei Sangyo Shinbun [Japanese Newspaper], 1 page, (Mar. 30, 2001).

* cited by examiner

*Primary Examiner*—Ario Etienne
*Assistant Examiner*—LaShonda Jacobs
(74) *Attorney, Agent, or Firm*—Foley & Lardner LLP

(57) ABSTRACT

There is disclosed a print system in which BD acquires a printing ID (hereinafter referred to as the PID) issued by PODS through CS, BD transmits PID to PC, PC receives printing data from PCDB via PODS, and the data is printed through PD.

8 Claims, 50 Drawing Sheets

| Map ID | Printing data |
|---|---|
| ⋮ | ⋮ |
| 1022 | map/kanagawa/kawasaki/16 |
| 1023 | map/kanagawa/kawasaki/17 |
| 1024 | map/kanagawa/kawasaki/18 |
| ⋮ | ⋮ |

FIG. 6

| PID | Printing data | User |
|---|---|---|
| ⋮ | | |
| 290165 | 20010213/1204/xxxx.pdf | 090△△△xxxx@~ |
| 290166 | 20000909/4286/xxxxx.doc | 090◎◎◎◎□□□@~ |
| 290167 | 20010213/1205/xxxxxx.gif | 09012345678@abc.xyz |
| ⋮ | | |

FIG. 7

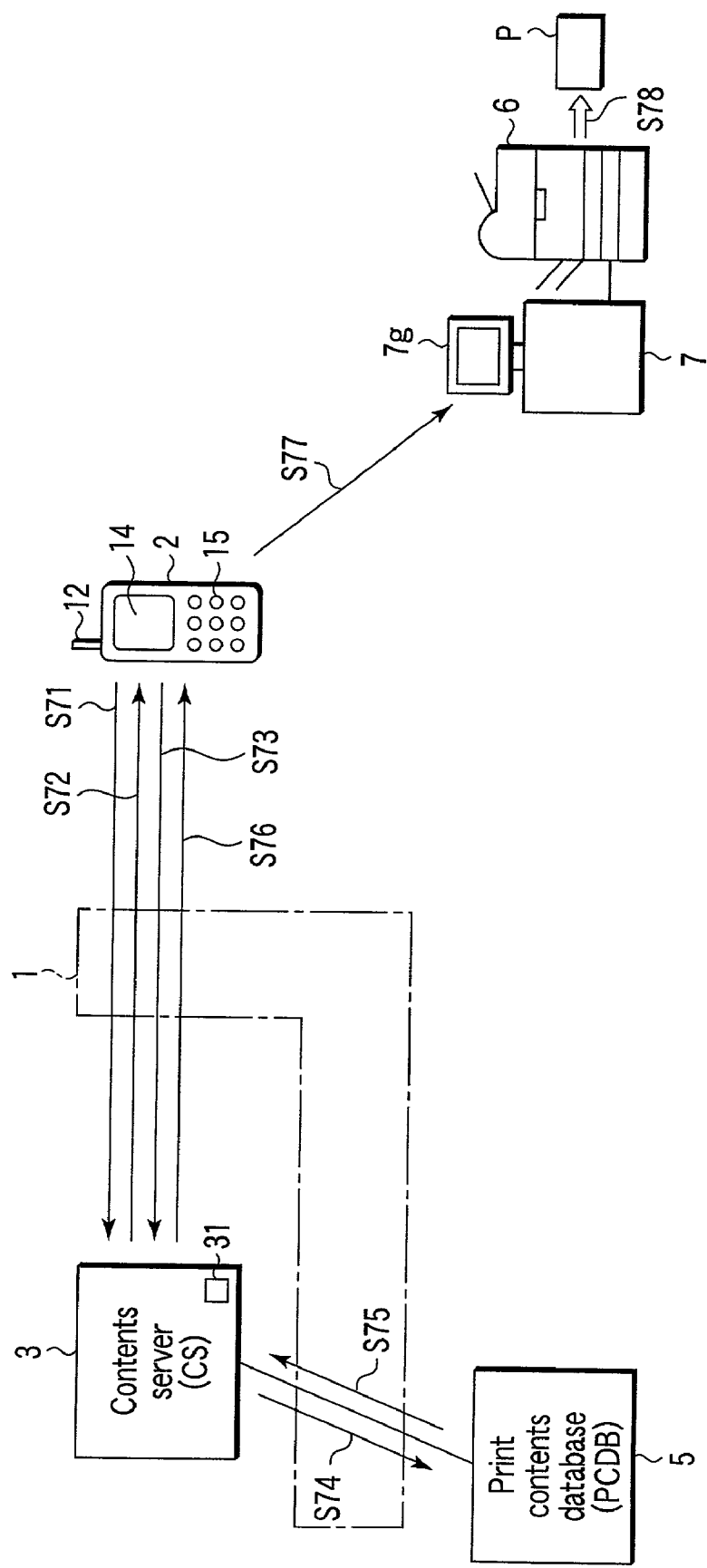
F I G. 19

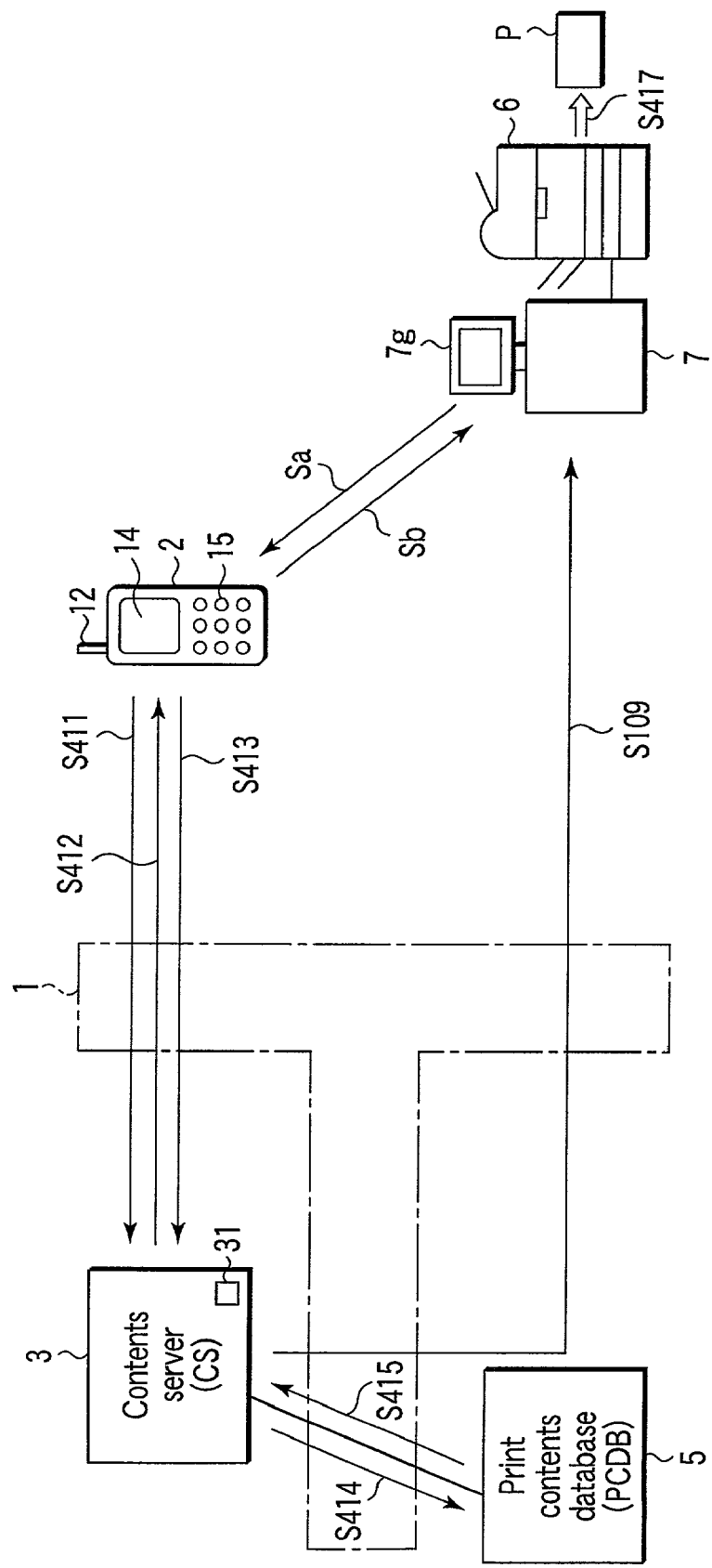
F I G. 23

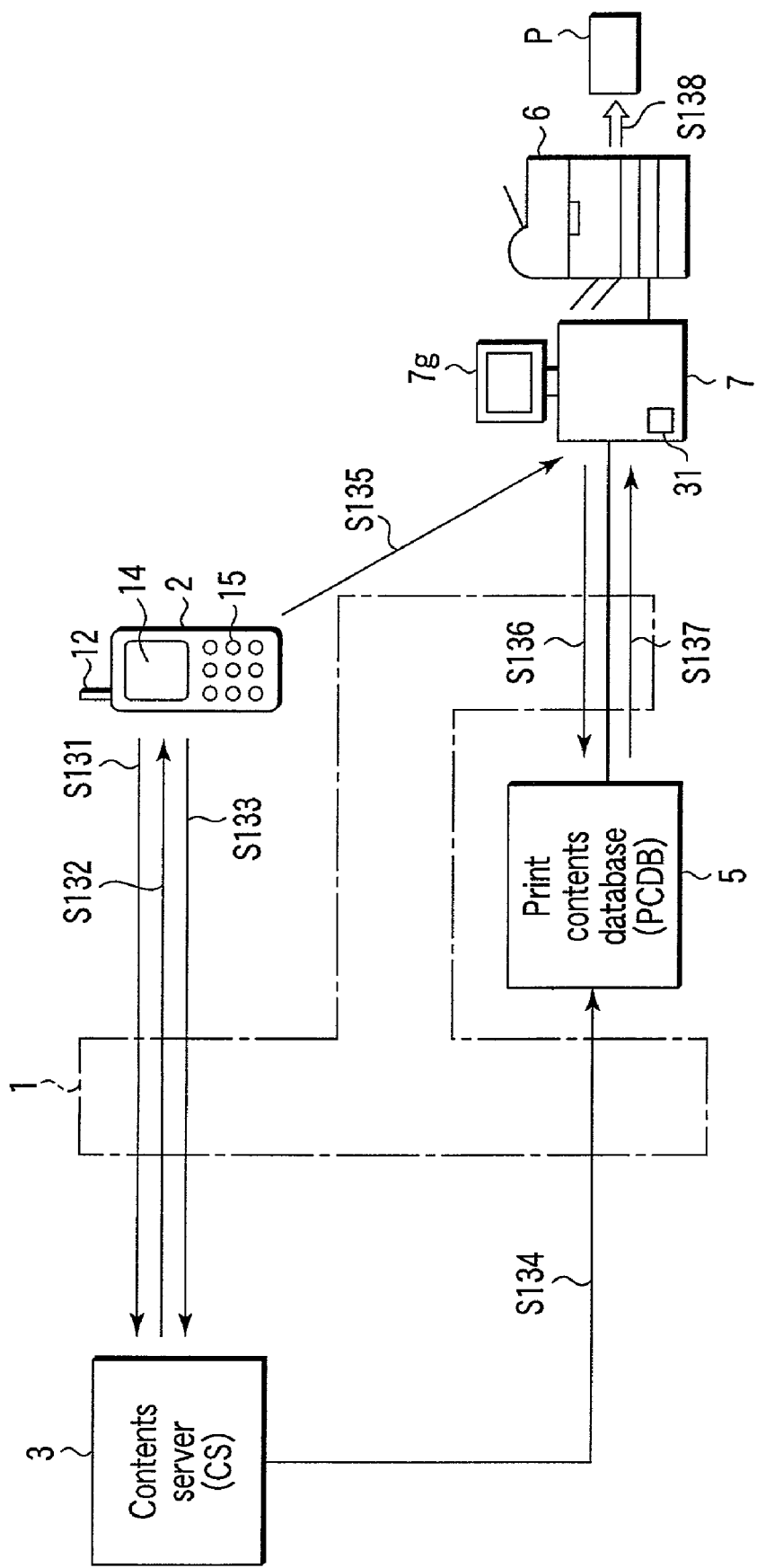
F I G. 26

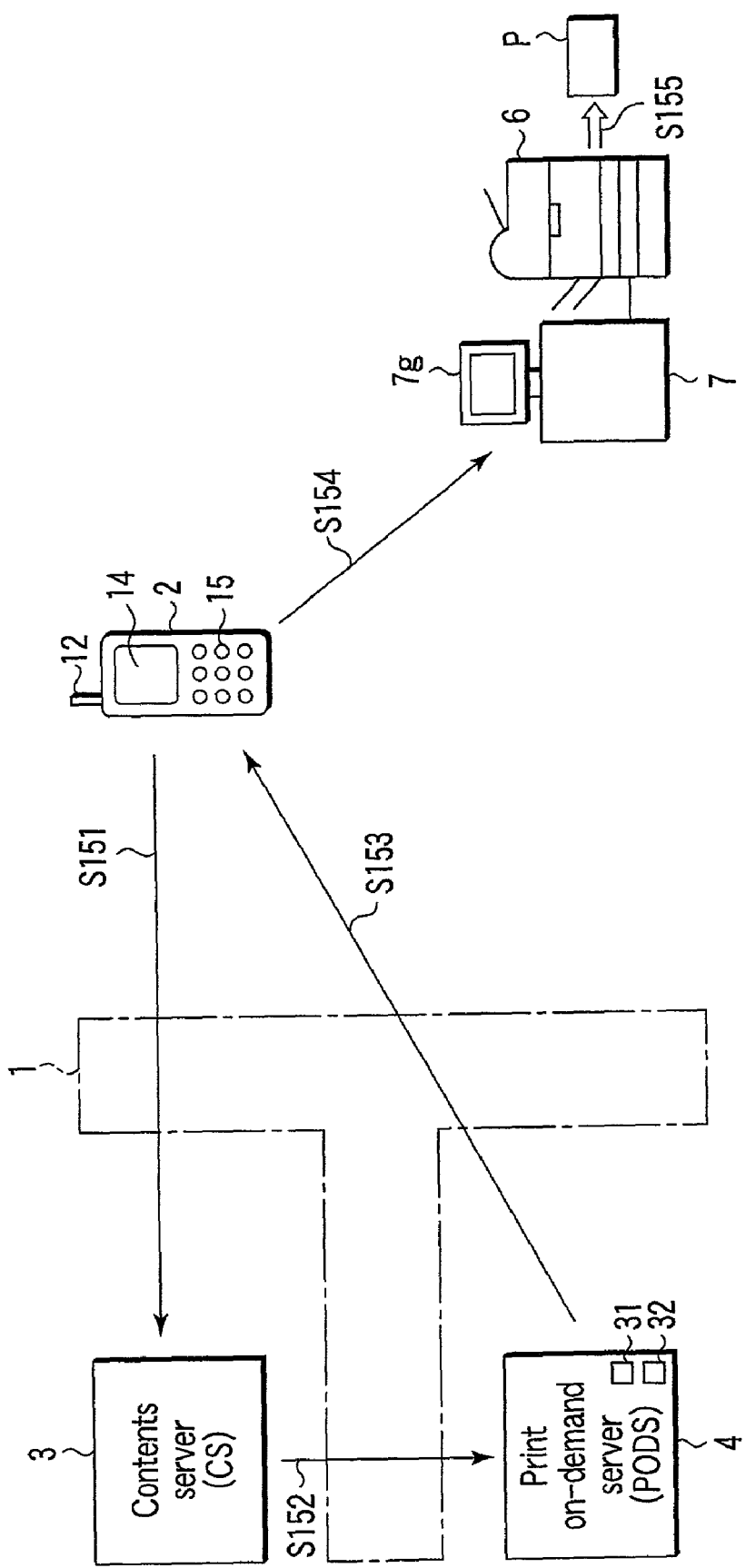
F I G. 28

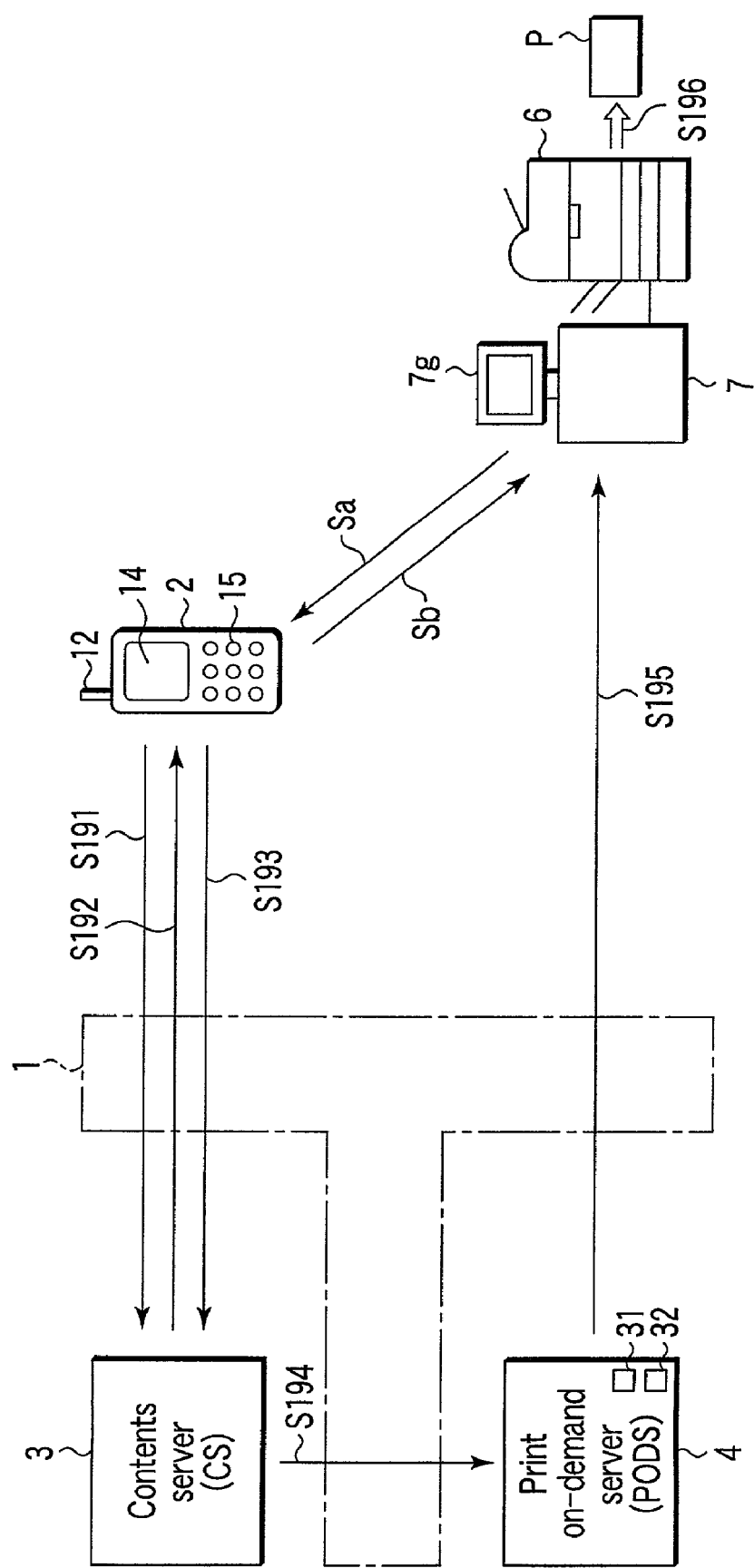
F I G. 32

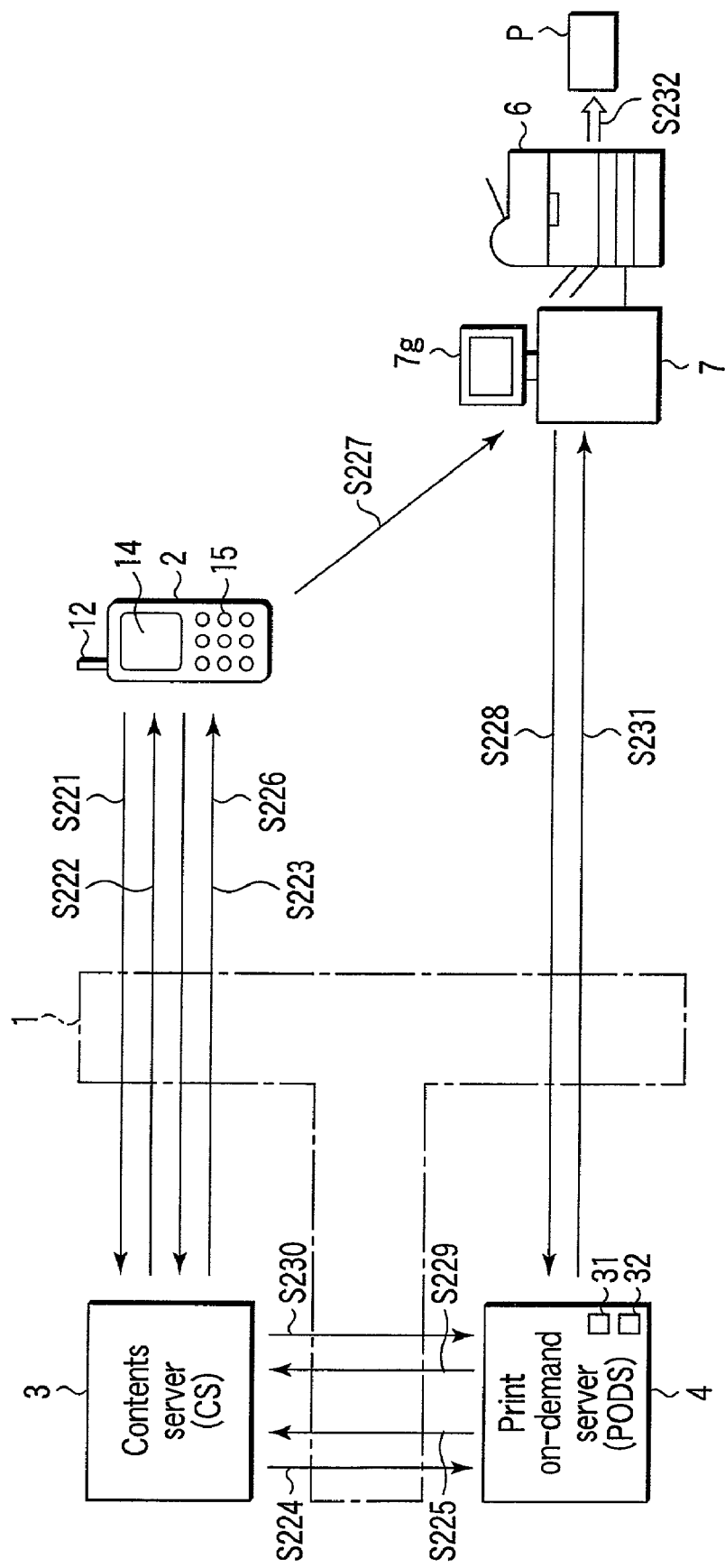
F I G. 34

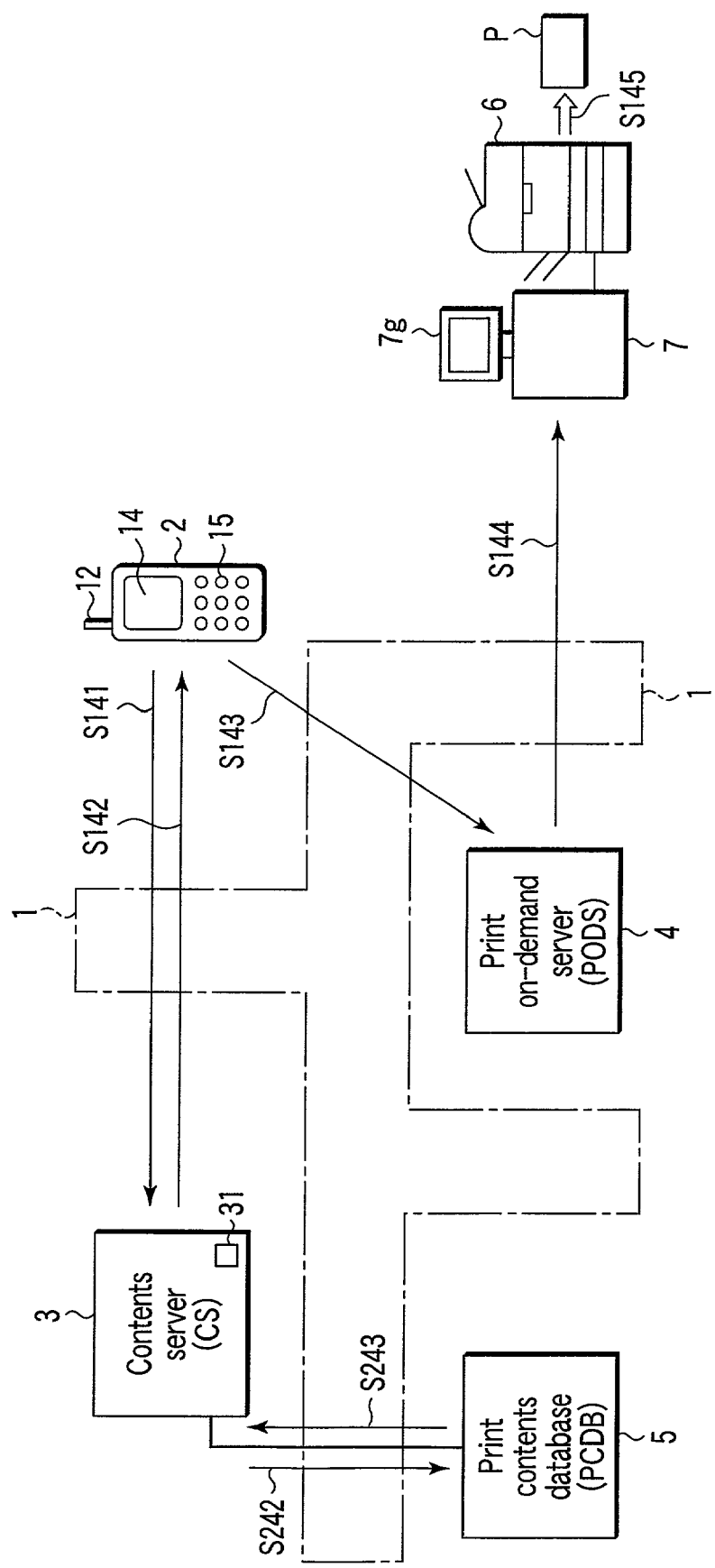
F I G. 35

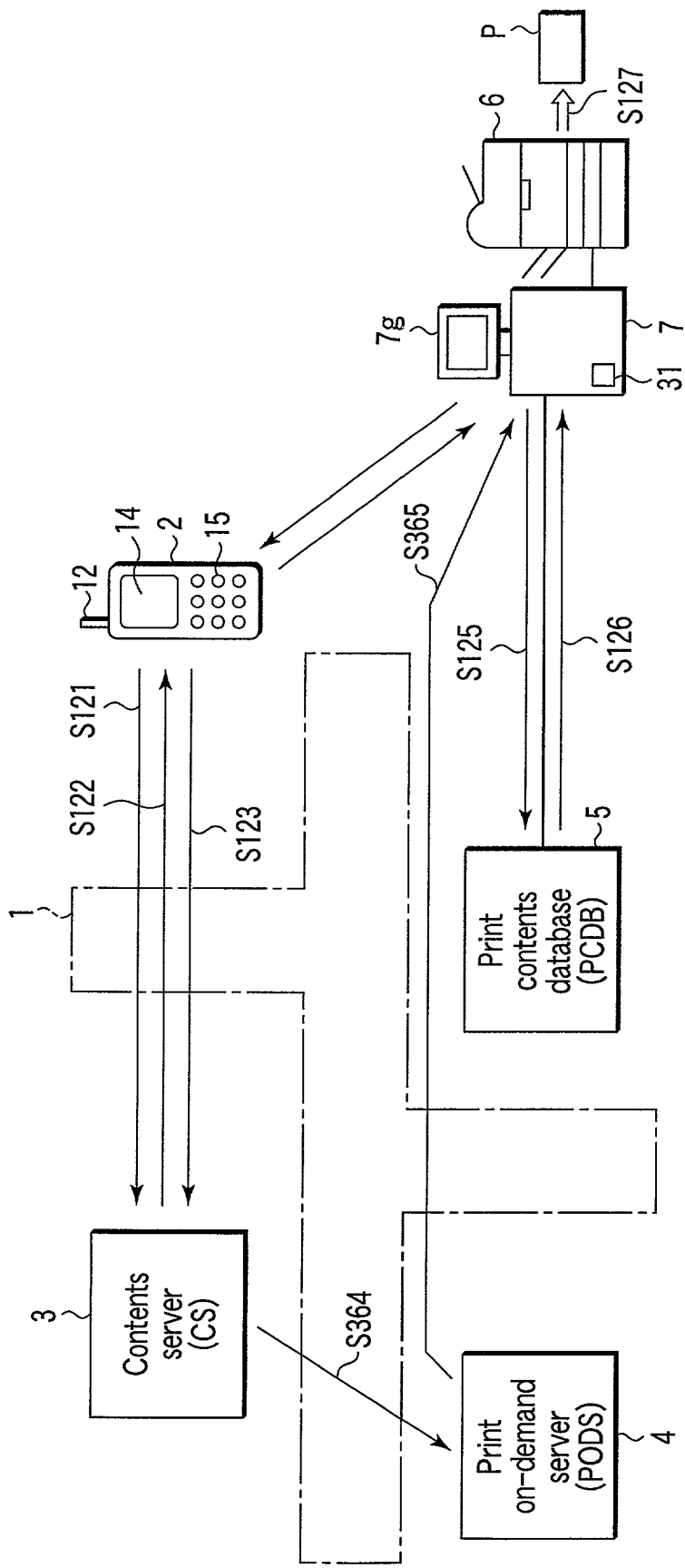
F I G. 46

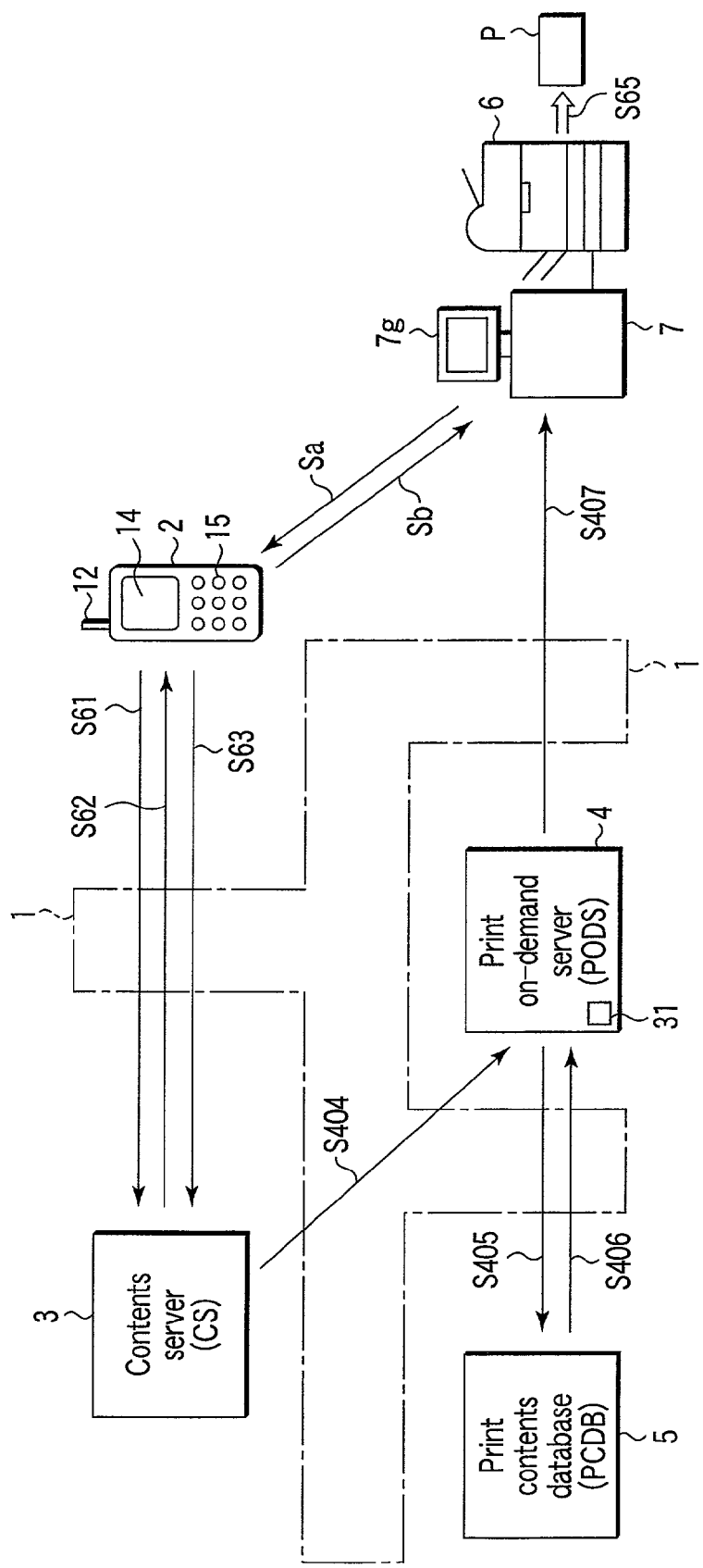
F I G. 50

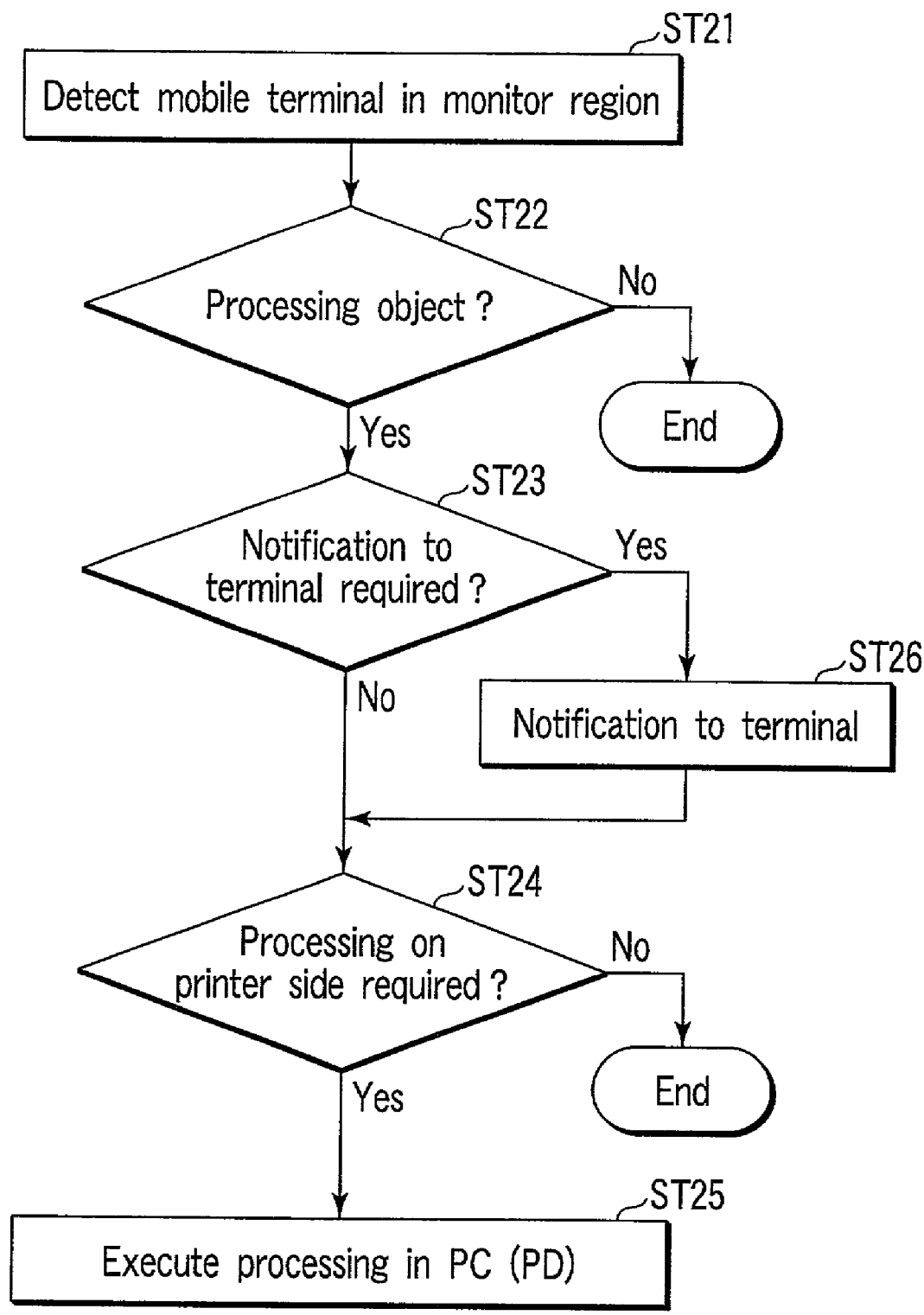
F I G. 52

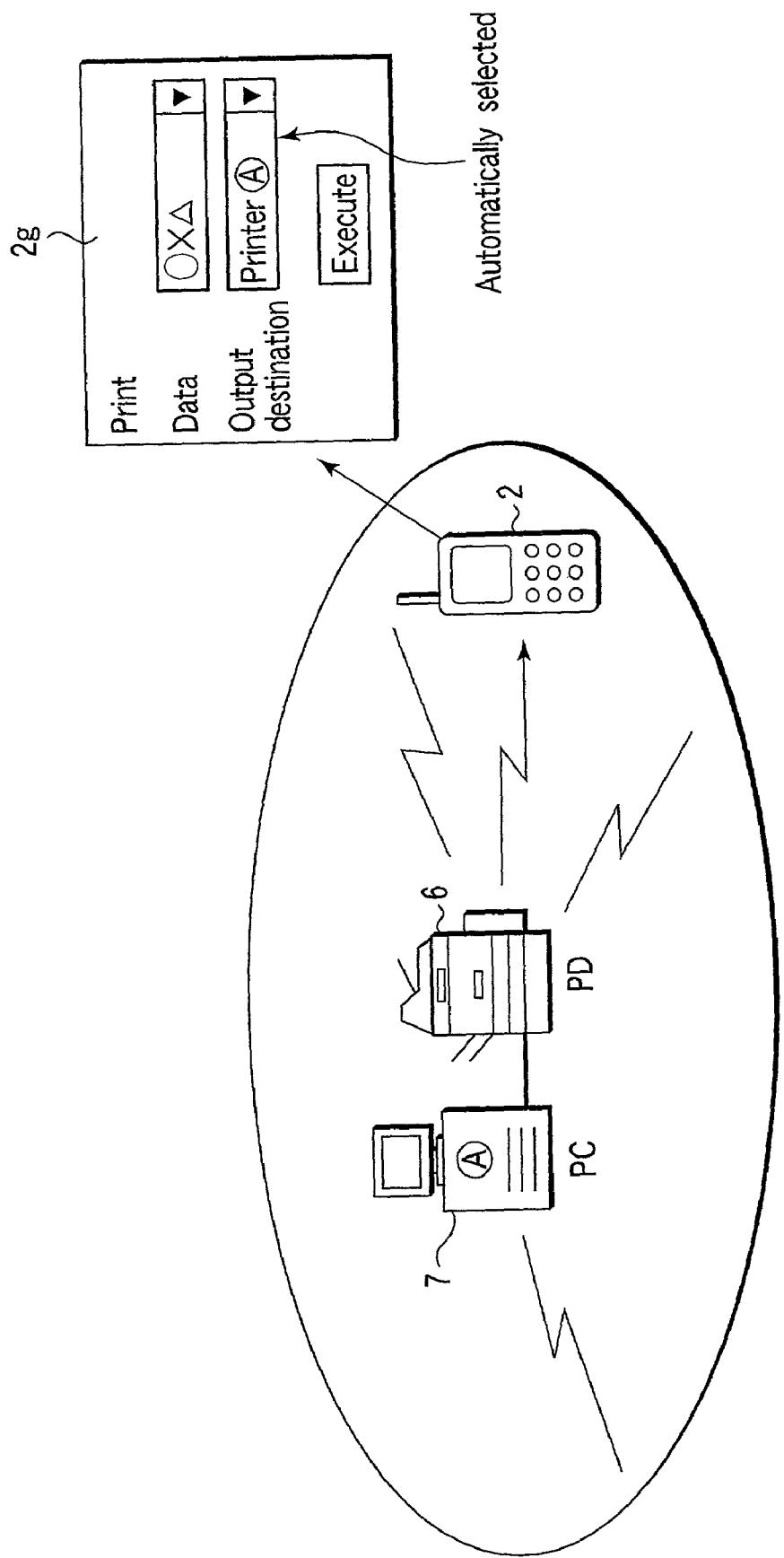
F I G. 53

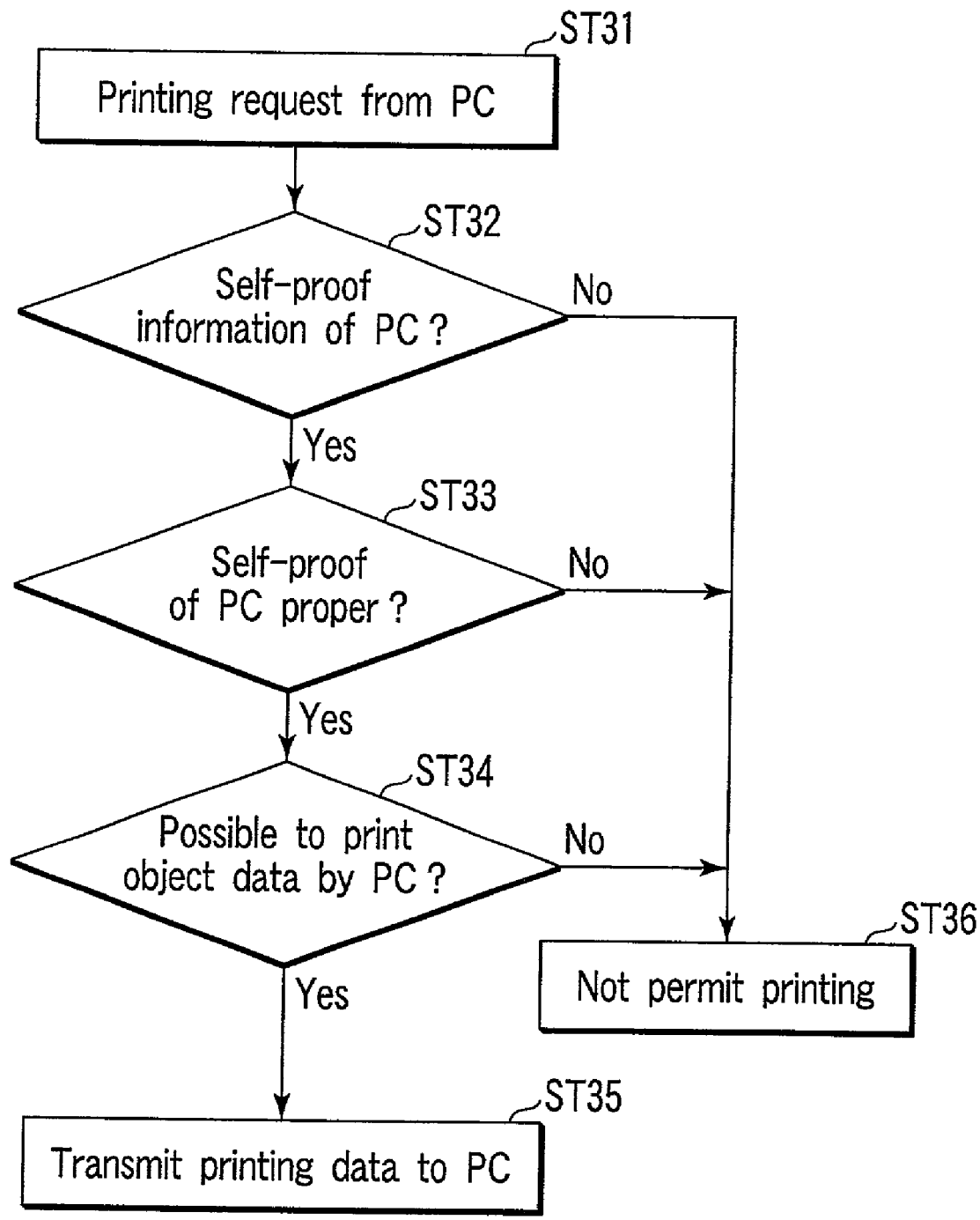
F I G. 54

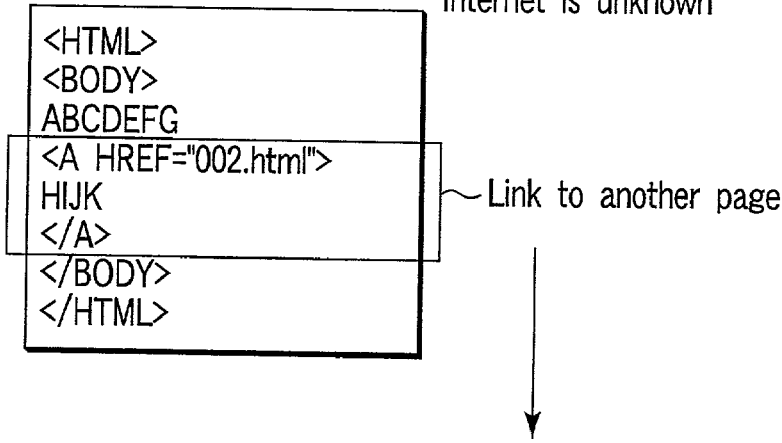
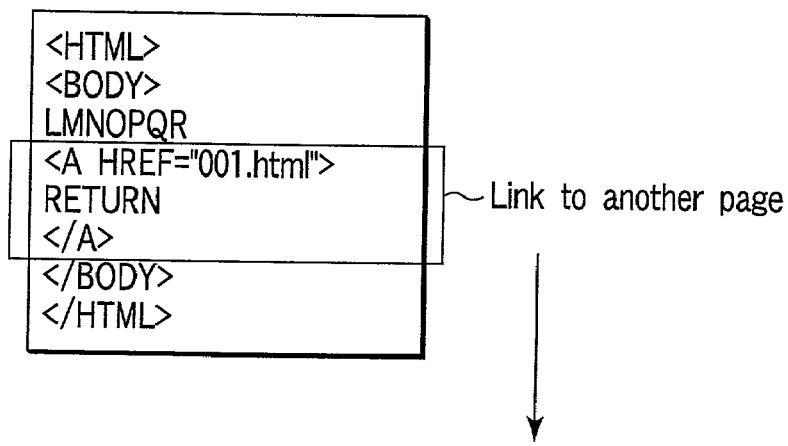
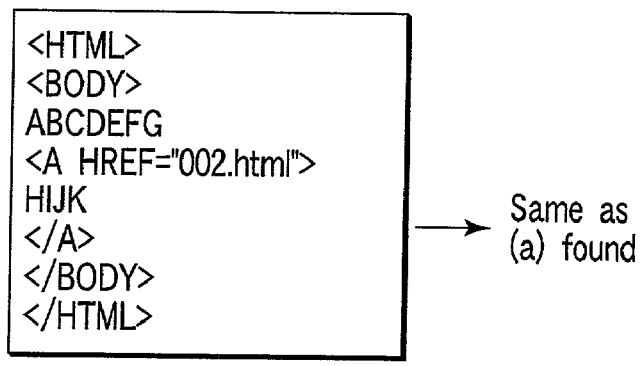
FIG. 55

PRINT SYSTEM BY MOBILE TERMINAL, AND NETWORK SYSTEM USING MOBILE TERMINAL

CROSS-REFERENCE TO RELATED APPLICATIONS

This application is based upon and claims the benefit of priority from the prior Japanese Patent Application No. 2001-060768, filed Mar. 5, 2001, the entire contents of which are incorporated herein by reference.

BACKGROUND OF THE INVENTION

1. Field of the Invention

The present invention relates to a print system by a mobile terminal for providing a printing service by combination of browser devices such as a cellular phone (Web phone, browser phone, smart phone) accessible to Internet and a mobile terminal (Palm, PDA, sub notebook-size personal computer) with a printing apparatus, and a network system using the mobile terminal.

2. Description of the Related Art

In recent years, it has been possible to use a cellular phone and mobile terminal (hereinafter referred to as the mobile terminal) and browse information, mail, and the like on the Internet whilst on the move. However, in the mobile terminal, an information display area cannot be enlarged, so browsing of detailed information is limited.

Therefore, a service of printing/outputting information on the mobile terminal is considered with the intention of supplementing the information display function of the mobile terminal. At present, it is mainly proposed to connect a small-sized printer directly to the mobile terminal and print/output the information. However, in order to utilize an advantage that the mobile terminal can be utilized "anytime and anywhere", the small-sized printer has also to be carried. As a result, the attractive characteristic of "handiness" of the mobile terminal is lost.

As a countermeasure against this situation, a stationary, installed type is considered. That is, it is proposed to combine a (non-mobile) printer with the mobile terminal and construct a service system for a user to print the information on the mobile terminal.

As an associated example, as disclosed in Jpn. Pat. Appln. KOKAI Publication No. 146118/1999 (Data Processing System, Data Processing Method of Data Processing System and Storage Medium with Computer Readable Program stored therein by Cannon Inc.), a system constituted by combining a server with an image forming apparatus communicates with the mobile terminal, and a printing service is provided at an arbitrary installation place while a fee is charged. In this example, the information to be printed is transmitted to the server from an information terminal, and the information is received and printed from the server in the arbitrary place, so that a demand for the printing whilst on the move can be satisfied. Moreover, a user authentication processing and charging processing are also considered.

As an example of a simpler system, as described in an article (Interface Acceleration with Network) of Nikkei Sangyo Newspaper dated Mar. 3, 2000, it is considered to use Jini or Bluetooth and print a communication content directly via a printer from the cellular phone.

Thereby, there is a demand for a printing service higher in convenience as compared with a conventional service, by an on-demand print system realized by connecting existing-art devices such as a mobile terminal, printer and contents server, a database for storing printing contents, and inventive devices such as a print on-demand server for integrally performing charging, security management, user management, printing history management, and the like with respect to distribution processing/printing of contents to be printed to one another for communication on Internet.

BRIEF SUMMARY OF THE INVENTION

An object of the present invention is to provide a printing service higher in convenience as compared with a conventional service, by an on-demand print system realized by connecting existing devices such as a mobile terminal, printer and contents server, a database for storing contents for printing, and inventive devices such as a print on-demand server for integrally performing charging, security management, user management, printing history management, and the like with respect to distribution processing/printing of contents to be printed to one another for communication on Internet.

According to the present invention, there is provided a print system by a mobile terminal, comprising: the mobile terminal comprising a receiving section to receive simplified data for displaying contents supplied from a contents server via Internet and printing detailed data, a display section to display the simplified data for displaying the contents received by the receiving section, an instructing section to instruct the contents displayed by the display section to be printed, and an output section to output the detailed data of the contents received by the receiving section in accordance with an instruction of the instructing section; and a printing apparatus connected to the mobile terminal by radio or via a cable and configured to print the detailed data supplied from the mobile terminal.

According to the present invention, there is provided a network system using a mobile terminal, comprising: a contents server to output simplified data for displaying contents and detailed data for printing the contents, to the mobile terminal that has transmitted a request based on the request from the mobile terminal connected, to the contents server via Internet; the mobile terminal comprising a receiving section to receive the simplified data for displaying the contents supplied from the contents server via Internet and the printing detailed data, a display section to display the simplified data for displaying the contents received by the receiving section, an instructing section to instruct the contents displayed by the display section to be printed, and an output section to output the detailed data of the contents received by the receiving section in accordance with an instruction of the instructing section; and a printing apparatus, connected to the mobile terminal by radio or via a cable, to print the detailed data supplied from the mobile terminal.

According to the present invention there is provided a print system by a mobile terminal, comprising: the mobile terminal comprising a receiving section to receive detailed data of contents supplied from a contents server via Internet, a converting section to convert the detailed data of the contents received by the receiving section to displaying simplified data, a display section to display the displaying simplified data converted by the converting section, an instructing section to instruct the contents displayed by the display section to be printed, and an output section to output the detailed data of the contents received by the receiving section in accordance with an instruction of the instructing section; and a printing apparatus, connected to the mobile terminal by radio or via a cable, to print the detailed data supplied from the mobile terminal.

According to the present invention, there is provided a network system using a mobile terminal, comprising: a contents server to output detailed data of contents to the mobile terminal having transmitted a request based on the request from the mobile terminal connected to the contents server via Internet; the mobile terminal comprising a receiving section to receive the detailed data of the contents supplied from the contents server via Internet, a converting section to convert the detailed data of the contents received by the receiving section to displaying simplified data, a display section to display the displaying simplified data converted by the converting section, an instructing section to instruct the contents displayed by the display section to be printed, and an output section to output the detailed data of the contents received by the receiving section in accordance with an instruction of the instructing section; and a printing apparatus, connected to the mobile terminal by radio or via a cable, to print the detailed data supplied from the mobile terminal.

According to the present invention, there is provided a network system using a mobile terminal, comprising: a contents server comprising a storage section to associate and store displaying simplified data with printing detailed data for each content, a first output section to output the simplified data for displaying contents, and a stored address of the corresponding printing detailed data to the mobile terminal having transmitted a request based on the request from the mobile terminal connected to the contents server via Internet, and a second output section to read the printing detailed data based on the stored address of the printing detailed data from a printing apparatus connected to the contents server via the Internet and outputting the printing detailed data to the printing apparatus; the mobile terminal comprising a receiving section to receive the simplified data for displaying the contents supplied from the contents server via Internet and the stored address of the printing detailed data, a display section to display the simplified data for displaying the contents received by the receiving section, an instructing section to instruct the contents displayed by the display section to be printed, and a third output section to output a printing request of the printing detailed data and the stored address received by the receiving section in accordance with an instruction of the instructing section; and the printing apparatus connected to the mobile terminal by radio or via a cable, connected to the contents server via the Internet, and comprising a receiving section to receive the printing request of the printing detailed data supplied from the mobile terminal and the stored address, a fourth output section to output the stored address received by the receiving section to the contents server via the Internet, and a printing section to print the detailed data supplied from the contents server via Internet in response to an output of the fourth output section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is an explanatory view of a storage example of a PID management table.

FIG. 7 is an explanatory view showing a constitution example of a print contents database (PCDB).

FIG. 19 is an explanatory view of the schematic constitution and the data transmission/reception state in a sixth embodiment.

FIG. 23 is an explanatory view of the schematic constitution and the data transmission/reception state in an eighth embodiment.

FIG. 26 is an explanatory view of the schematic constitution and the data transmission/reception state in an eleventh embodiment.

FIG. 28 is an explanatory view of the schematic constitution and the data transmission/reception state in the twelfth embodiment.

FIG. 32 is an explanatory view of the schematic constitution and the data transmission/reception state in the fourteenth embodiment.

FIG. 34 is an explanatory view of the schematic constitution and the data transmission/reception state in the fifteenth embodiment.

FIG. 35 is an explanatory view of the schematic constitution and the data transmission/reception state in a sixteenth embodiment.

FIG. 46 is an explanatory view of the schematic constitution and the data transmission/reception state in the twenty-first embodiment.

FIG. 50 is an explanatory view of the schematic constitution and the data transmission/reception state in a twenty-fifth embodiment.

FIG. 52 is a flowchart of the automatic processing by detection of approach of BD.

FIG. 53 is an explanatory view of a transmission processing of printer identification information to a peripheral region.

FIG. 54 is a flowchart showing a printing permitting method by self-proof of PC.

FIG. 55 is an explanatory view of a method of specifying existence information (address) on a network from a data content.

DETAILED DESCRIPTION OF THE INVENTION

An on-demand print system by a mobile terminal according to preferred embodiments of the present invention will be described hereinafter with reference to the drawings.

FIRST EMBODIMENT

The on-demand print system by the mobile terminal transmits information to the mobile terminal, and prints out detailed information associated with the information with a desired print device based on a printing instruction from the mobile terminal.

Figure 1:
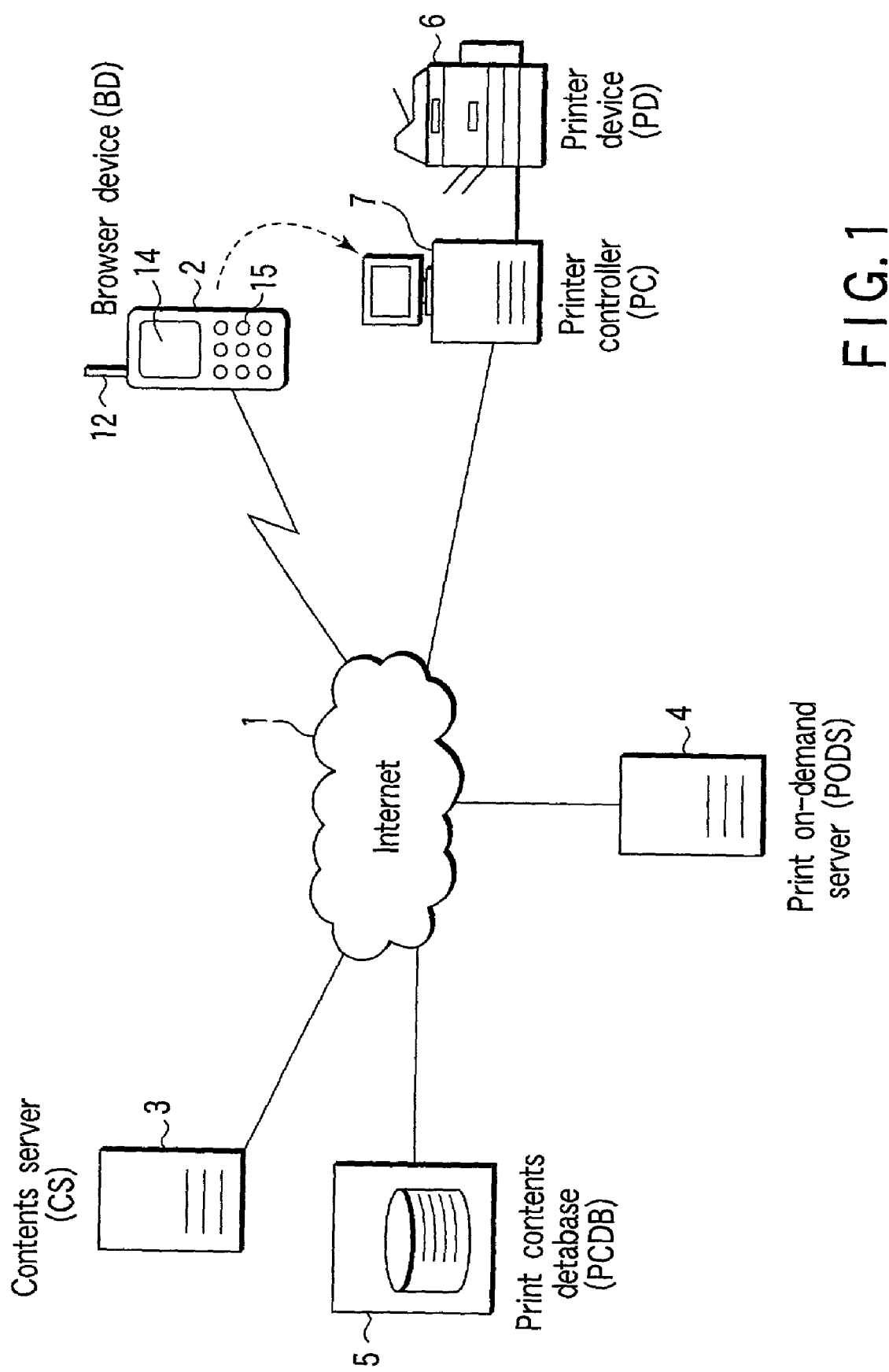
FIG. 1 is a diagram showing a schematic constitution of an on-demand print system by a mobile terminal according to a first embodiment of the present invention.

In the on-demand print system by the mobile terminal, as shown in FIG. 1, a browser device (BD) 2 as the mobile terminal on an information reception side, a contents server (CS) 3 as an information transmission apparatus on an information transmission side, a print on-demand server (PODS) 4, a print contents database (PCDB) 5, and a printer controller (PC) 7 for controlling a printer device (PD) 6 are connected via a communication network such as Internet 1.

The browser device (BD) 2 is connected to the printer controller (PC) 7 by radio in accordance with a Bluetooth function (or via a cable).

The browser device (BD) 2 is constituted of a cellular phone (Web phone, browser phone, smart phone) accessible to Internet, a mobile terminal (Palm, PDA, sub notebook-size personal computer), a personal computer having an equivalent function, or the like.

The contents server (CS) 3 is a server for transmitting, receiving and distributing the information, and is constituted of a WWW server (HTTP server), main server (SMTP server), or the like.

The print on-demand server (PODS) 4 integrally performs charging, security management, user management, printing history management, and the like with respect to distribution, processing and printing of contents to be printed, and provides a printing service as an independent function (service) which is not included in other devices on Internet 1.

The print contents database (PCDB) 5 stores printing contents (detailed printing data, print-only data), and is managed by the PODS 4 in the first embodiment. The print-only data is detailed image data with respect to a schematic image for the BD 2 distributed by the contents server (CS) 3. For example, with a map image, roads, and the like are linearly represented in the schematic image, the road is given a certain width in a detailed image, and the image has a changed scale.

The printer device (PD) 6 is a printer or an apparatus (composite machine, FAX) having a print function.

The printer controller (PC) 7 controls the printer device (PD) 6, and is sometimes incorporated in the PD 6 as a function in the PD 6. One PC 7 controls one unit or a plurality of units of PD 6.

The PC 7 is subjected to an automatic processing by detection of approach of the BD 2 as described later.

Moreover, on a printing data transmission side (CS 3, PODS 4 or PCDB 5), as described later, it is confirmed whether or not printing data can be transmitted based on self-proof information transmitted from the PC 7.

Figure 2:
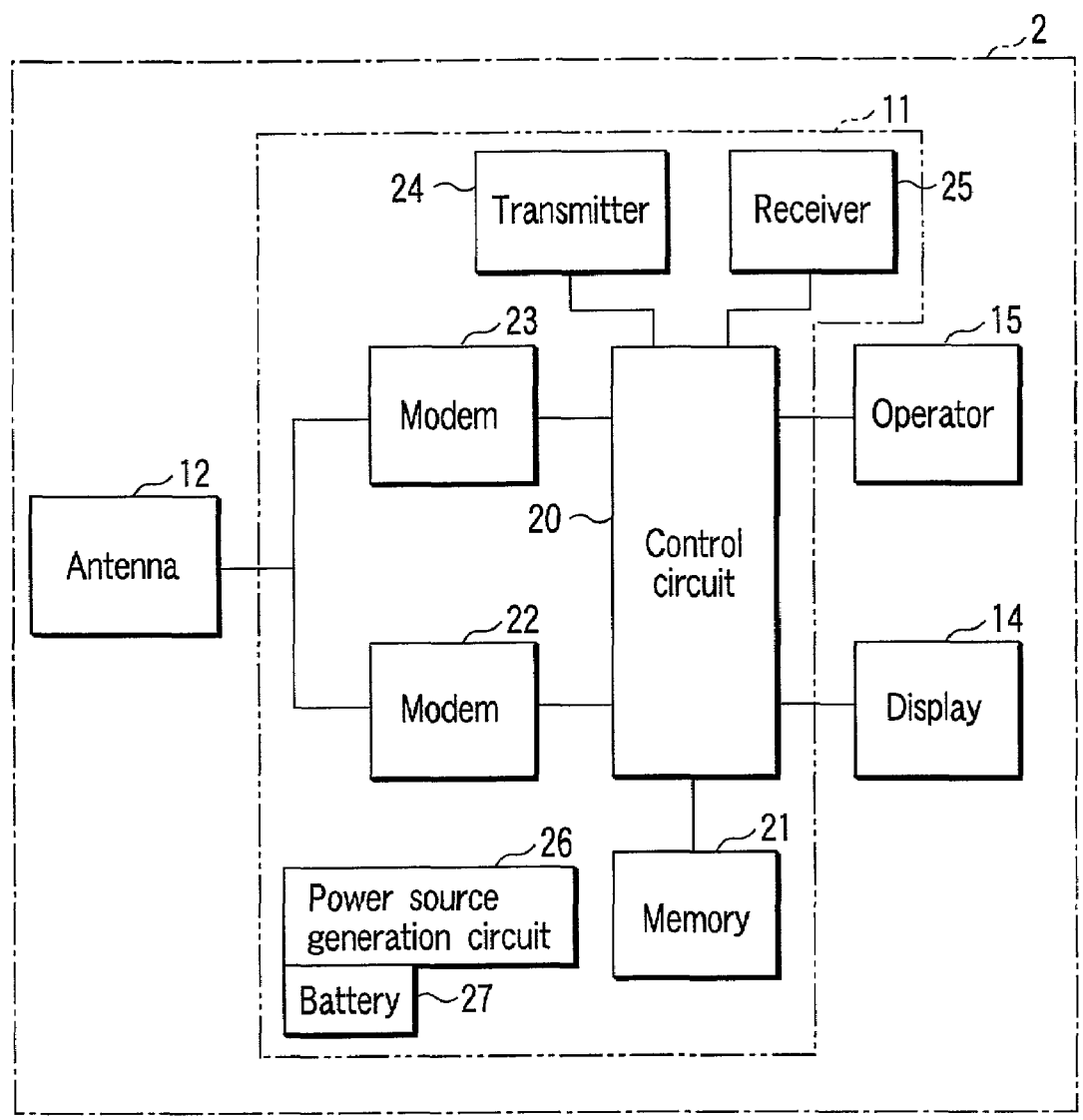
FIG. 2 is a block diagram showing a schematic constitution of BD.

As shown in FIGS. 1 and 2, the BD 2 is formed by a main body 11 and a transmitting/receiving antenna 12.

A speaker hole 13, display 14, operator 15, and microphone hole 16 are constituted in order from above on a front surface of the main body 11. A speaker (not shown) as a receiver described later is disposed opposite to the speaker hole 13 in the main body 11. A microphone (not shown) as a transmitter described later is disposed opposite to the microphone hole 16 in the main body 11. The display 14 displays guidance for various operations. The operator 15 performs various settings for use as the cellular phone, inputs a phone number, performs settings for use as the mobile terminal, or changes a mode setting.

Figure 3:
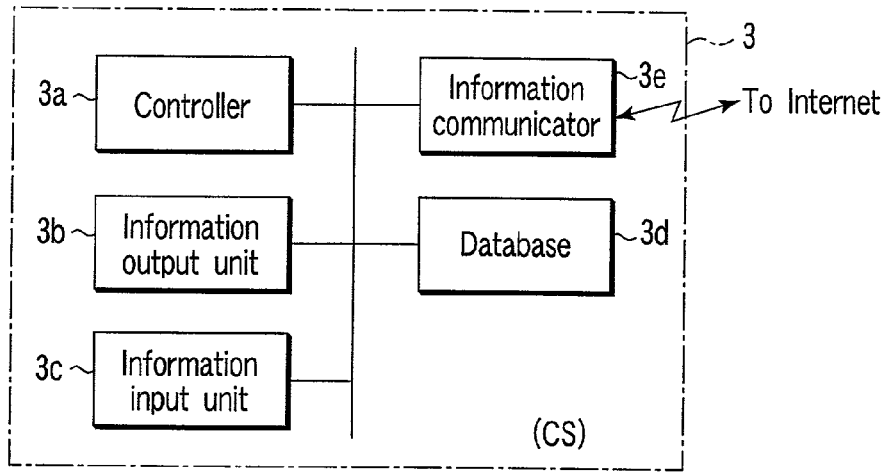
FIG. 3 is a block diagram showing a schematic constitution of the mobile terminal.

Inside the main body 11, as shown in FIG. 3, a control circuit 20 for controlling a whole constitution, a memory 21 for storing various information such as a control program for the cellular phone, control program for Bluetooth (short-distance radio communication function), and ID number (identification number, machine body number), modems 22, 23 as a modulation/demodulation circuit (transmission/reception circuit), a transmitter 24, a receiver 25, a power source generation circuit 26, and a battery 27 are constituted.

The modems 22, 23 are connected to the antenna 12, demodulate data received from a reader/writer 42 via the antenna 12, output the data to the control circuit 20 and power source generation circuit 26, or transmit transmission data to the reader/writer 42 from the control circuit 20 via the antenna 12. The modems 22, 23 are separately disposed in accordance with a difference in a signal frequency between use as the cellular phone and use as a terminal apparatus of an information transmission system. The browser device is controlled by separate applications registered in the memory 21 when the device is used as the cellular phone and as the terminal apparatus of the information transmission system.

The transmitter 24 is constituted of the microphone, and the like, and converts words emitted from a user into sound data and outputs the data during the use as the cellular phone.

The receiver 25 is constituted of the speaker, and the like, and reproduces the sound data received from another apparatus and outputs the data via the speaker.

The power source generation circuit 26 generates a power voltage based on the received data (radio waves) from the modem 22, and supplies the voltage to the control circuit 20, modems 22, 23, transmitter 24, receiver 25, operator 15, and display 14.

The battery 27 supplies the power voltage to respective sections when the power source generation circuit 26 does not operate.

As shown in FIG. 3, the contents server 3 is constituted of a controller 3a for controlling the whole server, information output unit 3b, information input unit 3c, database 3d, and information communicator 3e connected to Internet 1.

The controller 3a analyzes communication information supplied from the information communicator 3e, extracts necessary information from the database 3d, transmits the information via the information communicator 3e, or stores the necessary information in the detailed data 3d.

The information output unit 3b outputs the information of the database 3d. The unit may be disposed outside the contents server 3 depending upon a system scale. Examples of the information output unit 3b include a printer, MO, CD-R, cassette tape, DVD-RAM, FD, hard disk, video tape, and the like.

The information input unit 3c inputs the information of the database 3d. Examples of the information input unit 3c include a keyboard, mouse, pen input, scanner, OCR, and the like. The unit may be disposed outside the contents server 3 depending upon the system scale.

The database 3d stores various types of information. Examples of the information include a sentence, image, dynamic image, sound, and the like.

The database 3d stores not only the information to be provided but also information received from the BD 2.

The information communicator 3e receives communication information supplied from the BD 2, or the like via Internet 1, or transmits the communication information to the BD 2, or the like from the database 3d via Internet 1.

Figure 4:
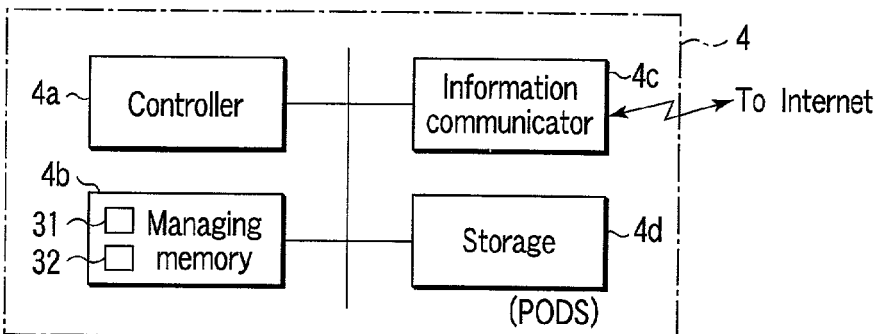
FIG. 4 is a block diagram showing a schematic constitution of a print on-demand server.

As shown in FIG. 4, the print on-demand server (PODS) 4 is constituted of a controller 4a for controlling the whole server, a managing memory 4b, an information communicator 4c connected to Internet 1, and a storage 4d.

The controller 4a analyzes the communication information supplied from the information communicator 4c, extracts necessary information from the storage 4d, transmits the information via the information communicator 4c, or reads necessary information (detailed printing data, printing contents, print-only data) from the print contents database (PCDB) 5 and stores the information in the storage 4d.

The controller 4a generates a new PID as a number for the present printing based on a printing request received from the BD 2, and registers the generated PID and a mobile terminal number of the BD 2, or correspondence between the address and printing data in a PID management table 32.

The managing memory 4b includes a registered place table 31, and PID management table 32.

A registered place of the printing data for each map ID in the PCDB 5 is stored in the registered place table 31, and the table is a correspondence table between the map ID and the printing data.

Moreover, the registered place table 31 stores the registered place of the printing data in the PCDB 5 using an address of a home page as a key.

In the registered place table 31, display data of the BD 2 is associated with the detailed printing data to be printed by the PD 6.

The PID management table 32 is a correspondence table of issued PID, printing data corresponding to the PID, and the mobile terminal number or the address as user data.

Figure 5:
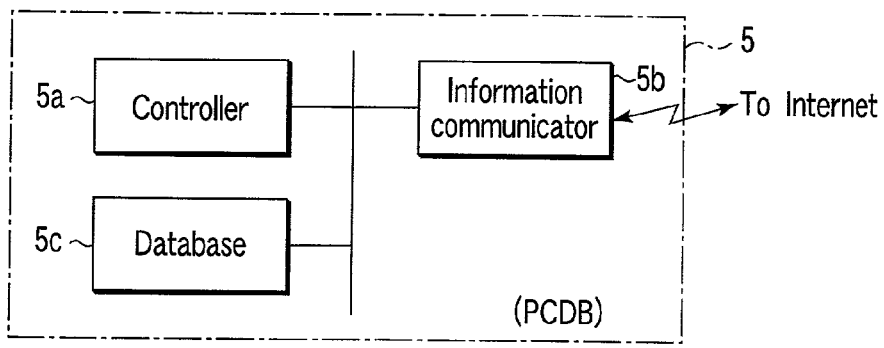
FIG. 5 is an explanatory view of a storage example of a registered place table.

As shown in FIG. 5, the print contents database (PCDB) 5 is constituted of a controller 5a for controlling the whole database, an information communicator 5b connected to Internet 1, and a database 5c in which the print-only data is registered.

The controller 5a analyzes the communication information supplied from the information communicator 5b, extracts the necessary information from the database 5c, and transmits the information via the information communicator 5b.

The printer controller (PC) 7 is used as a dispersion processing server, and includes a controller 7a for controlling the whole constitution. The controller 7a is connected to a network interface 7b, an HDD 7c for registering printing data, a communication interface 7d for exchanging data with the BD 2 by data transfer functions such as Bluetooth, a copying machine interface 7e connected to the first PD 6 via SCSI, a copying machine interface 7f connected to the second PD 6 via SCSI, and an operation display 7g.

Figure 8:
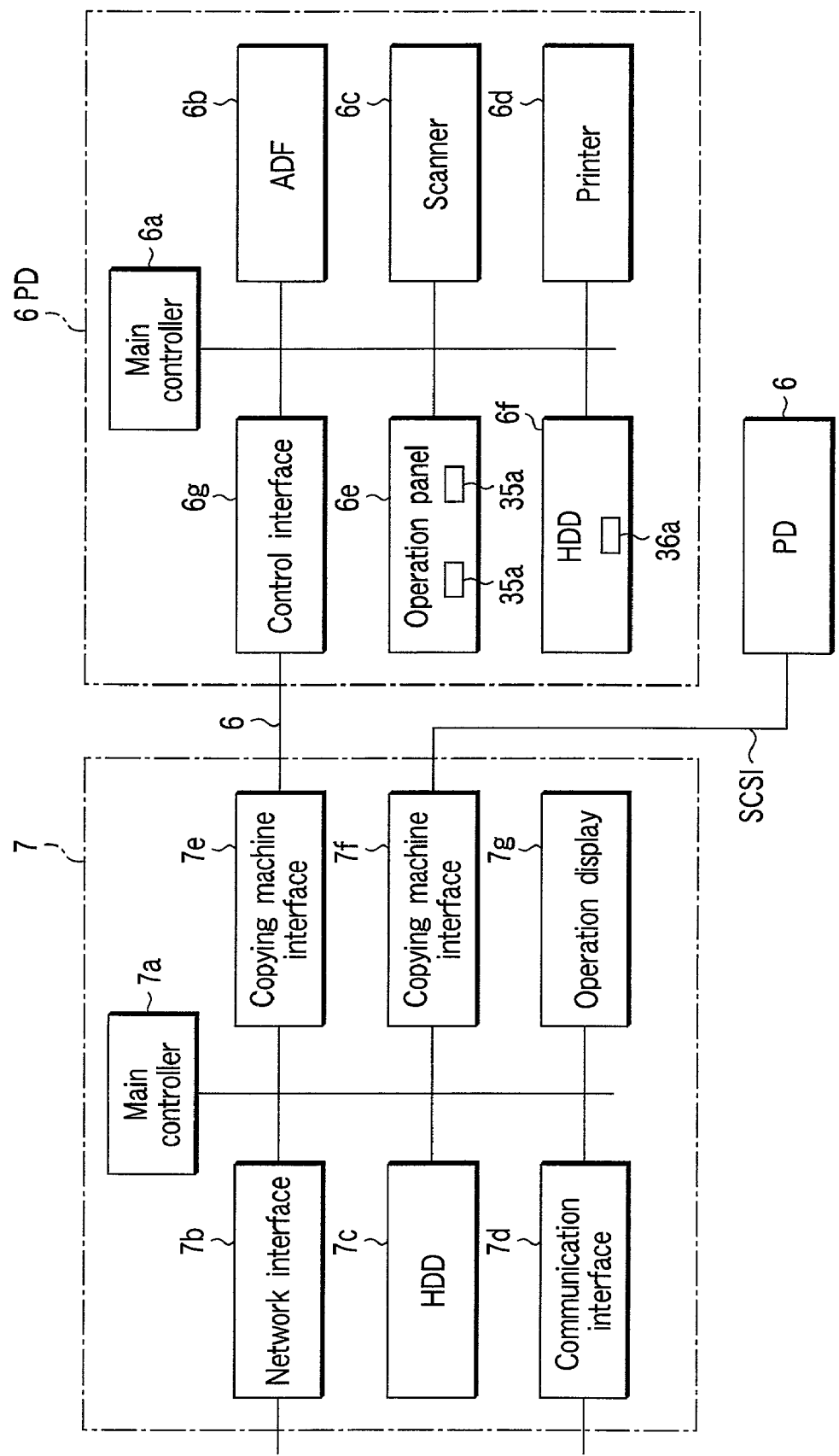
FIG. 8 is a diagram showing an internal constitution of a PD control circuit.

An internal constitution of a control circuit of the PD 6 will be described with reference to FIG. 8.

The PD 6 includes a main controller 6a for controlling the whole constitution. The main controller 6a is constituted of a central processing unit (CPU) for controlling an operation, a read only memory (ROM) in which software of the operation of the PD 6 is stored, and a random access memory (RAM) (S-RAM) in which image data and other operational data are temporarily stored (not shown).

The main controller 6a is connected to an automatic draft feeder (ADF) 6b, scanner 6c, printer 6d, operation panel 6e, HDD 6f, and controller interface 6g.

The ADF 6b is disposed on the upper surface of the apparatus main body, and is an automatic draft feeder as conveying means for automatically feeding a draft set on a draft tray (not shown) onto a draft base (not shown).

The scanner 6c reads/scans the draft laid on the draft base, and thereby obtains read image data of the draft.

The printer 6d prints the read image data of the draft, or prints the image data from the outside.

The operation panel 6e is used as a display input section constituted of a liquid crystal display section with a touch panel built therein and hard keys such as ten keys. Instructions for various operations and settings are inputted by the touch panel and hard keys, and guidance of the operation or a content of an error during the error is displayed in the liquid crystal display section.

The HDD 6f is an external storage apparatus represented by a hard disk in which various types of data are stored. For example, when a plurality of copies or prints are made, an image constituted by compressing a plurality of images is registered, and the compressed image is read and printed during printing.

The controller interface 6g is connected to the printer controller 7 via SCSI, and the image data is exchanged.

Figure 9:
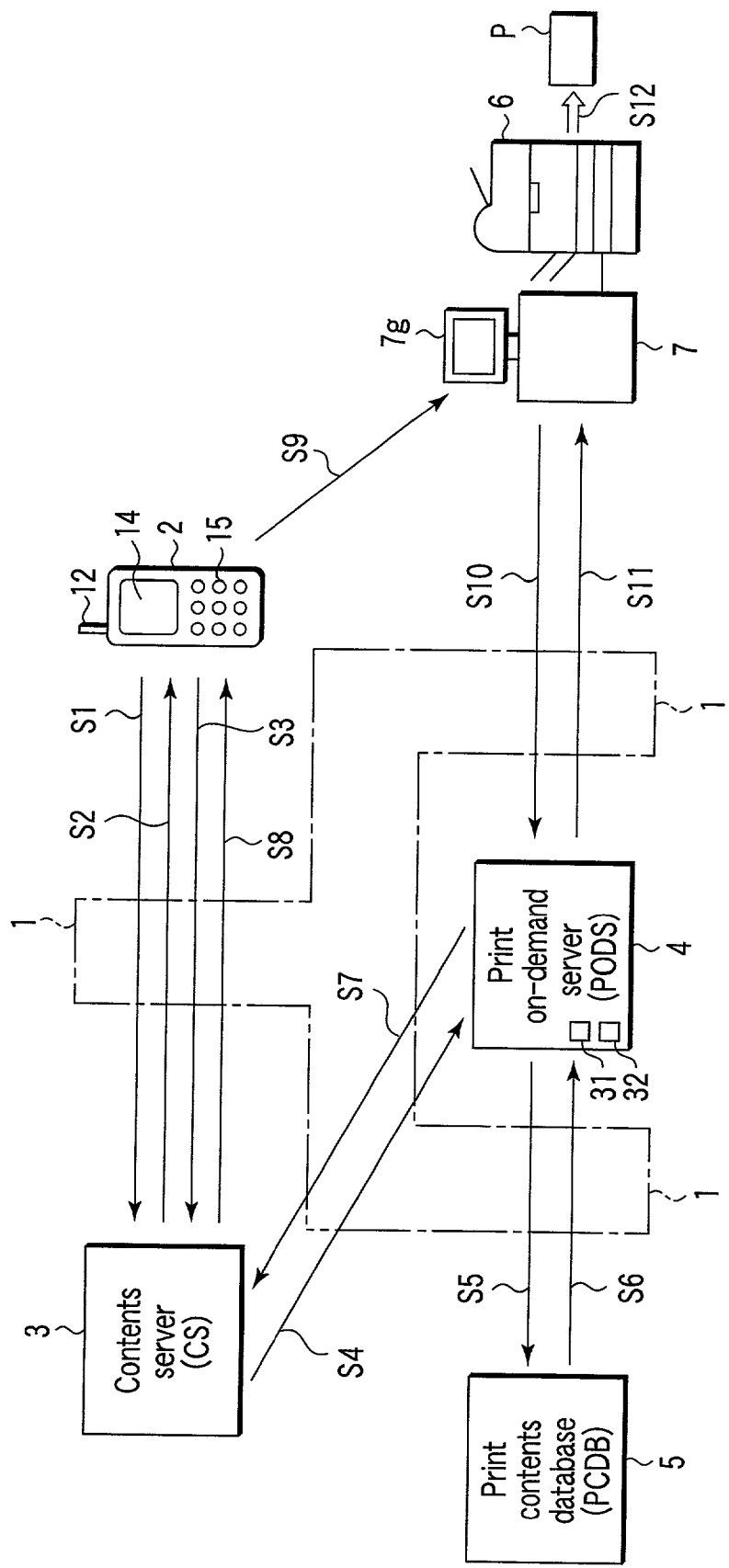
FIG. 9 is an explanatory view of the schematic constitution and a transmission/reception state of data in the first embodiment.
Figure 10:
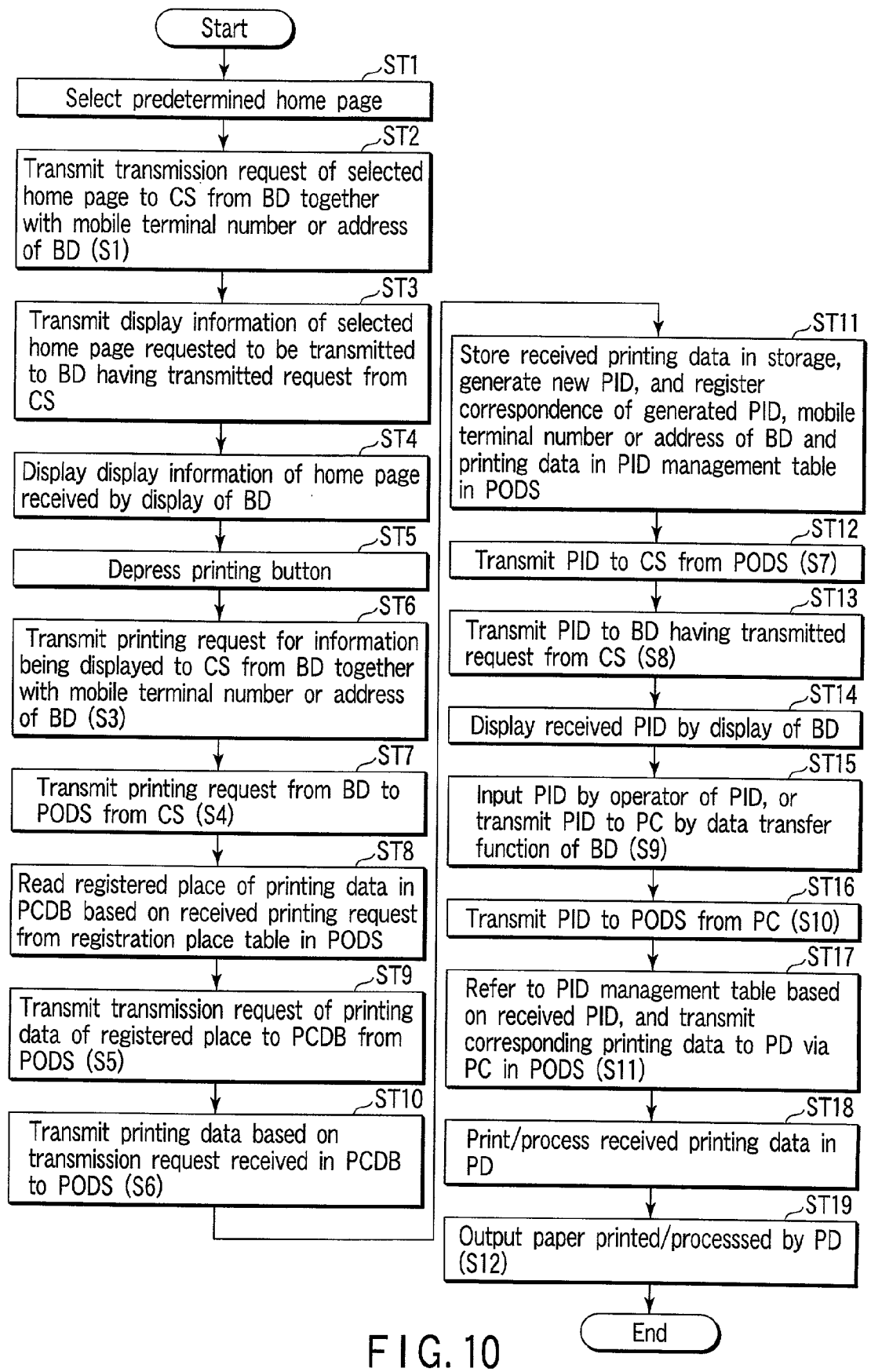
FIG. 10 is a flowchart showing the transmission/reception state of data.

An operation of the aforementioned constitution will next be described with reference to a data transmission/reception state shown in FIG. 9 and a flowchart of FIG. 10. However, description of exchanging of data among respective apparatuses via Internet 1 is omitted.

First, a user who carries the BD 2 selects a predetermined home page (ST1). Based on the selection, the BD 2 transmits a transmission request of data to the selected home page to the CS 3 together with the mobile terminal number or the address of the BD 2 (S1) (ST2). Thereby, the CS 3 reads display information of the home page requested to be transmitted from the database 3d, and transmits the information to the BD 2 having transmitted the request together with a display ID for specifying the display information (S2) (ST3). The BD 2 displays the received display information of the home page by the display 14 (ST4).

In this state, the user selects an icon for printing instruction from the display 14 when detailed information is necessary with respect to the information being displayed (ST5). According to this selection, the BD 2 transmits a printing request for the information being displayed to the CS 3 together with the mobile terminal number or the address of the BD 2 (S3) (ST6). The CS 3 transmits the printing request from the BD 2 to the PODS 4 (S4) (ST7). The PODS 4 reads a registered place of the printing data in the PCDB 5 based on the received printing request from the registered place table 31 (ST8).

The PODS 4 transmits the transmission request of the printing data of the registered place to the PCDB 5 (S5) (ST9). The PCDB 5 reads the printing data of the registered place based on the received transmission request, and transmits the data to the PODS 4 (S6) (ST10).

The PODS 4 stores the received printing data in the storage 4c, generate a new PID as the number for this printing, and registers the correspondence of the generated PID, the mobile terminal number or the address of the BD 2 and the printing data in the PID management table 32 (ST11). Moreover, the PODS 4 transmits the new generated PID to the CS 3 (S7) (ST12).

The CS 3 transmits the received PID to the BD 2 having transmitted the request (S8) (ST13). The BD 2 displays the received PID by the display 14 (ST14).

In this case, when storage of PID is selected, the PID is registered in the memory 21 of the BD 2.

Thereby, the user having instructed the printing can be informed of the PID as a print number.

Thereafter, the user approaches the PD 6 for performing the printing, and inputs the PID by the operation display 7g of the PC 7, or transmits the PID registered in the memory 21 to the PC 7 by a data transfer function of the BD 2 (S9) (ST15). Thereby, the PC 7 transmits the PID to the PODS 4 (S10) (ST16).

Then, the PODS 4 judges the corresponding printing data from the PID management table 32 based on the received PID, reads the judged printing data from the storage 4c, and transmits the data to the PD 6 via the PC 7 (S11) (ST17). The PD 6 prints/processes the received printing data (ST18). A paper P printed/processed by the PD 6 is outputted (S12) (ST19).

Figure 11:
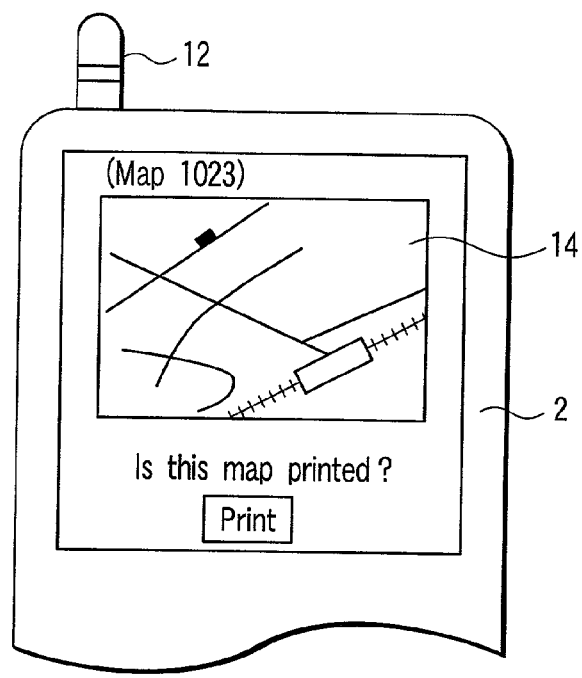
FIG. 11 is a diagram showing a display example in a BD display section.

For example, a site of map information is selected, and data of an outline map linearly shown in FIG. 11 is transmitted as desired map information (map No. 1023: map ID) for the display 14 of the BD 2 to the BD 2 having transmitted the request from the CS 3 (S2). Thereby, the display 14 of the BD 2 displays the outline map as linearly shown in FIG. 11. According to the display, the icon for printing instruction is selected. By the selection, the BD 2 transmits "printing request from user 09012345678@abc.xyz with respect to map No. 1023" to the CS 3 (S3). The CS 3 transmits the printing request from the BD 2 to the PODS 4 (S4).

Thereby, the PODS 4 refers to the registered place table 31, specifies the registered place of the printing data in the PCDB 5 corresponding to "map ID=1023"0 as "map/kanagawa/kawasaki/17", acquires the printing data from the registered place, and stores "20010213/1205/XXXXXX.gif" in the storage 4c in the PODS 4 (S5, S6).

Subsequently, the PODS 4 generates new PID "290167" as the number for this printing, and registers the correspondence of the generated PID, the address of the BD 2 and the printing data in the PID management table 32. Moreover, the PODS 4 transmits the generated new PID to the CS 3 (S7).

Figure 12:
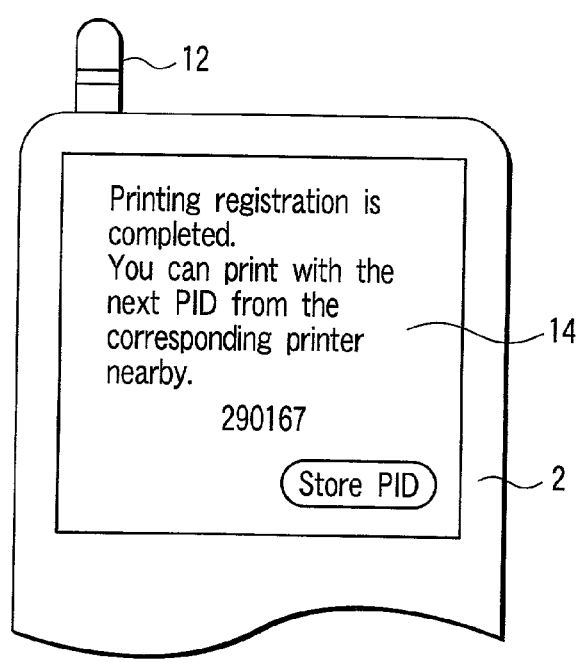
FIG. 12 is a diagram showing a display example in the BD display section.

The CS 3 transmits the received PID to the BD 2 having transmitted the request (S8). Thereby, as shown in FIG. 12, the display 14 of the BD 2 displays "The printing registration is completed. You can print the next PID from the corresponding printer nearby. 290167" together with a PID storage icon.

In this case, when the PID storage icon is selected, the PID is registered in the memory 21 of the BD 2.

Figure 13:
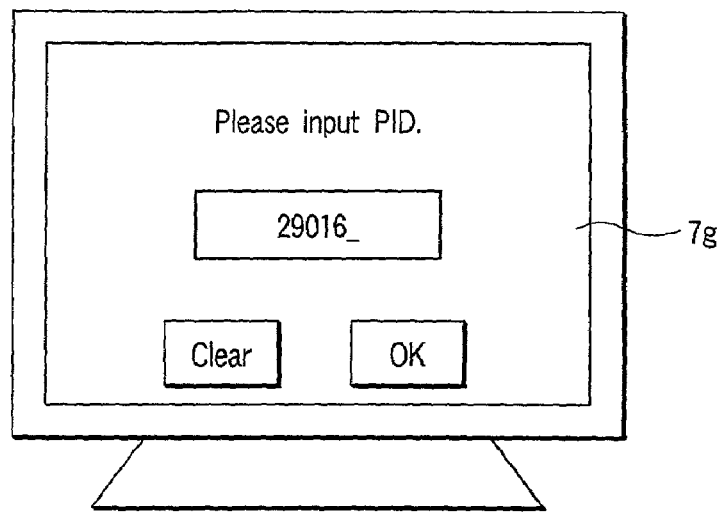
FIG. 13 is an explanatory view of an input guidance screen of PID.

After the PID is acquired, the user goes to the nearby installation place of the corresponding printer, and selects a print mode based on the PID by a touch panel screen of the PC 7. Then, the PC 7 judges the print mode based on the PID, and an input guidance screen indicating "Please input PID." is displayed in the touch panel screen of the operation display 7g as shown in FIG. 13. The user inputs the acquired PID "290167" based on the guidance.

Alternatively, the PID registered in the memory 21 is transmitted to the PC 7 by the data transfer function of the BD 2 such as Bluetooth (S9).

The PC 7 transmits the inputted PID to the PODS 4 (S10).

The PODS 4 judges the corresponding printing data from the PID management table 32 based on the received PID, reads the judged printing data from the storage 4c, and transmits the data to the PD 6 via the PC 7 (S11). The PD 6 prints/processes the received printing data. The paper P printed/processed by the PD 6 is outputted (S12).

Figure 14:
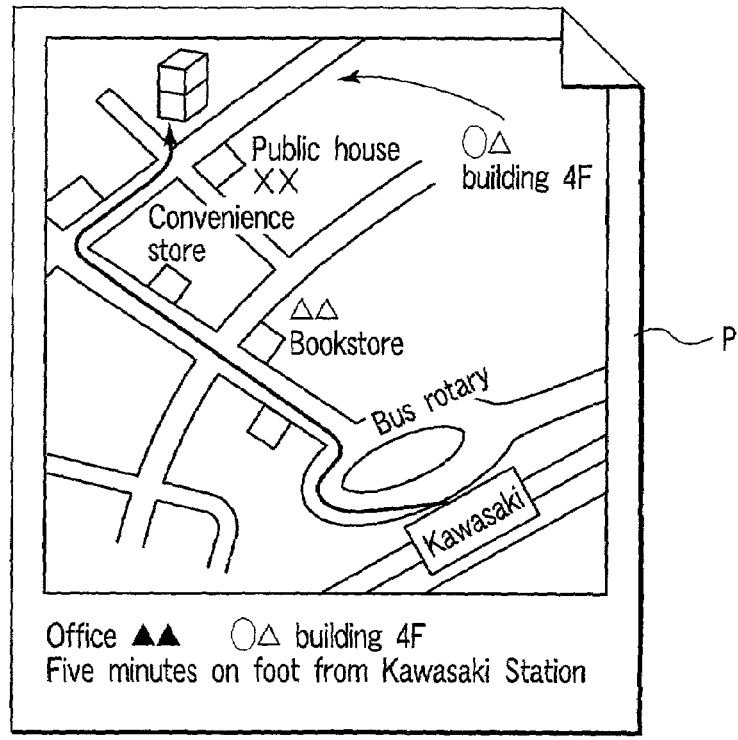
FIG. 14 is a diagram showing a guidance sentence and a printing example of detailed map information.

As a result, as shown in FIG. 14, a guidance sentence "Office, Building 32, five minutes on foot from Kawasaki Station", and detailed map information are printed on the paper P.

As described above, according to the first embodiment, the detailed image can be printed with respect to the display image of the BD regardless of display ability of the BD 2, and a printing service high in convenience can be provided.

Moreover, when the printing request is received from the BD 2 via the CS 3, the PODS 4 acquires the printing data in the PCDB 5, and stores the data in the storage 4c of the PODS 4. Therefore, the printing data can immediately be returned in response to an inquiry of PID from the PC 7.

Furthermore, in the first embodiment, it has been described that the PID inputted by the PC 7 or the PID transmitted to the PC 7 from the BD 2 is used to obtain the corresponding printing data from the PODS 4. However, the present invention is not limited to this. The PC 7 sends an inquiry to the PODS 4, the PODS 4 responds to the inquiry and returns a list of a plurality of PIDs registered in the PID management table 32 to the PC 7 having sent the inquiry, and the PC 7 displays the PID list, so that the corresponding printing data is obtained from the PODS 4 based on the PID selected by the PC 7. This case can be performed similarly as the first embodiment.

Moreover, in the first embodiment, when the BD 2 transmits the printing request to the CS 3, not only the mobile terminal number or the address but also the number or the address of PC 7 or PD 6 as a print destination are transmitted. Thereby, the number or the address of PC 7 or PD 6 as the print destination is also stored in the PID management table 32, and the printing data may be distributed to the PC 7 or PD 6. In this case, for example, the distributed printing data is registered in the HDD 7c based on the PID. Thereby, when the user inputs the PID, the corresponding printing data is read from the HDD 7c, and printed by the PC 7 or the PD 6 as the designated print destination. In this case, the processing of S10, S11 in FIG. 9 and steps 16, 17 in FIG. 10 can be omitted.

In the first embodiment, there is provided a simple data PID issue type controlled by the PODS 4.

In a processing procedure of a main part, (1) the BD 2 requests the CS 3 to print the data, (2) the CS 3 transmits the content of the printing request to the PODS 4, (3) the PODS 4 receives the printing data from the PCDB 5 in accordance with the received printing request content, (4) the PID corresponding to the printing request is issued by the PODS 4 and acquired by the CS 3, (5) the CS 3 transmits the PID to the BD 2, (6) the BD 2 transmits the PID to the PC 7, (7) the PC 7 transmits the PID received from the BD 2 to the PODS 4, (8) the PODS 4 transmits the printing data to the PC 7, (9) the PC 7 allows the PD 6 to execute the printing processing, and the information is printed.

A flow of PID is "PODS 4→CS 3→BD 2→PC 7→CS 3".

The flow of the printing data is "PCDB 5→PODS 4→PC 7→PD 6".

The data printed in this manner is print-only data (non-display, data).

The PODS 4 or the PC 7 performs a collation processing (associating) of the issued PID with the printing data. When the PC 7 performs the processing, the printing data can be distributed after issuance of the PID.

In the first embodiment, it is unnecessary to accumulate the printing data in the BD 2, the existing BD 2 can be utilized as it is, a security function and 31 fee charging can easily be realized by utilizing the PID, and a print-only output result can advantageously be obtained.

Moreover, the BD acquires the printing ID (hereinafter referred to as the PID) issued by the PODS through the CS, the BD transmits the PID to the PC, the PC receives the printing data from the PCDB through the PODS, and the data can be printed through the PD.

Furthermore, when the PID is generated on the PODS, the PCDB transmits the corresponding printing data to the PODS, and a data transmission request to the PODS is received from the PC. In this case, the data on the PODS can be directly transmitted to the PC.

Additionally, when the PID is generated on the PODS, the PCDB does not transmit the corresponding printing data to the PODS, and the data transmission request to the PODS is received from the PC. In this case, the data on the PCDB is received by the PODS, and transmitted to the PC.

Moreover, the PC receives the PID from the BD, and subsequently it is detected that the printing data cannot correctly be acquired on the PC. In this case, the BD can be notified that the data cannot be acquired.

SECOND EMBODIMENT

In the first embodiment, it has been described that on receiving the printing request from the BD 2 via the CS 3, the PODS 4 acquires the printing data in the PCDB 5, and stores the data in the storage 4c in the PODS 4. On the other hand, in a second embodiment, when the PODS 4 receives the printing request from the BD 2 via the CS 3, the PODS does not obtain the printing data in the PCDB 5. When there is an inquiry of PID from the PC 7, the PODS acquires the printing data in the PCDB 5, and returns the printing data to the PC 7. Additionally, the map ID is registered in the PID management table 32 instead of the printing data.

Figure 15:
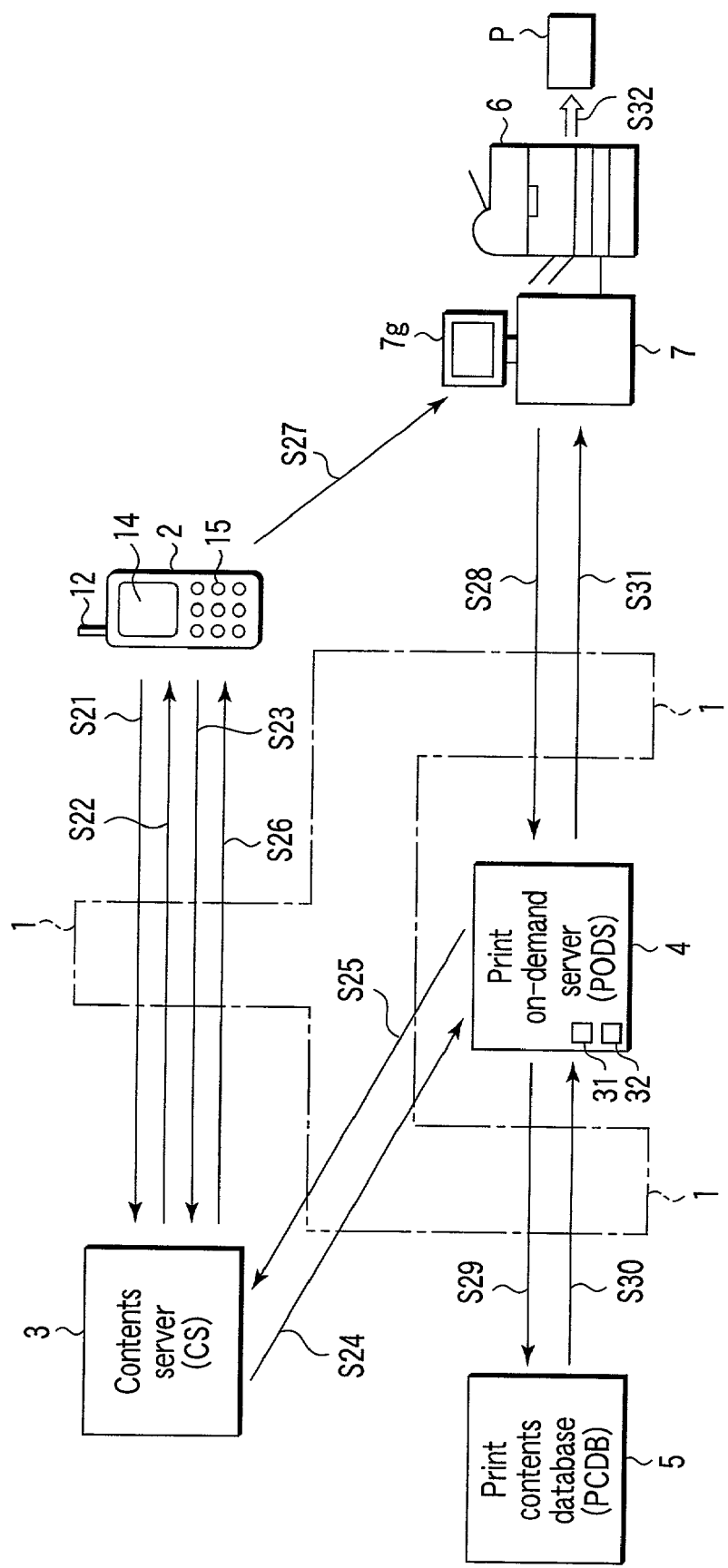
FIG. 15 is an explanatory view of the schematic constitution and the data transmission/reception state in a second embodiment.

An operation of the second embodiment will be described with reference to the data transmission/reception state shown in FIG. 15.

For example, the site of map information is selected, and the data of the outline map linearly shown in FIG. 11 is transmitted as the desired map information (map No. 1023: map ID) for the display 14 of the BD 2 to the BD 2 having transmitted the request from the CS 3 (S21, S22). Thereby, the display 14 of the BD 2 displays the outline map as linearly shown in FIG. 11. According to the display, the icon for the printing instruction is selected. By the selection, the BD 2 transmits the "printing request from the user 09012345678@abc.xyz with respect to the map No. 1023"

to the CS 3 (S23). The CS 3 transmits the printing request from the BD 2 to the PODS 4 (S24).

Thereby, the PODS 4 generates the new PID "290167" as the number for this printing, and registers the correspondence of the generated PID, the address of the BD 2 and the map ID in the PID management table 32. Moreover, the PODS 4 transmits the new generated PID to the CS 3 (S25).

The CS 3 transmits the received PID to the BD 2 having transmitted the request (S26). Thereby, as shown in FIG. 12, the display 14 of the BD 2 displays "The printing registration is completed. You can print the next PID from the corresponding printer nearby. 290167" together with the PID storage icon.

In this case, when the PID storage icon is selected, the PID is registered in the memory 21 of the BD 2.

After the PID is acquired, the user goes to the nearby installation place of the corresponding printer, and selects the print mode based on the PID by the touch panel screen of the PC 7. Then, the PC 7 judges the print mode based on the PID, and the input guidance screen indicating "Please input the PID." is displayed in the touch panel screen of the operation display 7g as shown in FIG. 13. The user inputs the acquired PID "290167" based on the guidance.

Alternatively, the PID registered in the memory 21 is transmitted to the PC 7 by the data transfer function of the BD 2 such as Bluetooth (S27).

The PC 7 transmits the inputted PID to the PODS 4 (S28).

The PODS 4 refers to the PID management table 32 and registered place table 31, reads "map ID=1023" corresponding to the PID "290167", specifies the registered place of the printing data in the PCDB 5 corresponding to the read "map ID=1023" as "map/kanagawa/kawasaki/17", and acquires the printing data from the registered place (S29, S30).

Subsequently, the PODS 4 transmits the acquired printing data to the PD 6 via the PC 7 (S31). The PD 6 subjects the received printing data to the printing processing. The paper P printed/processed by the PD 6 is outputted (S32).

As a result, as shown in FIG. 14, the guidance sentence "Office, Building 32, five minutes on foot from Kawasaki Station", and detailed-map information are printed on the paper P.

As described above, according to the second embodiment, the detailed image can be printed with respect to the display image of the BD 2 regardless of the display ability of the BD 2, and the printing service high in convenience can be provided.

Moreover, the PODS 4 obtains the printing data stored in the PCDB 5 and returns to the PC 7 in response to the inquiry of the PID from the PC 7. Therefore, the PODS 4 does not require a large-capacity memory Furthermore, in the second embodiment, it has been described that the PID inputted by the PC 7 or the PID transmitted to the PC 7 from the BD 2 is used to obtain the corresponding printing data from the PODS 4. However, the present invention is not limited to this. The PC 7 sends the inquiry to the PODS 4, the PODS 4 responds to the inquiry and returns the list of a plurality of PIDs registered in the PID management table 32 to the PC 7 having sent the inquiry, and the PC 7 displays the PID list, so that the corresponding printing data is obtained from the PODS 4 based on the PID selected by the PC 7. This case can also be performed as in the first embodiment.

In the second embodiment, there is provided the simple data PID issue type controlled by the PODS 4.

In the processing procedure of the main part, (1) the BD 2 requests the CS 3 to print the data, (2) the CS 3 transmits the content of the printing request to the PODS 4, (3) the PID corresponding to the printing request is issued by the PODS 4 and acquired by the CS 3, (4) the CS 3 transmits the PID to the BD 2, (5) the BD 2 transmits the PID to the PC 7, (6) the PC 7 transmits the PID received from the BD 2 to the PODS 4, (7) the PODS 4 obtains the printing data corresponding to the received PID from the PCDB 5, (8) the PODS 4 transmits the printing data to the PC 7, (9) the PC 7 allows the PD 6 to execute the printing processing, and the information is printed.

The flow of PID is "PODS 4→CS 3→BD 2→PC 7→CS 3".

The flow of the printing data is "PCDB 5→PODS 4→PC 7→PD 6".

The data printed in this manner is print-only data (non-display, data).

The PODS 4 or the PC 7 performs the collation processing (associating) of the issued PID with the printing data. When the PC 7 performs the processing, the printing data can be distributed after issuance of the PID.

In the second embodiment, it is unnecessary to accumulate the printing data in the BD 2, the existing BD 2 can be utilized as it is, the security function and fee charging can easily be realized by utilizing the PID, and the print-only output result can advantageously be obtained.

THIRD EMBODIMENT

Figure 16:
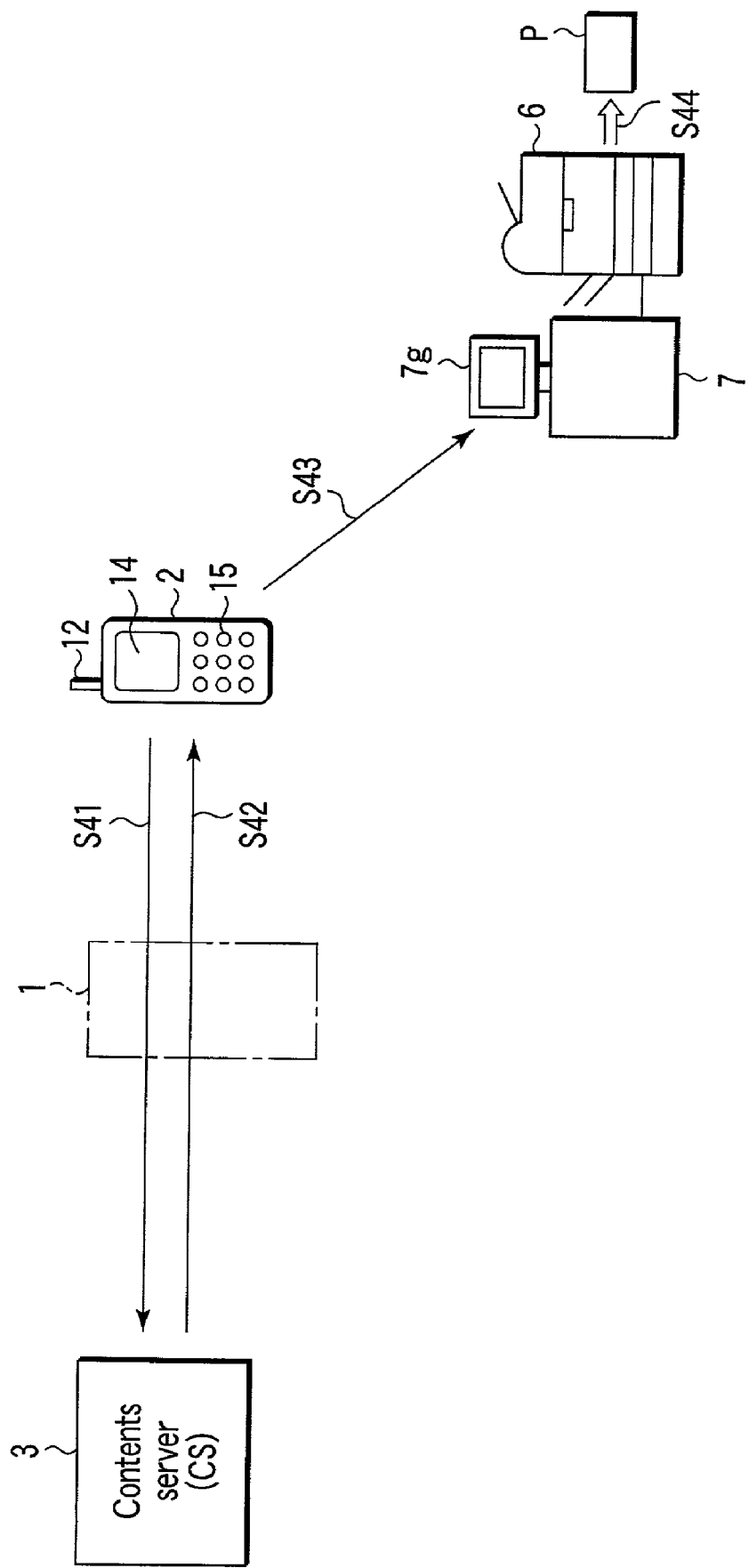
FIG. 16 is an explanatory view of the schematic constitution and the data transmission/reception state in a third embodiment.

As shown in FIG. 16, in the on-demand print system of a third embodiment, the browser device (BD) 2 as the mobile terminal on the information reception side, the contents server (CS) 3 as the information transmission apparatus on the information transmission side, and the printer controller (PC) 7 for controlling the printer device (PD) 6 are connected via the communication network such as Internet 1. Moreover, the BD 2 is connected to the PC 7 via radio by the Bluetooth function or via the cable. The third embodiment is constituted by omitting the PODS 4 and PCDB 5 from the first embodiment.

In the third embodiment, as the data read from the database 3d of the CS 3 in response to a supply request of contents from the BD 2, there is one type, that is, detailed printing data as print-only data which cannot be displayed in the display 14 of the BD 2, or there are two types, that is, the detailed printing data as the print-only data and simplified image data for the BD 2. The detailed printing data is data displayed in a personal computer, IA, or another rich client.

With one type of the detailed printing data, the control circuit 20 in the BD 2 has conversion software for converting the detailed printing data to simplified image data for the BD 2.

An operation of this case will be described with reference to the data transmission/reception state shown in FIG. 16.

For example, the site of map information is selected, and the detailed printing data shown in FIG. 14 is transmitted as the desired map information to the BD 2 having transmitted the request from the CS 3 (S41, S42). Thereby, the BD 2 converts the detailed printing data to data of the outline map linearly shown in FIG. 11 for the display 14 of the BD 2, and displays the data in the display 14. According to the display, the icon for the printing instruction is selected. In this case, based on the selection of the icon for the printing instruction, the detailed printing data for the BD 2 from the CS 3 before the conversion and the printing request are transmitted to the PC 7 by the data transfer function of the BD 2 (S43). Thereby, the PC 7 transmits the received detailed printing data to the PD 6 in response to the printing request. The PD 6 subjects the received printing data to the printing processing. The paper P printed/processed by the PD 6 is outputted (S44).

With two types of the detailed printing data and simplified image data, the control circuit 20 in the BD 2 registers the detailed printing data and simplified image data in the memory 21, and switches and uses the data.

An operation of this case will be described with reference to the data transmission/reception state shown in FIG. 16.

For example, the site of map information is selected, and the detailed printing data shown in FIG. 14 and the simplified image data linearly shown in FIG. 11 are transmitted as the desired map information to the BD 2 having transmitted the request from the CS 3 (S41, S42). Thereby, the BD 2 displays the simplified image data in the display 14. According to the display, the icon for the printing instruction is selected. In this case, based on the selection of the icon for the printing instruction, the printing request and detailed printing data are transmitted to the PC 7 by the data transfer function of the BD 2 (S43). Thereby, the PC 7 transmits the received detailed printing data to the PD 6 in response to the printing request. The PD 6 subjects the received printing data to the printing processing. The paper P printed/processed by the PD 6 is outputted (S44).

In the third embodiment, there is provided a simple data transmission/printing type.

In the processing procedure of the main part, (1) the BD 2 receives/displays the information of the CS 3, (2) the BD 2 instructs the PC 7 to print the data, and transfers the printing data stored in the BD 2 to the PC 7, (3) the PC 7 allows the PD 6 to execute the printing processing, and the information is printed.

The flow of the printing data is "CS 3→BD 2→PC 7→PD 6".

Therefore, the communication of the BD 2 to PC 7 is possible both by radio and by wire (cable communication), and the printed data may be either information displayable on the BD 2 or information undisplayable on the BD 2.

In the third embodiment, the BD 2 can advantageously be utilized as one type of mobile storage.

Moreover, the BD transmits the received data directly to the PC, and the PC receives the printing data from the BD via the PD. Thereafter, the PC judges whether the received data can be printed, and it is judged that the data cannot be printed. In this case, even when the connection of the BD to the PC is cut/terminated, the BD can be notified that the data cannot be printed.

FOURTH EMBODIMENT

Figure 17:
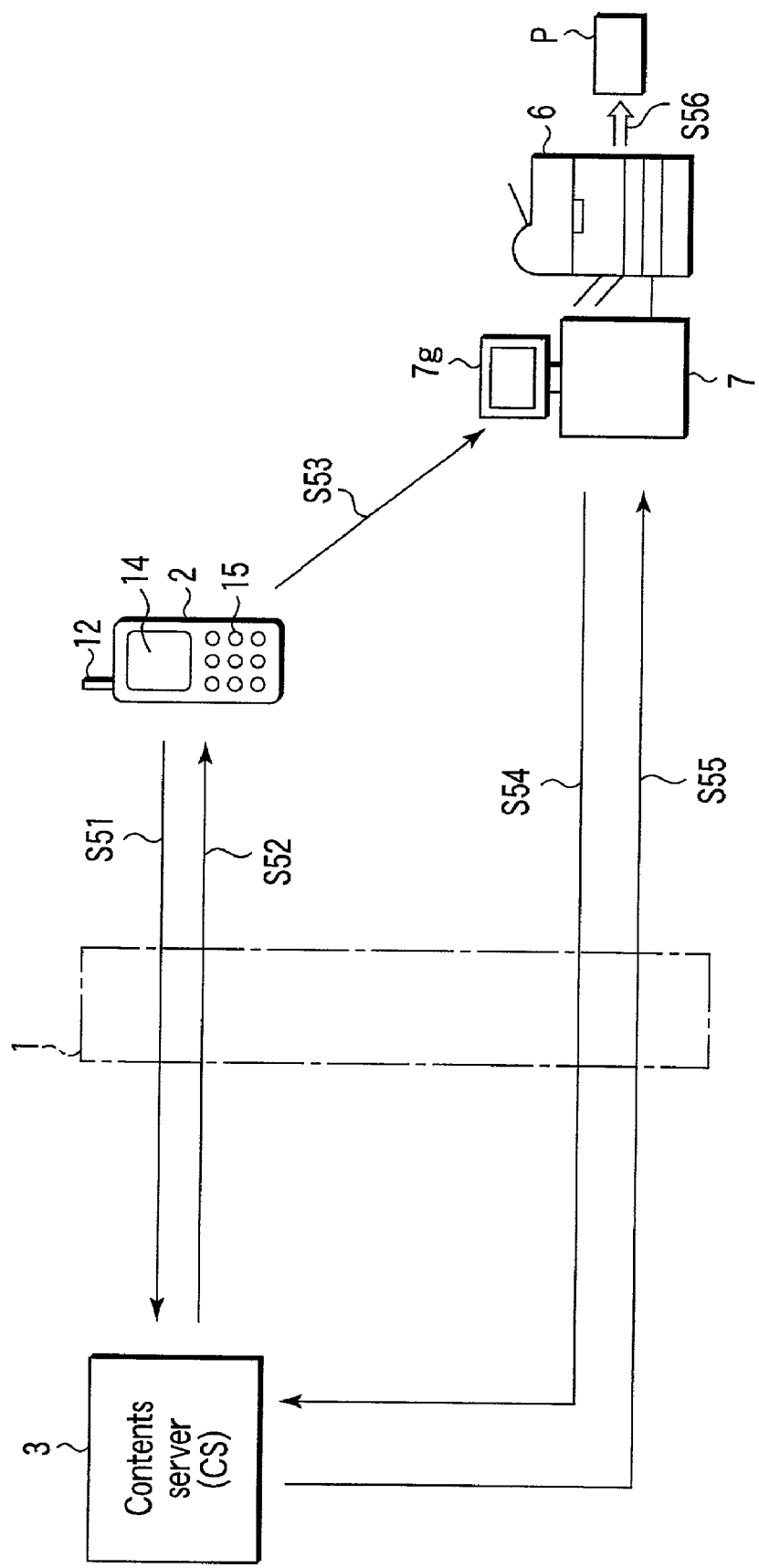
FIG. 17 is an explanatory view of the schematic constitution and the data transmission/reception state in a fourth embodiment.

As in the third embodiment, as shown in FIG. 17, in the on-demand print system of a fourth embodiment, the browser device (BD) 2 as the mobile terminal on the information reception side, the contents server (CS) 3 as the information transmission apparatus on the information transmission side, and the printer controller (PC) 7 for controlling the printer device (PD) 6 are connected via the communication network such as Internet 1. The BD 2 is connected to the PC 7 via radio by the Bluetooth function or via the cable. The fourth embodiment is constituted by omitting the PODS 4 and PCDB 5 from the first embodiment.

In the fourth embodiment, the printing request from the BD 2 is transmitted to the PC 7 together with link information such as the address. The PC 7 having received the printing request downloads the detailed printing data or the simplified image data for the BD 2 as the print-only data via Internet 1 based on the link information such as the address.

A timing for the downloading by the PC 7 is an optimum time when the printing request from the BD 2 is supplied, when the next printing request is supplied, or between when the printing request from the BD 2 is supplied and when the next printing request is supplied. The optimum time is a timing based on scheduling of the PD 6 when the efficiency of the network is satisfactory.

An operation in the timing of the downloading by the PC 7 immediately after the printing request from the BD 2 is supplied will be described with reference to the data transmission/reception state shown in FIG. 17.

For example, the site of map information is selected, and the outline map data linearly shown in FIG. 11 is transmitted to the BD 2 having transmitted the request from the CS 3 (S51, S52). Thereby, the BD 2 displays the outline map data by the display 14. According to the display, the icon for the printing instruction is selected. In this case, based on the selection of the icon for the printing instruction, the printing request and the address of the home page as the link data are transmitted to the PC 7 by the data transfer function of the BD 2 (S53). Thereby, the PC 7 instructs the CS 3 to download the contents based on the address received together with the printing request (S54). The CS 3 reads the detailed printing data of the contents based on the address or the simplified image data from the database 3d, and transmits the data to the PC 7 (S55), so that the contents are downloaded.

Thereby, the PC 7 transmits the downloaded detailed printing data or simplified image data to the PD 6. The PD 6 subjects the received printing data to the printing processing. The paper P printed/processed by the PD 6 is outputted (S56).

As described above, when the BD transmits the information (URL, and the like) for specifying the existence position of the data received by the BD to the PC, the PC downloads/obtains the data as a printing object from the CS based on the information received by the PC, and the data can be printed through the PD.

Moreover, the PC receives the printing data from the BD, thereafter the PC judges whether the received data can be printed, and it is judged that the data cannot be printed. In this case, even when the connection of the BD to the PC is cut/terminated, the BD can be notified that the data cannot be printed.

Furthermore, after receiving the information for specifying the existence position of the data from the BD, the PC immediately acquires the data as the printing object based on the received information. In this case, even when a data content is updated later, the previous information can be printed.

Additionally, after receiving the information for specifying the existence position of the data from the BD, instead of immediately obtaining the data as the printing object based on the received information, the PC acquires and prints the printing data on receiving the next printing request. Therefore, the (latest) information at the time of the printing request can be obtained as a printed matter.

Moreover, after receiving the information for specifying the existence position of the data from the BD, instead of immediately obtaining the data as the printing object based on the received information, the PC can acquire the printing data at an optimum time until the next printing request is received.

According to the fourth embodiment, there is provided a simple data PULL printing type.

In the processing procedure of the main part, (1) the BD 2 receives/displays the information of the CS 3, (2) the BD 2 instructs the PC 7 to print the data, and informs the PC 7 of the location/address of the data to be printed, (3) the PC 7 downloads the printing data from the CS 3, (4) the PC 7 allows the PD 6 to execute the printing processing, and the information is printed.

The flow of the printing data is "CS 3→PC 7→PD 6".

Moreover, the communication of the BD 2 to PC 7 is possible both by radio and by wire (cable communication), and the printed data may be either the information displayable on the BD 2 or the information undisplayable on the BD 2.

In the fourth embodiment, it is advantageously unnecessary to store the printing data in the BD 2.

Moreover, when the BD transmits the information (URL, and the like) for specifying the existence position of the data received by the BD to the PC, the PC acquires the data as the printing object based on the received information, and the data can be printed through the PD.

Furthermore, after the PC receives the information for specifying the existence position of the data from the BD, the PC cannot acquire the data as the printing object based on the received information. In this case, even when the connection of the BD to the PC is cut/terminated, the BD can be notified that the data cannot be acquired.

Additionally, after receiving the information for specifying the existence position of the data from the BD, the PC immediately acquires the data as the printing object based on the received information. In this case, even when the data content is updated later, the previous information can be printed.

Moreover, after receiving the information for specifying the existence position of the data from the BD, instead of immediately obtaining the data as the printing object based on the received information, the PC acquires and prints the printing data on receiving the next printing request. Therefore, the (latest) information at the time of the printing request can be obtained as the printed matter.

Furthermore, after receiving the information for specifying the existence position of the data from the BD, instead of immediately obtaining the data as the printing object based on the received information, the PC can acquire the printing data at the optimum time until the next printing request is received.

FIFTH EMBODIMENT

Figure 18:
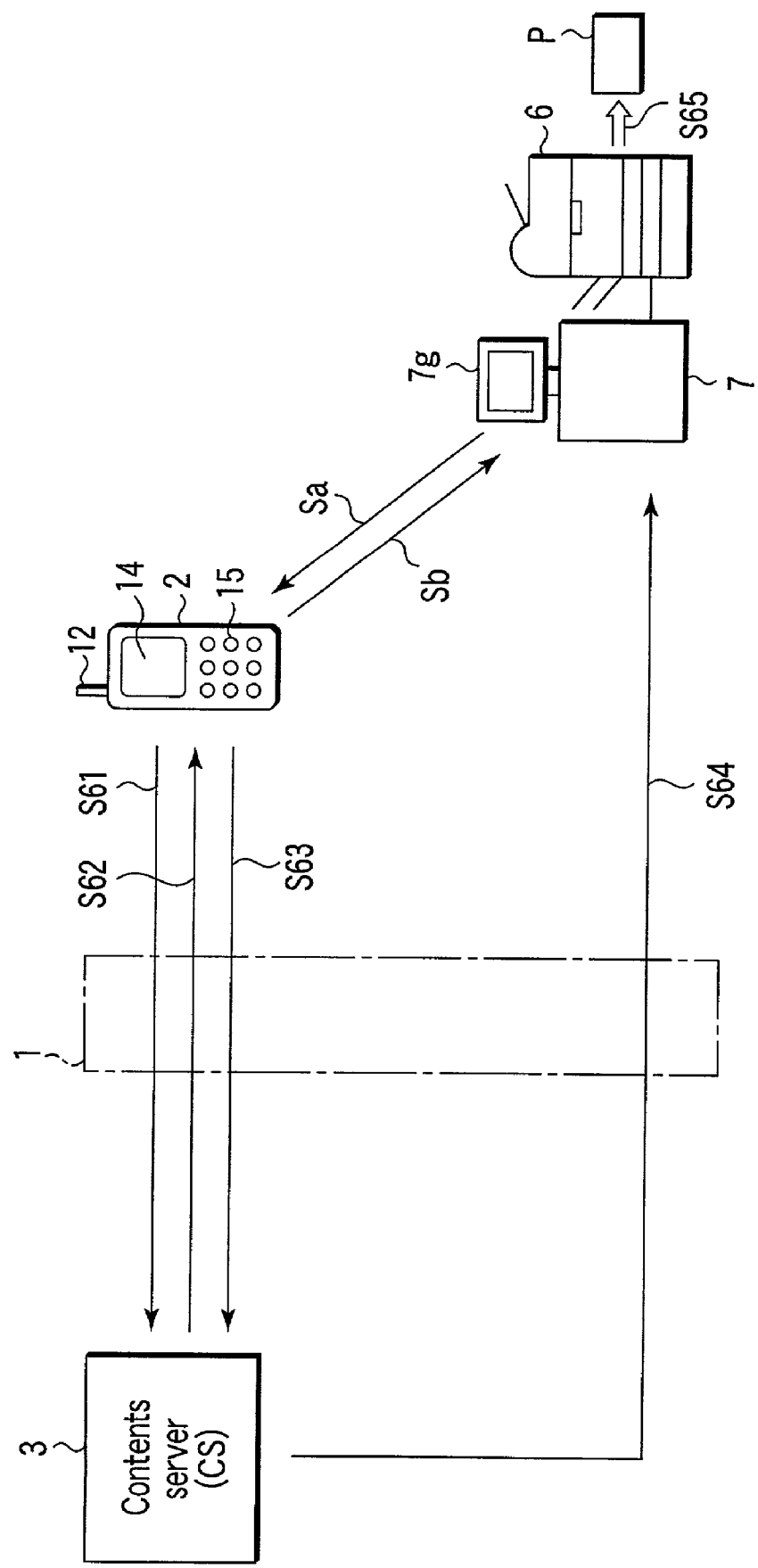
FIG. 18 is an explanatory view of the schematic constitution and the data transmission/reception state in a fifth embodiment.

As in the third embodiment, as shown in FIG. 18, in the on-demand print system of a fifth embodiment, the browser device (BD) 2 as the mobile terminal on the information reception side, the contents server (CS) 3 as the information transmission apparatus on the information transmission side, and the printer controller (PC) 7 for controlling the printer device (PD) 6 are connected via the communication network such as Internet 1. The BD 2 is connected to the PC 7 via radio by the Bluetooth function or via the cable. The fifth embodiment is constituted by omitting the PODS 4 and PCDB 5 from the first embodiment.

In the fifth embodiment, the printing request from the BD 2 is transmitted to the CS 3 together with an address for designating the PD 6 (PC 7) for performing the printing. The CS 3 having received the printing request reads the detailed printing data or the simplified image data registered in the home page address corresponding to the printing request from the database 3d. The detailed printing data or the simplified image data is downloaded with respect to the PD 6 (PC 7) corresponding to the address via Internet 1, and printed.

The PD 6 (PC 7) for printing the data is designated automatically or manually before the printing request is transmitted.

The designation automatically performed beforehand will be described. In this case, the inquiry is made with respect to the PD 6 (PC 7) nearby by the Bluetooth function of the BD 2. The PD 6 (PC 7) responds to this inquiry, and returns its own address in Internet 1 to the BD 2 (Sa). Thereby, when the BD 2 transmits the printing request, the address is also transmitted together with the printing request.

Moreover, a printing destination setting mode is set in accordance with the instruction of the operator 15 of the BD 2, and the number of the arbitrary PD 6 (PC 7) nearby may be inputted and set.

Furthermore, when the printing data from the CS 3 is downloaded onto the PC 7, the printing processing is performed. However, the printing processing may be performed after an authentication processing.

That is, a phone number of the BD 2 having transmitted the printing request is added as an authentication number to the printing data downloaded to the PC 7 from the CS 3, and the data is transmitted. When the printing data from the CS 3 is downloaded onto the PC 7, the PC 7 requests the BD 2 to transmit the phone number of the BD 2. After the authentication processing is performed by judging that the returned phone number (Sb) meets the phone number added to the printing data, the printing processing is performed.

In this manner, after confirmation is made by authentication, the printing can be performed, so that security is enhanced.

An operation of the fifth embodiment will be described with reference to the data transmission/reception state shown in FIG. 18.

For example, the site of map information is selected, and the outline map data linearly shown in FIG. 11 is transmitted to the BD 2 having transmitted the request from the CS 3 (S61, S62). Thereby, the BD 2 displays the outline map data by the display 14. According to the display, the icon for the printing instruction is selected. In this case, based on the selection of the icon for the printing instruction, the printing request and the address of the PC 7 as a predetermined printing destination are transmitted to the CS 3 (S63). Thereby, the CS 3 reads the detailed printing data of the contents based on (the address) of the outline map data or the simplified image data from the database 3d, and transmits the data to the PC 7 (S64), so that the data are downloaded.

Thereby, the PC 7 transmits the downloaded detailed printing data or simplified image data to the PD 6. The PD 6 subjects the received printing data to the printing processing. The paper P printed/processed by the PD 6 is outputted (S65).

As described above, when the BD requests the CS to print the presently opened home page, and the like, the printing data of the corresponding home page can be read from the database of the CS, transmitted to the PC, and printed through the PD. In this case, the BD determines the PD for printing the data by inquiry/response with respect to the PC nearby. The address of the PC (PD) as the printing destination is added to the printing request, and transmitted to the CS from the BD, and the CS can be notified of a transmission destination and printing destination.

In this case, the PC (PD) as the printing destination may be displayed by the display 14, so that a possessor of the BD can know the destination.

Moreover, the inquiry/response of BD with respect to the PC (PD) has been described, but the present invention is not limited to this. The BD may determine the printing destination by a one-sided notification from the PC (PD).

Furthermore, the number of PC (PD) may be inputted with keys to designate the printing by the operator 15 of the BD.

According to the fifth embodiment, there is provided a simplified data PUSH printing type.

In the processing procedure of the main part, (1) the BD 2 transmits the printing instruction to the CS 3, (2) the CS 3 transmits the printing data to the PC 7, (3) the PC 7 allows the PD 6 to execute the printing processing, and the information is printed.

The flow of the printing data is "CS 3→PC 7→PD 6".

Therefore, the printed data may be either the information able to be displayed on the BD 2 or the information unable to be displayed on the BD 2.

In some cases, the PC 7 transmits the information for specifying the PC 7 to the BD 2 before (b 1).

In other cases, a start instruction of the printing processing is issued by operation on the PC 7 or transmission of the data to the PC 7 from the BD 2 before (3).

In the fifth embodiment, it is unnecessary to store the printing data in the BD 2, and the existing BD 2 can advantageously be utilized as it is.

Moreover, when the BD requests the CS to print the data, the printing data is transmitted to the PC from the CS, and can be printed through the PD.

Furthermore, the CS receives the printing request from the BD, and subsequently it is detected that the printing data cannot correctly be processed on the PC as the transmission destination of the printing data (or the data cannot be correctly printed by the PD). In this case, the BD can be notified that it is impossible to print the data.

SIXTH EMBODIMENT

As shown in FIG. 19, in the on-demand print system of a sixth embodiment, the browser device (BD) 2 as the mobile terminal on the information reception side, the contents server (CS) 3 as the information transmission apparatus on the information transmission side, the PCDB 5 for storing the printing contents (detailed printing data, print-only data) and the printer controller (PC) 7 for controlling the printer device (PD) 6 are connected via the communication network such as Internet 1. Moreover, the BD 2 is connected to the PC 7 via radio by the Bluetooth function or via the cable. The sixth embodiment is constituted by deleting the PODS 4 from the first embodiment.

The PCDB 5 is a database for storing the printing contents (detailed printing data, print-only data), and is managed by the contents server (CS) 3 in the sixth embodiment. Thereby, the CS 3 has the registered place table 31.

An operation of the sixth embodiment will be described with reference to the data transmission/reception state shown in FIG. 19.

For example, the site of map information is selected, and the data of the outline map linearly shown in FIG. 11 is transmitted as the desired map information (map No. 1023: map ID) for the display 14 of the BD 2 to the BD 2 having transmitted the request from the CS 3 (S71, S72). Thereby, the display 14 of the BD 2 displays the outline map as linearly shown in FIG. 11. According to the display, the icon for the printing instruction is selected. By the selection, the BD 2 transmits the "printing request from the user 09012345678@abc.xyz with respect to the map No. 1023" to the CS 3 (S73).

Subsequently, the CS 3 refers to the registered place table 31, specifies the registered place of the printing data in the PCDB 5 corresponding to "map ID=1023" as "map/kanagawa/kawasaki/17", and acquires the printing data from the registered place (S74, S75).

Subsequently, the CS 3 transmits the acquired printing data to the BD 2 having transmitted the printing request (S76). Thereby, after the BD 2 once registers the received printing data in the memory 21, the BD transmits the printing data registered in the memory 21 to the PD 6 via the PC 7 by the data transfer function such as Bluetooth (S77). The PD 6 subjects the received printing data to the printing processing. The paper P printed/processed by the PD 6 is outputted (S78).

As a result, as shown in FIG. 14, the guidance sentence "Office, Building 32, five minutes on foot from Kawasaki Station", and detailed map information are printed on the paper P.

As described above, when the BD requests the CS to print the presently opened home page, and the like, the printing data of the corresponding home page can be read from the PCDB managed by the CS, and transmitted to the BD via the CS. When the BD transmits the printing data received by the BD directly to the PC, the printing data can be printed through the PD.

In the aforementioned example, one piece of printing data has been described, but the data may be selected from a plurality of pieces of data. In this case, for example, a list of printing data for each home page is registered in the CS 3, and a function of synthesizing and outputting the registered list of the printing data is added.

Figure 20:
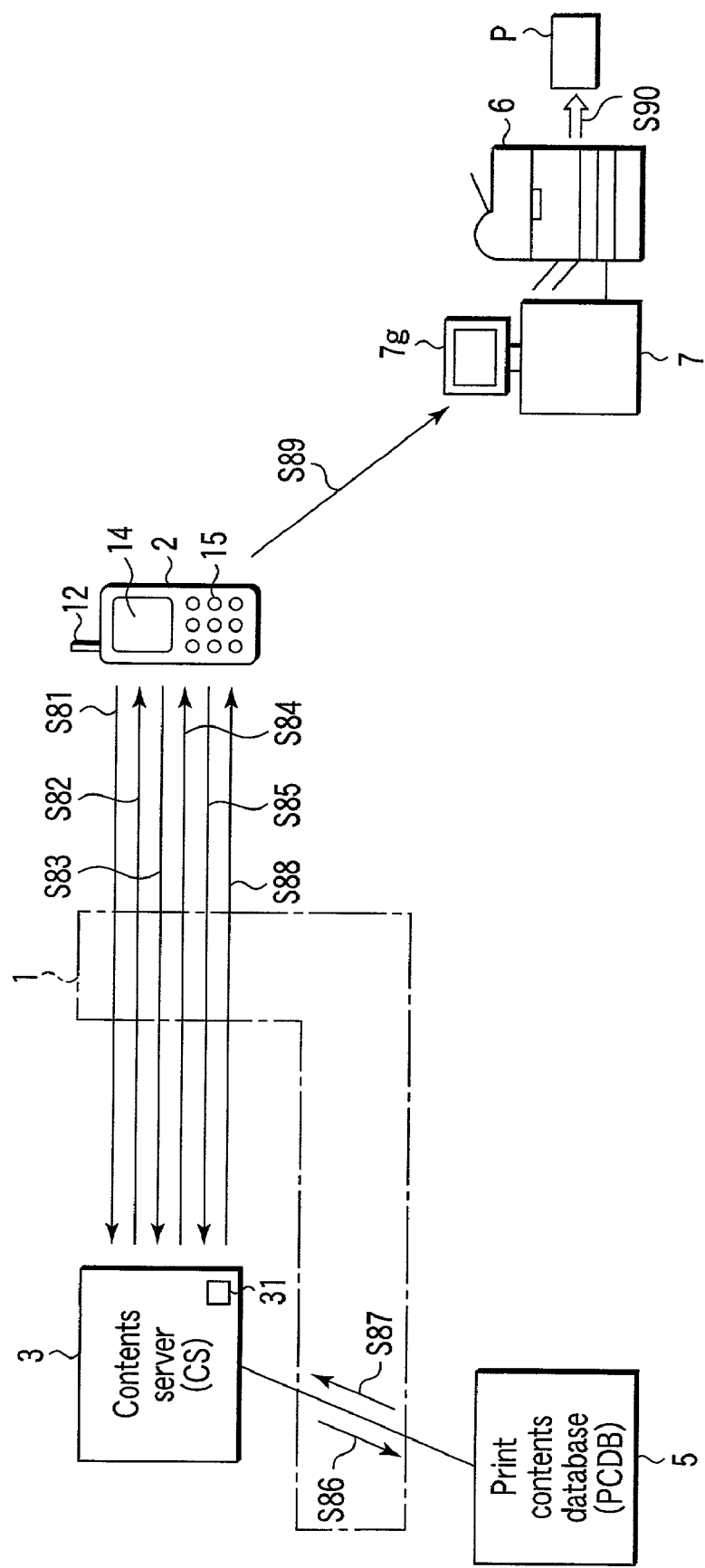
FIG. 20 is an explanatory view of the schematic constitution and the data transmission/reception state in a seventh embodiment.

The operation will be described with reference to the data transmission/reception state shown in FIG. 20.

For example, the site of map information is selected, and the data of the outline map linearly shown in FIG. 11 is transmitted as the desired map information (map No. 1023: map ID) for the display 14 of the BD 2 to the BD 2 having transmitted the request from the CS 3 (S81, S82). Thereby, the display 14 of the BD 2 displays the outline map as linearly shown in FIG. 11. According to the display, the possessor of the BD 2 selects the icon for the printing instruction. By the selection, the BD 2 transmits the "printing request from the user 09012345678@abc.xyz with respect to the map No. 1023" to the CS 3 (S83).

Subsequently, the CS 3 synthesizes the list of the printing data corresponding to "map ID=1023", generates a selection list of printing data, and transmits the list to the BD 2 having transmitted the printing request (S84). Thereby, the BD 2 displays the received selection list of printing data by the display 14. For example, a map constituted by dividing and enlarging the map, various types of maps for different purposes (for a car, vehicle, walker), and the like can be selected.

The possessor of the BD 2 selects the desired printing data from the display. After the selection, the BD 2 transmits a selected content to the CS 3 (S85).

Subsequently, the CS 3 refers to the registered place table 31, specifies the registered place of the printing data in the PCDB 5, and acquires the printing data from the registered place (S86, S87).

Subsequently, the CS 3 transmits the acquired printing data to the BD 2 having transmitted the printing request (S88). Thereby, after the BD 2 once registers the received printing data in the memory 21, the BD transmits the printing data registered in the memory 21 to the PD 6 via the PC 7 by the data transfer function such as Bluetooth (S89). The PD 6 subjects the received printing data to the printing processing. The paper P printed/processed by the PD 6 is outputted (S90).

According to the sixth embodiment, there is provided an exclusive data transmission/printing type.

The processing procedure of the main part comprises: (1) receiving the printing data by the BD 2 from the PCDB 5 via the CS 3, (2) instructing the PC 7 to print the data, and transmitting the printing data stored in the BD 2 to the PC 7 by the BD 2, and (3) executing the printing processing by the PD 6 via the PC 7, so that the information is printed.

The flow of the printing data is "PCDB 5→CS 3→BD 2→PC 7→PD 6".

Therefore, the communication of the BD 2 to PC 7 is possible both by radio and by wire (cable communication), and the printed data is the print-only data (non-displayed data).

In the sixth embodiment, the BD 2 can advantageously be utilized as one type of mobile storage, and a print-only output result is advantageously obtained.

Moreover, the BD transmits the data received from the PCDB via the CS directly to the PC, the data can be printed through the PD.

Furthermore, the PC receives the printing data from the BD, thereafter the PC judges whether the received data can be printed, and it is judged that the data cannot be printed. In this case, even when the connection of the BD to the PC is cut/terminated, the BD can be notified that the data cannot be printed.

SEVENTH EMBODIMENT

Figure 21:
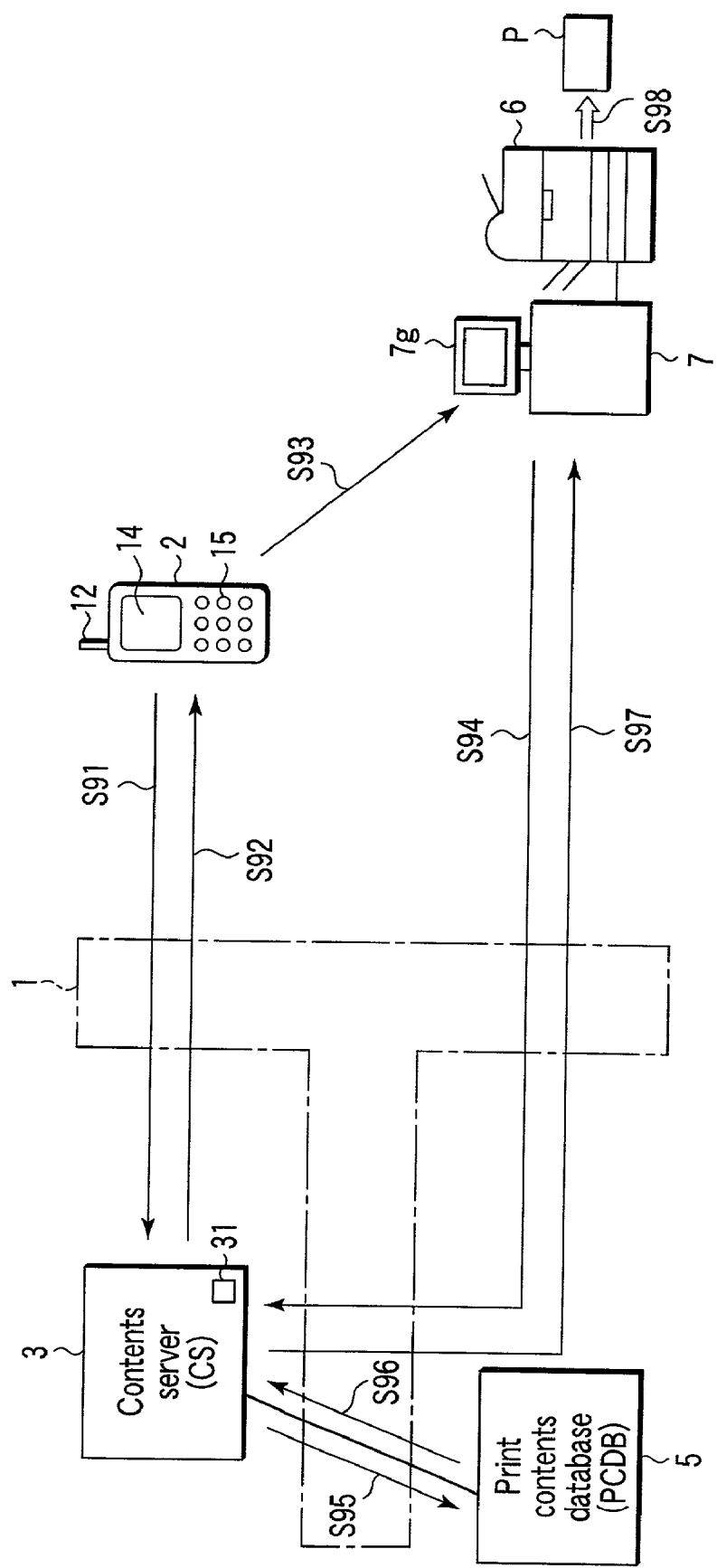
FIG. 21 is an explanatory view of the schematic constitution and the data transmission/reception state in the seventh embodiment.

As shown in FIG. 21, in the on-demand print system of a seventh embodiment, the browser device (BD) 2 as the mobile terminal on the information reception side, the contents server (CS) 3 as the information transmission apparatus on the information transmission side, the PCDB 5 for storing the printing contents (detailed printing data, print-only data) and the printer controller (PC) 7 for controlling the printer device (PD) 6 are connected via the communication network such as Internet 1. Moreover, the BD 2 is connected to the PC 7 via radio by the Bluetooth function or via the cable. The seventh embodiment is constituted by deleting the PODS 4 from the first embodiment.

The PCDB 5 is a database for storing the printing contents (detailed printing data, print-only data), and is managed by the contents server (CS) 3 in the seventh embodiment. Thereby, the CS 3 has the registered place table 31.

In the seventh embodiment, the printing request from the BD 2 is transmitted to the PC 7 together with the link information such as the address. The PC 7 having received the printing request downloads the detailed printing data as the print-only data from the PCDB 5 managed by the CS 3 via the CS 3 based on the link information such as the address via Internet 1.

A timing for the downloading by the PC 7 is an optimum time when the printing request from the BD 2 is supplied, when the next printing request is supplied, or between when the printing request from the BD 2 is supplied and when the next printing request is supplied. The optimum time is a timing based on scheduling of the PD 6 when the efficiency of the network is satisfactory.

An operation in the timing of the downloading by the PC 7 immediately after the printing request from the BD 2 is supplied will be described with reference to the data transmission/reception state shown in FIG. 21.

For example, the site of map information is selected, and the outline map data linearly shown in FIG. 11 is transmitted to the BD 2 having transmitted the request from the CS 3 (S91, S92). Thereby, the BD 2 displays the outline map data by the display 14. According to the display, the icon for the printing instruction is selected. In this case, based on the selection of the icon for the printing instruction, the printing request and the address of the home page as the link data are transmitted to the PC 7 by the data transfer function of the BD 2 (S93). Thereby, the PC 7 instructs the CS 3 to download the contents based on the address received together with the printing request (S94).

Subsequently, the CS 3 refers to the registered place table 31, specifies the registered place of the printing data in the PCDB 5, and acquires the printing data from the registered place (S95, S96).

Subsequently, the CS 3 transmits the acquired printing data to the PC 7 having transmitted the printing request (S97), so that the data is downloaded.

Thereby, the PC 7 transmits the downloaded detailed printing data to the PD 6. The PD 6 subjects the received printing data to the printing processing. The paper P printed/processed by the PD 6 is outputted (S98).

As described above, when the BD transmits the information (URL, and the like) for specifying the existence position of the data received by the BD to the PC, the PC downloads/acquires the data as the printing object from the PCDB managed by the CS based on the information received by the PC, and the data can be printed through the PD.

Moreover, the PC receives the printing data from the BD, thereafter the PC judges whether the received data can be printed, and it is judged that the data cannot be printed. In this case, even when the connection of the BD to the PC is cut/terminated, the BD can be notified that the data cannot be printed.

Furthermore, after receiving the information for specifying the existence position of the data from the BD, the PC immediately acquires the data as the printing object based on the received information. In this case, even when the data content is updated later, the previous information can be printed.

Additionally, after receiving the information for specifying the existence position of the data from the BD, instead of immediately obtaining the data as the printing object based on the received information, the PC acquires and prints the printing data on receiving the next printing request. Therefore, the (latest) information at the time of the printing request can be obtained as the printed matter.

Moreover, after receiving the information for specifying the existence position of the data from the BD, instead of immediately obtaining the data as the printing object based on the received information, the PC can acquire the printing data at the optimum time until the next printing request is received.

In the aforementioned example, one piece of printing data has been described, but the data may be selected from a plurality of pieces of data. In this case, for example, a list of printing data for each home page is registered in the CS 3, and a function of synthesizing and outputting the registered list of the printing data is added.

Figure 22:
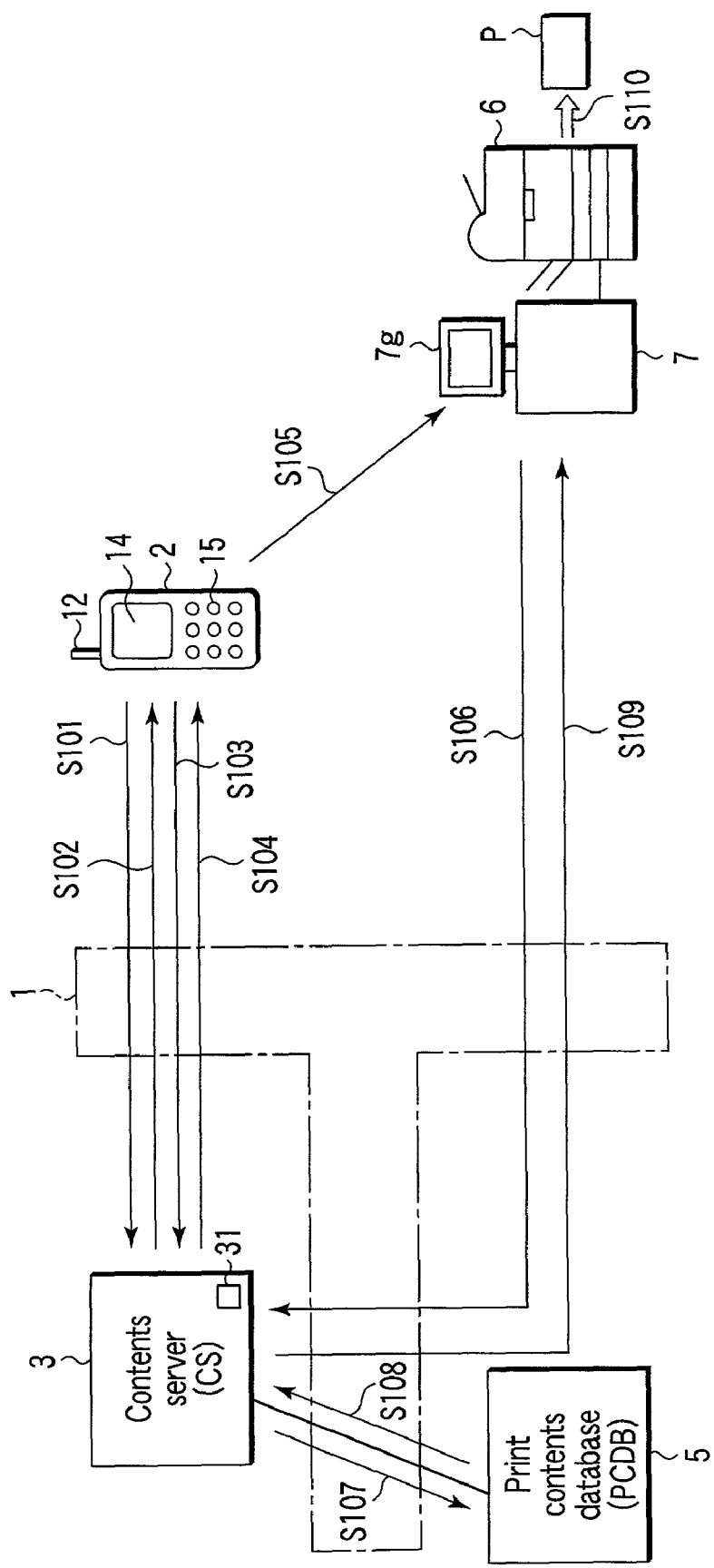
FIG. 22 is an explanatory view of the schematic constitution and the data transmission/reception state in the seventh embodiment.

The operation will be described with reference to the data transmission/reception state shown in FIG. 22.

For example, the site of map information is selected, and the data of the outline map linearly shown in FIG. 11 is transmitted to the BD 2 having transmitted the request from the CS 3 (S101, S102). Thereby, the display 14 of the BD 2 displays the outline map data. Based on the display, the possessor of the BD 2 selects the icon for the printing instruction. In this case, based on the selection of the icon for the printing instruction, the printing request is transmitted to the CS 3 (S103).

Thereby, the CS 3 synthesizes the list of the printing data corresponding to "map ID=1023", generates the selection list of printing data, and transmits the list to the BD 2 having transmitted the printing request (S104). Thereby, the BD 2 displays the received selection list of printing data by the display 14. For example, the map constituted by dividing and enlarging the map, various types of maps for different purposes (for the car, vehicle, walker), and the like can be selected. The map ID or the address of the PCDB 5 is added to these maps.

The possessor of the BD 2 selects the desired printing data from the display. According to the selection, the BD 2 transmits the printing request and the link data such as the map ID and the address of the PCDB 5 to the PC 7 by the data transfer function (S105). Thereby, the PC 7 transmits an instruction for downloading the printing data to the CS 3 based on the map ID or the address of the PCDB 5 received together with the printing request (S106).

Thereby, the CS 3 refers to the registered place table 31 in accordance with the map ID, specifies the registered place of the printing data in the PCDB 5, and acquires the printing data from the registered place (S107, S108). Alternatively, the printing data is acquired based on the address.

Subsequently, the CS 3 transmits the acquired printing data to the PC 7 having transmitted the printing request (S109), so that the data is downloaded.

Thereby, the PC 7 transmits the downloaded detailed printing data to the PD 6. The PD 6 subjects the received printing data to the printing processing. The paper P printed/processed by the PD 6 is outputted (S110).

According to the seventh embodiment, there is provided an exclusive data PULL printing type.

In the processing procedure of the main part, (1) the BD 2 receives/displays the information of the CS 3, (2) the BD 2 instructs the PC 7 to print the data, and informs the PC 7 of the location/address of the data to be printed, (3) the PC 7 downloads the printing data from the PCDB 5 via the CS 3, (4) the PC 7 allows the PD 6 to execute the printing processing, and the information is printed.

The flow of the printing data is "PCDB 5→CS 3→PC 7→PD 6".

Thereby, the communication of the BD 2 to PC 7 is possible both by radio and by wire (cable communication), and the printed data is the print-only data (non-displayed data).

In the seventh embodiment, it is unnecessary to store the printing data in the BD 2, and the print-only output result is obtained.

Moreover, when the BD transmits the information (URL, and the like) for specifying the existence position of the data received by the BD to the PC, the PC acquires the data as the printing object based on the received information, and the data can be printed through the PD.

Furthermore, after the PC receives the information for specifying the existence position of the data from the BD, the PC cannot acquire the data as the printing object based on the received information. In this case, even when the connection of the BD to the PC is cut/terminated, the BD can be notified that the data cannot be acquired.

Additionally, after receiving the information for specifying the existence position of the data from the BD, the PC immediately acquires the data as the printing object based on the received information. In this case, even when the data content is updated later, the previous information can be printed.

Moreover, after receiving the information for specifying the existence position of the data from the BD, instead of immediately obtaining the data as the printing object based on the received information, the PC acquires and prints the printing data on receiving the next printing request. Therefore, the (latest) information at the time of the printing request can be obtained as the printed matter.

Furthermore, after receiving the information for specifying the existence position of the data from the BD, instead of immediately obtaining the data as the printing object based on the received information, the PC can acquire the printing data at the optimum time until the next printing request is received.

Data for BD display on the CS is associated beforehand with the printing data on the PCDB, and the result is managed by the CS. In this case, the information for specifying the existence position of the BD displaying data can be converted to the information for specifying the position of the print-only data.

EIGHTH EMBODIMENT

As shown in FIG. 21, in the on-demand print system of an eighth embodiment, the browser device (BD) 2 as the mobile terminal on the information reception side, the contents server (CS) 3 as the information transmission apparatus on the information transmission side, the PCDB 5 for storing the printing contents (detailed printing data, print-only data), and the printer controller (PC) 7 for controlling the printer device (PD) 6 are connected via the communication network such as Internet 1. Moreover, the BD 2 is connected to the PC 7 via radio by the Bluetooth function or via the cable. The eight embodiment is constituted by omitting the PODS 4 from the first embodiment.

The PCDB 5 is a database for storing the printing contents (detailed printing data, print-only data), and is managed by the contents server (CS) 3 in the eighth embodiment. Thereby, the CS 3 has the registered place table 31.

In the eighth embodiment, the printing request from the BD 2 is transmitted to the CS 3 together with the address for designating the PD 6 (PC 7) for printing the data. The CS 3 having received the printing request reads the detailed printing data registered in the home page address corresponding to the printing request from the database 3d. The detailed printing data is downloaded from the PCDB 5 managed by the CS 3 via the CS 3, and printed with respect to the PD 6 (PC 7) corresponding to the address via Internet 1.

The PD 6 (PC 7) for printing the data is designated automatically or manually before the printing request is transmitted.

The designation automatically performed beforehand will be described. In this case, the inquiry is made with respect to the PD 6 (PC 7) nearby by the Bluetooth function of the BD 2. The PD 6 (PC 7) responds to this inquiry, and returns its own address in Internet 1 to the BD 2 (Sa). Thereby, when the BD 2 transmits the printing request, the address is also transmitted together with the printing request. Moreover, the printing destination setting mode is set in accordance with the instruction of the operator 15 of the BD 2, and the number of the arbitrary PD 6 (PC 7) nearby may be inputted and set.

Furthermore, when the printing data from the CS 3 is downloaded onto the PC 7, the printing processing is performed. However, the printing processing may be performed after the authentication processing.

That is, the phone number of the BD 2 having transmitted the printing request is added as the authentication number to the printing data downloaded to the PC 7 from the CS 3, and the data is transmitted. When the printing data from the CS 3 is downloaded onto the PC 7, the PC 7 requests the BD 2 to transmit the phone number of the BD 2. After the authentication processing is performed by judging that the returned phone number (Sb) meets the phone number added to the printing data, the printing processing is performed.

In this manner, after confirmation is made by authentication, the printing can be performed, so that the security is enhanced.

An operation of the eighth embodiment will be described with reference to the data transmission/reception state shown in FIG. 23.

For example, the site of map information is selected, and the data of the outline map linearly shown in FIG. 11 is transmitted to the BD 2 having transmitted the request from the CS 3 (S411, S412). Thereby, the display 14 of the BD 2 displays the outline map data. According to the display, the icon for the printing instruction is selected. In this case, based on the selection of the icon for the printing instruction, the address of the PC 7 as the printing destination predetermined as the "printing request from the user 09012345678@abc.xyz with respect to the map No. 1023" is transmitted to the CS 3 (S413).

Thereby, the CS 3 refers to the registered place table 31, specifies the registered place of the printing data in the PCDB 5 corresponding to "map ID=1023", as "map/kanagawa/kawasaki/17", and acquires the printing data from the registered place (S414, S415). Subsequently, the CS 3 transmits the acquired printing data to the PC 7 as the printing destination (S416), so that the data is downloaded.

Thereby, the PC 7 transmits the downloaded detailed printing data to the PD 6. The PD 6 subjects the received printing data to the printing processing. The paper P printed/processed by the PD 6 is outputted (S417).

As described above, when the BD requests the CS to print the presently opened home page, and the like, the printing data of the corresponding home page can be read from the PCDB managed by the CS, transmitted to the PC, and printed through the PD. In this case, the BD determines the PD for printing the data by inquiry/response with respect to the PC nearby. The address of the PC (PD) as the printing destination is added to the printing request, and transmitted to the CS from the BD, and the CS can be notified of the transmission destination and printing destination.

In this case, the PC (PD) as the printing destination may be displayed by the display 14, so that the possessor of the BD can know the PC (PD) as the printing destination.

Moreover, the inquiry/response by the BD with respect to the PC (PD) has been described, but the present invention is not limited to this. The BD may determine the printing destination by the one-sided notification from the PC (PD).

Furthermore, the number of PC (PD) may be inputted with the keys to designate the printing by the operator 15 of the BD.

According to the eighth embodiment, there is provided an exclusive data PUSH printing type.

In the processing procedure of the main part, (1) the BD 2 transmits the printing instruction to the CS 3, (2) the PCDB 5 transmits the printing data to the PC 7 via the CS 3, (3) the PC 7 allows the PD 6 to execute the printing processing, and the information is printed.

The flow of the printing data is "PCDB 5→CS 3→PC 7→PD 6".

Therefore, the printed data is the print-only data (non-displayed data). In some cases, the PC 7 transmits the information for specifying the PC 7 to the BD 2 before (1). In other cases, the start instruction of the printing processing is issued by the operation on the PC 7 or the transmission of the data to the PC 7 from the BD 2 before (3).

In the eighth embodiment, it is unnecessary to store the printing data in the BD 2, the existing BD 2 can be utilized as it is, and the print-only output result is advantageously obtained.

Moreover, when the BD requests the CS to print the data, the printing data is transmitted to the PC from the PCDB via the CS, and can be printed through the PD.

Furthermore, the CS receives the printing request from the BD, and subsequently it is detected that the printing data on the corresponding PCDB cannot correctly be processed on the PC of the transmitted address (or cannot correctly be printed by the PD). In this case, the BD can be notified that the data cannot be printed.

NINTH EMBODIMENT

Figure 24:
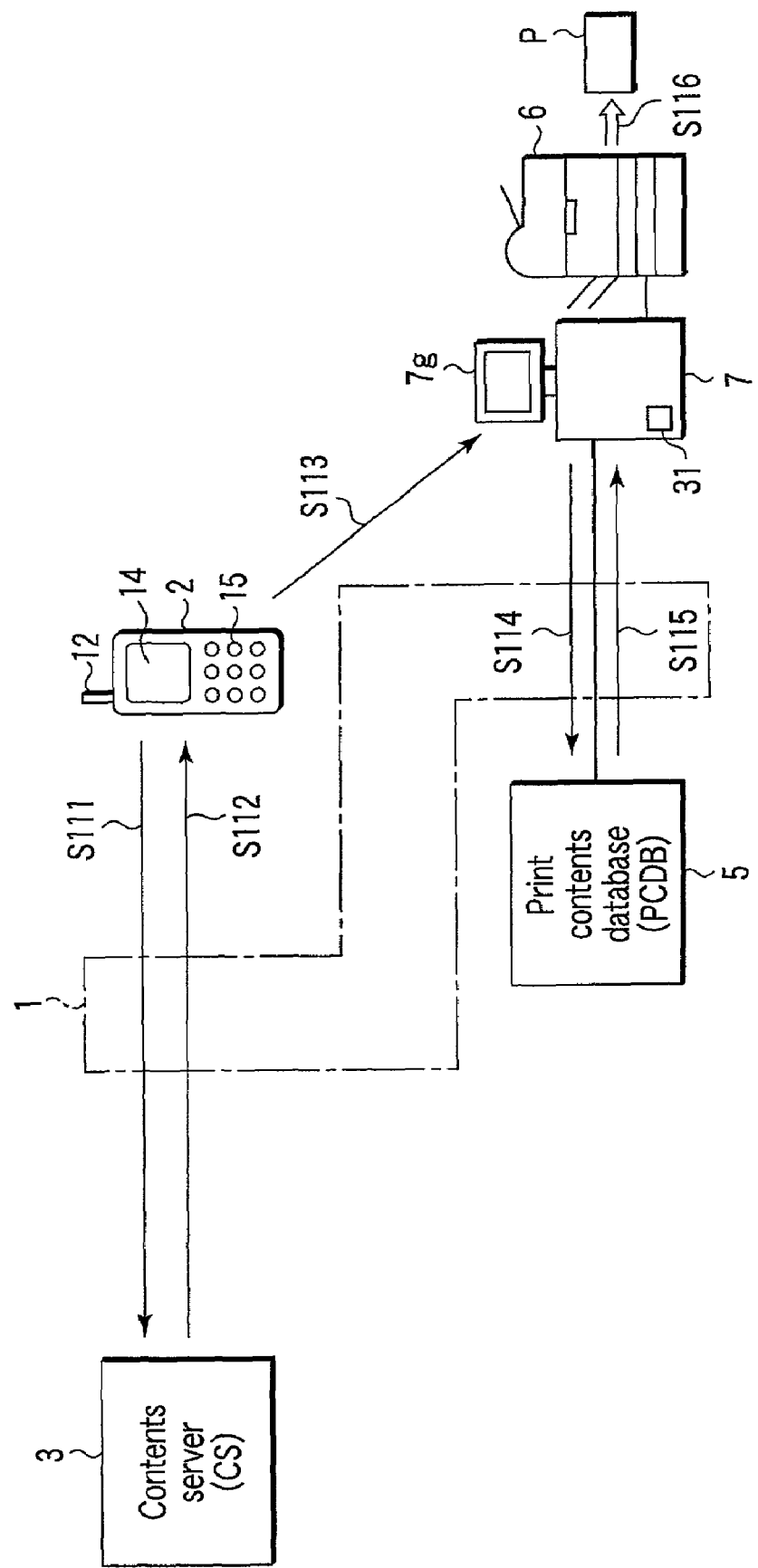
FIG. 24 is an explanatory view of the schematic constitution and the data transmission/reception state in a ninth embodiment.

As shown in FIG. 24, in the on-demand print system of a ninth embodiment, the browser device (BD) 2 as the mobile terminal on the information reception side, the contents server (CS) 3 as the information transmission apparatus on the information transmission side, the PCDB 5 for storing the printing contents (detailed printing data, print-only data), and the printer controller (PC) 7 for controlling the printer device (PD) 6 are connected via the communication network such as Internet 1. Moreover, the BD 2 is connected to the PC 7 via radio by the Bluetooth function or via the cable. The ninth embodiment is constituted by omitting the PODS 4 from the first embodiment.

The PCDB 5 is a database for storing the printing contents (detailed printing data, print-only data), and is managed by the printer controller (PC) 7 in the ninth embodiment. Thereby, the PC 7 has the registered place table 31.

An operation of the ninth embodiment will be described with reference to the data transmission/reception state shown in FIG. 24.

For example, the site of map information is selected, and the data of the outline map linearly shown in FIG. 11 for the display 14 of the BD 2 is transmitted as the desired map information (map No. 1023: map ID) to the BD 2 having transmitted the request from the CS 3 (S111, S112). Thereby, the display 14 of the BD 2 displays the outline map as linearly shown in FIG. 11. According to the display, the icon for the printing instruction is selected. In accordance with the selection, the BD 2 transmits the "printing request from the user 09012345678@abc.xyz with respect to the map No. 1023" to the PC 7 (S113).

Thereby, the PC 7 refers to the registered place table 31, specifies the registered place of the printing data in the PCDB 5 corresponding to "map ID=1023" as "map/kanagawa/kawasaki/17", and acquires the printing data from the registered place (S114, S115).

Subsequently, the PC 7 transmits the acquired printing data to the PD 6. The PD 6 subjects the received printing data to the printing processing. The paper P printed/processed by the PD 6 is outputted (S116).

As a result, as shown in FIG. 14, the guidance sentence "Office, Building 32, five minutes on foot from Kawasaki Station", and detailed map information are printed on the paper P.

As described above, when the BD requests the PC to print the presently opened home page, and the like, the printing data of the corresponding home page can be read from the PCDB managed by the PC, transmitted directly to the PC, and printed through the PD.

According to the ninth embodiment, there is provided the exclusive data PULL printing type led by the printer.

In the processing procedure of the main part, (1) the BD 2 receives/displays the information of the CS 3, (2) the BD 2 instructs the PC 7 to print the data, and informs the PC 7 of the location/address of the data to be printed, (3) the PC 7 downloads the printing data from the PCDB 5, (4) the PC 7 allows the PD 6 to execute the printing processing, and the information is printed.

The flow of the printing data is "PCDB 5→PC 7→PD 6".

Thereby, the communication of the BD 2 to PC 7 is possible both by radio and by wire (cable communication), and the printed data is the print-only data (non-displayed data).

In the ninth embodiment, it is unnecessary to store the printing data in the BD 2, and the print-only output result is advantageously obtained.

Moreover, when the BD transmits the information (URL, and the like) for specifying the existence position of the data received by the BD to the PC, the PC acquires the data as the printing object based on the received information, and the data can be printed through the PD.

Furthermore, after the PC receives the information for specifying the existence position of the data from the BD, the PC cannot acquire the data as the printing object based on the received information. In this case, even when the connection of the BD to the PC is cut/terminated, the BD can be notified that the data cannot be acquired.

Additionally, after receiving the information for specifying the existence position of the data from the BD, the PC immediately acquires the data as the printing object based on the received information. In this case, even when the data content is updated later, the previous information can be printed.

Moreover, after receiving the information for specifying the existence position of the data from the BD, instead of immediately obtaining the data as the printing object based on the received information, the PC acquires and prints the printing data on receiving the next printing request. Therefore, the (latest) information at the time of the printing request can be obtained as the printed matter.

Furthermore, after receiving the information for specifying the existence position of the data from the BD, instead of immediately obtaining the data as the printing object based on the received information, the PC can acquire the printing data at the optimum time until the next printing request is received.

Additionally, the data for BD display on the CS is associated beforehand with the printing data on the PCDB, and the result is managed by the PC. In this case, the information for specifying the existence position of the BD displaying data can be converted to the information for specifying the position of the print-only data.

TENTH EMBODIMENT

Figure 25:
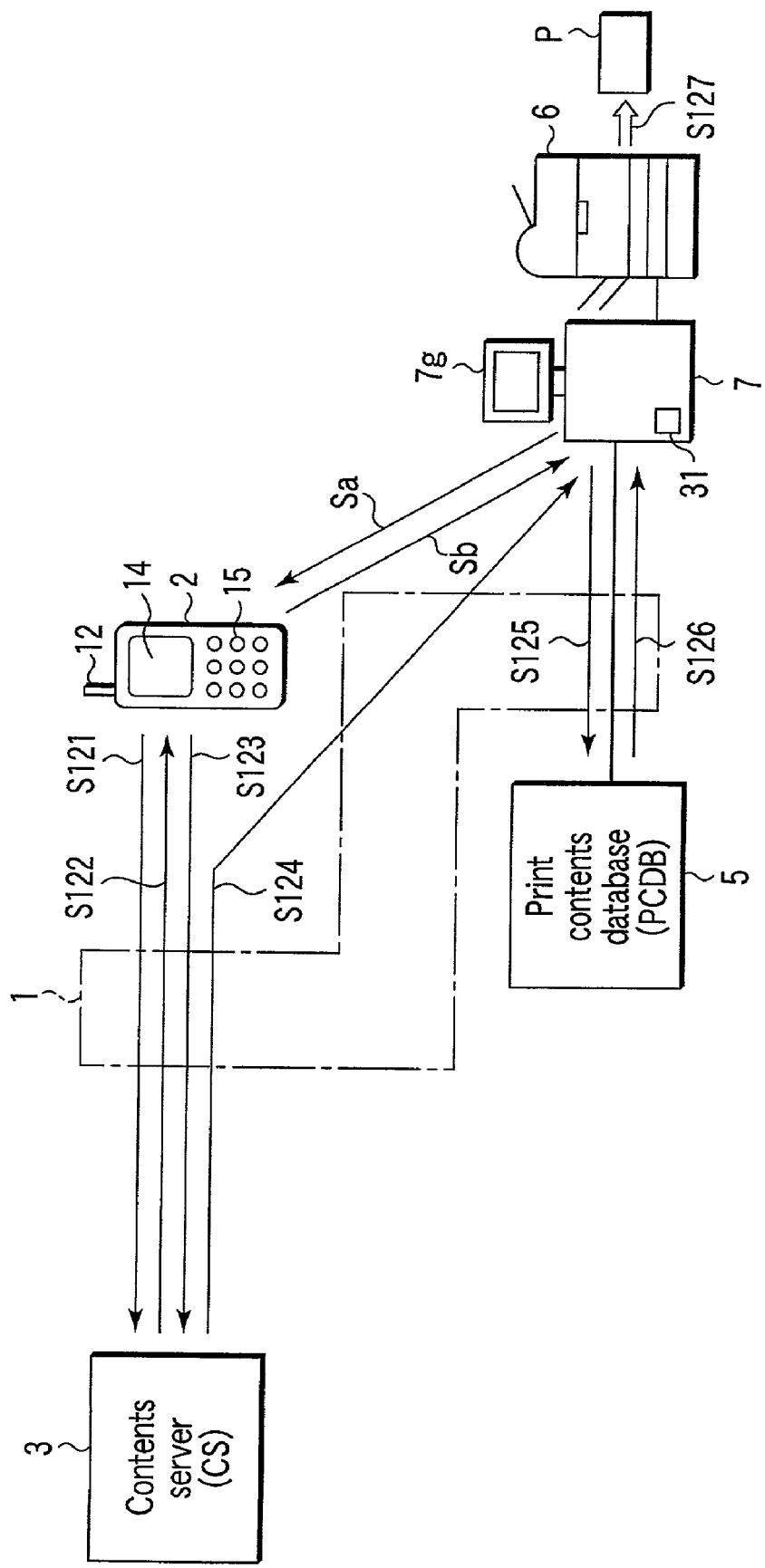
FIG. 25 is an explanatory view of the schematic constitution and the data transmission/reception state in a tenth embodiment.

As shown in FIG. 25, in the on-demand print system of a tenth embodiment, the browser device (BD) 2 as the mobile terminal on the information reception side, the contents server (CS) 3 as the information transmission apparatus on the information transmission side, the PCDB 5 for storing the printing contents (detailed printing data, print-only data), and the printer controller (PC) 7 for controlling the printer device (PD) 6 are connected via the communication network such as Internet 1. Moreover, the BD 2 is connected to the PC 7 via radio by the Bluetooth function or via the cable. The tenth embodiment is constituted by omitting the PODS 4 from the first embodiment.

The PCDB 5 is a database for storing the printing contents (detailed printing data, print-only data), and is managed by the printer controller (PC) 7 in the tenth embodiment. Thereby, the PC 7 has the registered place table 31 in which the registered place of the printing data in the PCDB 5 is stored using the address of the home page as the key.

In the tenth embodiment, the printing request from the BD 2 is transmitted to the CS 3 together with the address for designating the PC 7 for printing the data. The CS 3 having received the printing request transmits the printing request and the home page address corresponding to this printing request to the PC 7 corresponding to the address for designating the PC 7. The printing data is downloaded from the PCDB managed by the PC 7, and printed.

The PD 6 (PC 7) for printing the data is designated automatically or manually before the printing request is transmitted.

The designation automatically performed beforehand will be described. In this case, the inquiry is made with respect to the PD 6 (PC 7) nearby by the Bluetooth function of the BD 2. The PD 6 (PC 7) responds to this inquiry, and returns its own address in Internet 1 to the BD 2 (Sa). Thereby, when the BD 2 transmits the printing request, the address is also transmitted together with the printing request.

Moreover, the printing destination setting mode is set in accordance with the instruction of the operator 15 of the BD 2, and the number of the arbitrary PD 6 (PC 7) nearby may be inputted and set.

Furthermore, when the link information from the CS 3 is transmitted to the PC 7, the printing processing is performed. However, the printing processing may be performed after the authentication processing.

That is, the phone number of the BD 2 having transmitted the printing request is added as the authentication number to the link information transmitted to the PC 7 from the CS 3, and the information is transmitted. When the link information from the CS 3 is supplied to the PC 7, the PC 7 requests the BD 2 to transmit the phone number of the BD 2. After the authentication processing is performed by judging that the returned phone number (Sb) meets the phone number added to the link information, the downloading of the printing data and the printing processing are performed.

In this manner, after confirmation is made by authentication, the printing can be performed, so that the security is enhanced.

An operation of the tenth embodiment will be described with reference to the data transmission/reception state shown in FIG. 25.

For example, the site of map information is selected, and the data of the outline map linearly shown in FIG. 11 for the display 14 of the BD 2 is transmitted as the desired map information (map No. 1023: map ID) to the BD 2 having transmitted the request from the CS 3 (S121, S122). Thereby, the display 14 of the BD 2 displays the outline map as linearly shown in FIG. 11. According to the display, the icon for the printing instruction is selected. According to this selection, the BD 2 transmits the "printing request from the user 09012345678@abc.xyz with respect to the map No. 1023" to the CS 3 (S123). The CS 3 transmits the printing request and the address of the home page as the link data to the PC 7 based on the printing request from the BD 2 (S124). Thereby, the PC 7 refers to the registered place table 31, specifies the registered place of the printing data in the PCDB 5, and acquires the printing data from the registered place (S125, S126).

Thereby, the PC 7 transmits the acquired printing data to the PD 6. The PD 6 subjects the received printing data to the printing processing. The paper P printed/processed by the PD 6 is outputted (S127).

As described above, when the BD requests the PC predetermined via the CS to print the presently opened home page, and the like, the printing data of the corresponding home page can be read from the PCDB managed by the PC, transmitted directly to the PC, and printed through the PD.

According to the tenth embodiment, there is provided the exclusive data PUSH printing type lead by the printer.

In the processing procedure of the main part, (1) the BD 2 transmits the printing instruction to the CS 3, (2) the CS 3 transmits the location/address of the printing data to the PC 7, (3) the PC 7 downloads the printing data from the PCDB 5, (4) the PC 7 allows the PD 6 to execute the printing processing, and the information is printed.

The flow of the printing data is "PCDB 5→PC 7→PD 6".

Therefore, the printed data is the print-only data (non-displayed data). In some cases, the PC 7 transmits the information for specifying the PC 7 to the BD 2 before (1). In other cases, the start instruction of the printing processing is issued by the operation on the PC 7 or the transmission of the data to the PC 7 from the BD 2 before (3).

In the tenth embodiment, it is unnecessary to store the printing data in the BD 2, the existing BD 2 can be utilized as it is, and the print-only output result is advantageously obtained.

Moreover, when the BD requests the CS to print the data, the information (URL, and the like) for specifying the existence position of the data is transmitted to the PC from the CS, the PC receives the printing data from the PCDB based on the information, and the data can be printed through the PD.

Furthermore, the CS transmits the information (URL, and the like) for specifying the existence position of the data to the PC, and subsequently it is detected that the printing data on the corresponding PCDB cannot correctly be processed on the PC (or cannot correctly be printed by the PD). In this case, the BD can be notified that the data cannot be printed.

Additionally, the BD displaying data on the CS is associated beforehand with the printing data on the PCDB, and the result is managed by the PC. In this case, the information for specifying the existence position of the BD displaying data can be converted to the information for specifying the position of the print-only data.

ELEVENTH EMBODIMENT

As shown in FIG. 26, in the on-demand print system of an eleventh embodiment, the browser device (BD) 2 as the mobile terminal on the information reception side, the contents server (CS) 3 as the information transmission apparatus on the information transmission side, the PCDB 5 for storing the printing contents (detailed printing data, print-only data), and the printer controller (PC) 7 for controlling the printer device (PD) 6 are connected via the communication network such as Internet 1. Moreover, the BD 2 is connected to the PC 7 via radio by the Bluetooth function or via the cable. The eleventh embodiment is constituted by omitting the PODS 4 from the first embodiment.

The PCDB 5 is a database for storing the printing contents (detailed printing data, print-only data), and is managed by the printer controller (PC) 7 in the tenth embodiment. Thereby, the PC 7 has the registered place table 31 in which the registered place of the printing data in the PCDB 5 is stored using the address of the home page as the key.

The operation of the eleventh embodiment will be described with reference to the data transmission/reception state shown in FIG. 26.

For example, the site of map information is selected, and the data of outline map linearly shown in FIG. 11 is transmitted as the desired map information (map No. 1023: map ID) for the display 14 of the BD 2 to the BD 2 having transmitted the request from the CS 3 (S131, 132). Thereby, the display 14 of the BD 2 displays the outline map as linearly shown in FIG. 11. According to the display, the icon for printing instruction is selected. By the selection, the BD 2 transmits the "printing request from user 09012345678@abc.xyz with respect to map No. 1023" to the CS 3 (S133). The CS 3 transmits the printing request from the BD 2, the home page address as the link data, and the detailed printing data (or the simplified data in the BD 2) to the PCDB 5 (S134). Thereby, the PCDB 5 stores the detailed printing data supplied from the CS 3 (or the simplified data in the BD 2) in the database 5c in accordance with the home page address. Thereby, the printing data is distributed.

Thereafter, the possessor of the BD 2 goes to the vicinity of the PC, and sets a request for executing the printing and the address of the home page to be printed to the PC 7 by the data transfer function such as Bluetooth (S135).

Thereby, the PC 7 searches the registered place table 31 to judge whether or not the supplied home page address is registered. When the address is registered, the printing processing is performed as in the ninth embodiment (S125 to S127).

Moreover, when the address is not registered, the PC 7 transmits the address of the home page to the PCDB 5 (S136). By the transmission, the PCDB 5 searches for the detailed printing data distributed beforehand (or the simplified data in the BD 2) based on the address of the home page, and transmits the searched printing data to the PD 6 via the PC 7 (S137). The PD 6 subjects the received printing data to the printing processing. The paper P printed/processed by the PD 6 is outputted (S138).

According to the eleventh embodiment, there is provided a precedent distribution type.

In the processing procedure of the main part, (1) the BD 2 transmits the printing instruction to the CS 3, (2) the CS 3 transmits the printing data to the PCDB 5, (3) the printing instruction is transmitted to the PC 7, (4) the PC 7 downloads the printing data from the PCDB 5, (5) the PC 7 allows the PD 6 to execute the printing processing, and the information is printed.

The flow of the printing data is "CS 3→PCDB 5→PC 7→PD 6".

Therefore, the printed data may be the information able to be displayed on the BD 2, the information unable to be displayed on the BD 2, and the print-only data. For (3), the BD 2 notifies the PC 7 of the location/address of the printing data to designate the printing object, and the location/address is designated directly to the PC 7, or the location/address is selected from the content list of the PCDB 5 and designated.

In the eleventh embodiment, it is unnecessary to accumulate the printing data in the BD 2. Since the printing data is transferred beforehand to the PCDB 5 (precedent distribution), a time for the printing processing in the PC 7 can advantageously be shortened.

Moreover, when the BD requests the CS to print the data, the printing data or the information (URL, and the like) for specifying the existence position of the data is transmitted to the PCDB from the CS. Thereafter, when the PC receives the printing executing request, the PC receives the printing data from the PCDB in accordance with a content of the printing executing request, and the data can be printed through the PD.

Furthermore, after the PC receives the information for specifying the existence position of the data from the BD, the PC cannot acquire the data as the printing object based on the received information. In this case, even when the connection of the BD to the PC is cut/terminated, the BD can be notified that the data cannot be acquired.

Additionally, the BD transmits the information for specifying the existence position of the data to the PC, the printing object can be designated.

Moreover, as the method of specifying the printing object on the PC, a method of directly inputting the information for specifying the printing object, or a method of selecting and designating the printing object from a list of printing objects can be used.

TWELFTH EMBODIMENT

Figure 27:
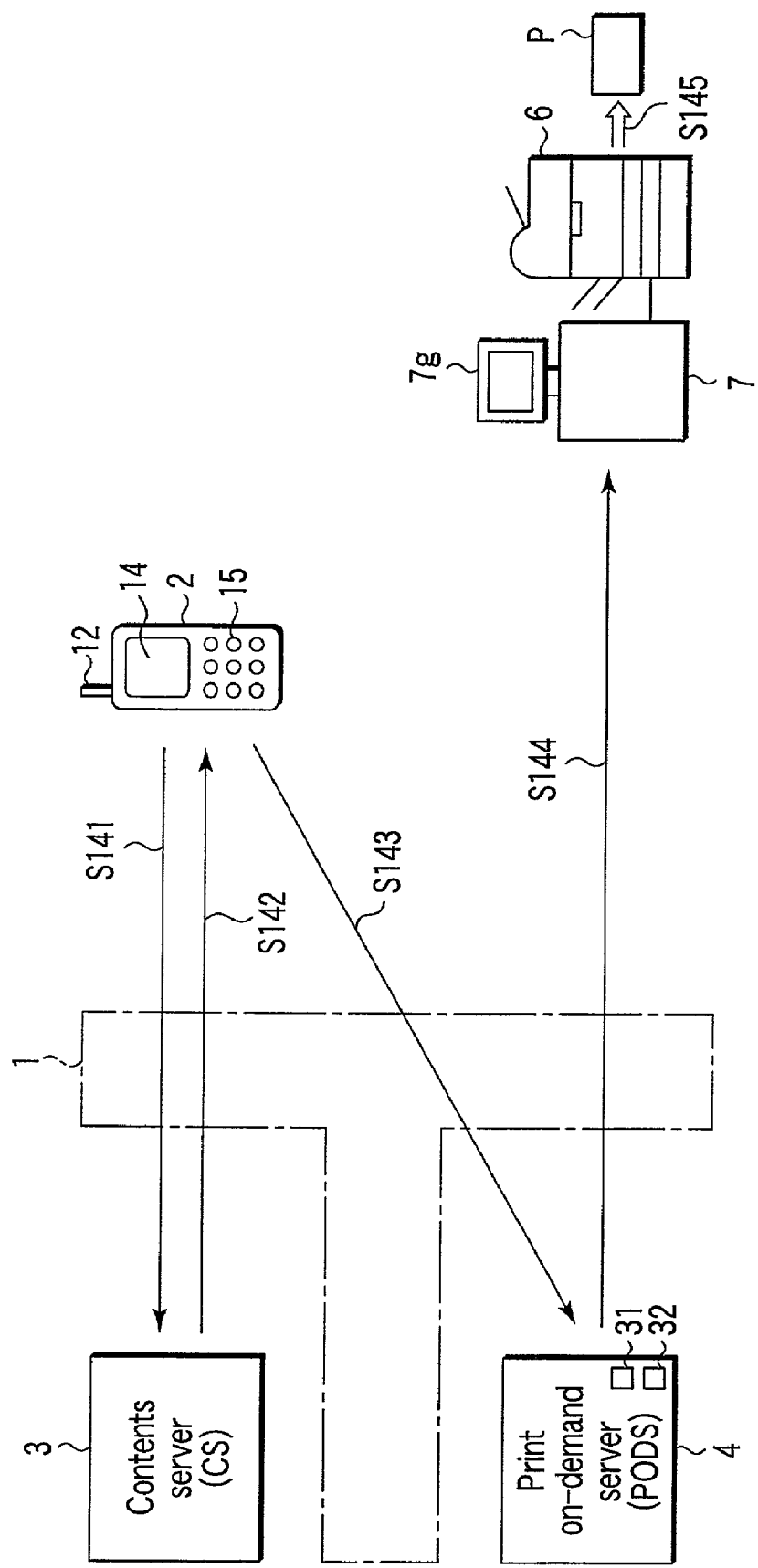
FIG. 27 is an explanatory view of the schematic constitution and the data transmission/reception state in a twelfth embodiment.

As shown in FIG. 27, in the on-demand print system of a twelfth embodiment, the browser device (BD) 2 as the mobile terminal on the information reception side, the contents server (CS) 3 as the information transmission apparatus on the information transmission side, the print on-demand server (PODS) 4 for integrally performing charging, security management, user management, printing history management, and the like with respect to distribution processing/printing of the contents to be printed, and the printer controller (PC) 7 for controlling the printer device (PD) 6 are connected via the communication network such as Internet 1. Moreover, the BD 2 is connected to the PC 7 via radio by the Bluetooth function or via the cable. The twelfth embodiment is constituted by omitting the PCDB 5 from the first embodiment.

In the twelfth embodiment, as the data read from the database 3*d* of the CS 3 in response to the supply request of contents from the BD 2, there is one type, that is, detailed printing data as the print-only data which cannot be displayed in the display 14 of the BD 2, or there are two types, that is, the detailed printing data as the print-only data and simplified image data for the BD 2. The detailed printing data is data displayed in the personal computer, IA, or another rich client.

With one type of the detailed printing data, the control circuit 20 in the BD 2 has conversion software for converting the detailed printing data to the simplified image data for the BD 2. Moreover, the PODS 4 is interposed in the course of the transmission of the data to the PC 7 from the BD 2.

The operation of this case will be described with reference to the data transmission/reception state shown in FIG. 27.

For example, the site of map information is selected, and the detailed printing data shown in FIG. 14 is transmitted as the desired map information to the BD 2 having transmitted the request from the CS 3 (S141, S142). Thereby, the BD 2 converts the detailed printing data to data of the outline map linearly shown in FIG. 11 for the display 14 of the BD 2, and displays the data in the display 14. According to the display, the icon for the printing instruction is selected. In this case, based on the selection of the icon for the printing instruction, the detailed printing data for the BD 2 from the CS 3 before the conversion and the printing request are transmitted to the PODS 4 (S143). Thereby, the PODS 4 integrally performs the charging, security management, user management, printing history management, and the like with respect to the distribution processing and printing of the contents to be printed. The PODS 4 transmits the detailed printing data for the BD 2 before the conversion and the printing request to the PC 7 from the BD 2 (S144). Thereby, the PC 7 transmits the detailed printing data received by the printing request to the PD 6. The PD 6 subjects the received printing data to the printing processing. The paper P printed/processed by the PD 6 is outputted (S145).

With two types of the detailed printing data and simplified image data, the control circuit 20 in the BD 2 registers the detailed printing data and simplified image data in the memory 21, and switches and uses the data.

The operation of this case will be described with reference to the data transmission/reception state shown in FIG. 27.

For example, the site of map information is selected, and the detailed printing data shown in FIG. 14 and the outline map data linearly shown in FIG. 11 are transmitted as the desired map information to the BD 2 having transmitted the request from the CS 3 (S141, S142). Thereby, the BD 2 displays the outline map data in the display 14. According to the display, the icon for the printing instruction is selected. In this case, based on the selection of the icon for the printing instruction, the printing request and detailed printing data are transmitted to the PODS 4 (S143). Thereby, the PODS 4 integrally performs the charging, security management, user management, printing history management, and the like with respect to the distribution processing/printing of the contents to be printed. The PODS 4 transmits the detailed printing data and printing request to the PC 7 from the BD 2 (S144). Thereby, the PC 7 transmits the detailed printing data received by the printing request to the PD 6. The PD 6 subjects the received printing data to the printing processing. The paper P printed/processed by the PD 6 is outputted (S145).

Moreover, there is one type of detailed printing data, and the PODS 4 is interposed in the course of data transmission to the BD 2 from the CS 3. The operation of this case will be described with reference to the data transmission/reception state shown in FIG. 28.

For example, the site of map information is selected, and the detailed printing data shown in FIG. 14 is transmitted as the desired map information to the BD 2 having transmitted the request from the CS 3 via the PODS 4 (S151, S152, S153). Thereby, the PODS 4 integrally performs the charging, security management, user management, printing history management, and the like with respect to the distribution processing/printing of the contents to be printed.

Thereby, the BD 2 converts the detailed printing data to the data of the outline map linearly shown in FIG. 11 for the display 14 of the BD 2, and displays the data in the display 14. According to the display, the icon for the printing instruction is selected. In this case, based on the selection of the icon for the printing instruction, the detailed printing data for the BD 2 from the CS 3 before the conversion and the printing request are transmitted to the PC 7 (S154). Thereby, the PC 7 transmits the detailed printing data received by the printing request to the PD 6. The PD 6 subjects the received printing data to the printing processing. The paper P printed/processed by the PD 6 is outputted (S155).

Moreover, when two types, that is, the detailed printing data and the simplified image data are handled, the operation can be performed as in the aforementioned embodiment.

According to the twelfth embodiment, there is provided a simple data transmission/printing type via the PODS 4.

In the processing procedure of the main part, (1) the BD 2 receives/displays the information of the CS 3, or receives/displays the information of the CS 3 via the PODS 4, (2) the BD 2 instructs the PC 7 to print the data via the PODS 4, or the BD 2 directly instructs the PC 7 to print the data, and the printing data stored in the BD 2 is transferred to the PC 7, (3) the PC 7 allows the PD 6 to execute the printing processing, and the information is printed.

The flow of the printing data is "CS 3→BD 2→PODS 4→PC 7→PD 6, or CS 3→PODS 4→BD 2→PC 7→PD 6".

Therefore, the direct communication of the BD 2 to PC 7 is possible both by radio and by wire (cable communication), and the printed data may be either the information able to be displayed on the BD 2 or the information unable to be displayed on the BD 2.

In the twelfth embodiment, the BD 2 can be utilized as one type of mobile storage, and a charging and security function, and the like of the PODS 4 can advantageously be utilized.

Moreover, when the BD transmits the received data to the PC, the data can be printed through the PD.

Furthermore, when the BD receives the data, the data is subjected to the processing in the PODS. Therefore, the function realized by the PODS can be utilized.

Additionally, when the BD transmits the data to the PC, the data is subjected to the processing in the PODS. Therefore, the function realized by the PODS can be utilized.

Moreover, the PC receives the printing data from the BD, thereafter the PC judges whether the received data can be printed, and it is judged that the data cannot be printed. In this case, even when the connection of the BD to the PC is cut/terminated, the BD can be notified that the data cannot be printed.

THIRTEENTH EMBODIMENT

Figure 29:
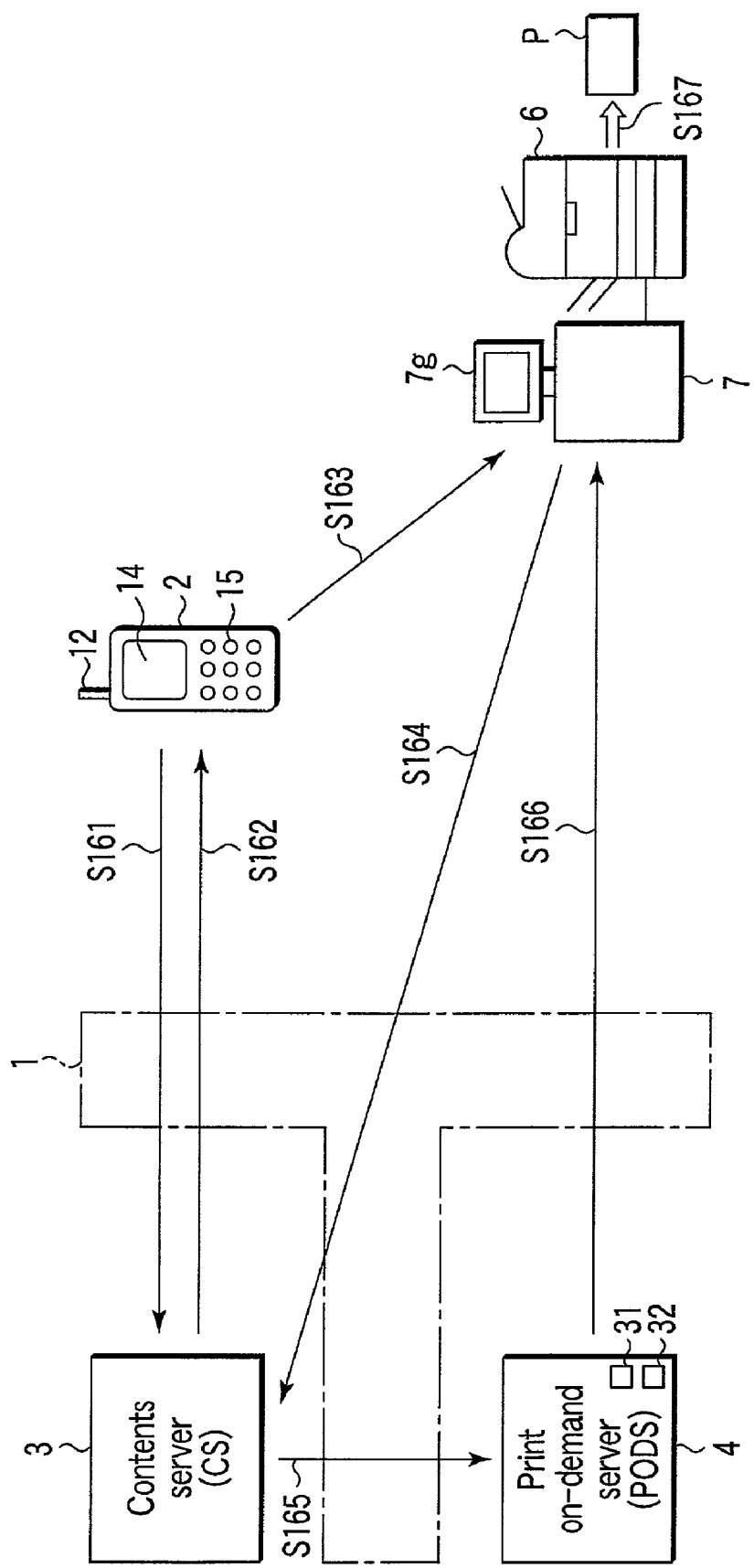
FIG. 29 is an explanatory view of the schematic constitution and the data transmission/reception state in a thirteenth embodiment.

As shown in FIG. 29, in the on-demand print system of a thirteenth embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to distribution processing/printing of the contents to be printed, and the printer controller (PC) 7 for controlling the printer device (PD) 6 are connected via the communication network such as Internet 1. Moreover, the BD 2 is connected to the PC 7 via radio by the Bluetooth function or via the cable. The thirteenth embodiment is constituted by omitting the PCDB 5 from the first embodiment.

In the thirteenth embodiment, the printing request from the BD 2 is transmitted to the PC 7 together with the link information such as the address, and the PC 7 having received the printing request downloads the detailed printing data or the simplified image data for the BD 2 as the print-only data from the CS 3 based on the link information such as the address via Internet 1. Furthermore, the PODS 4 is interposed in the course of the data transmission to the PC 7 from the CS 3, and the PODS 4 is interposed in the course of the data transmission to the BD 2 from the CS 3. These two examples will be described.

The timing for the downloading by the PC 7 is an optimum time when the printing request from the BD 2 is supplied, when the next printing request is supplied, or between when the printing request from the BD 2 is supplied and when the next printing request is supplied. The optimum time is a timing based on scheduling of the PD 6 when the efficiency of the network is satisfactory.

The timing of the downloading by the PC 7 is immediately after the printing request from the BD 2 is supplied, and the PODS 4 is interposed in the course of the data transmission to the PC 7 from the CS 3. The operation will be described with reference to the data transmission/reception state shown in FIG. 29.

For example, the site of map information is selected, and the outline map data linearly shown in FIG. 11 is transmitted to the BD 2 having transmitted the request from the CS 3 (S161, S162). Thereby, the BD 2 displays the outline map data by the display 14. According to the display, the icon for the printing instruction is selected. In this case, based on the selection of the icon for the printing instruction, the printing request and the address of the home page as the link data are transmitted to the PC 7 by the data transfer function of the BD 2 (S163). Thereby, the PC 7 instructs the CS 3 to download the contents based on the address received together with the printing request (S164). The CS 3 reads the detailed printing data of the contents or the simplified image data based on the address from the database 3*d* and transmits the data to the PODS 4 (S165). Thereby, the PODS 4 integrally performs the charging, security management, user management, printing history management, and the like with respect to the distribution processing/printing of the contents to be printed. The PODS 4 transmits the detailed printing data and printing request from the BD 2 to the PC 7 (S166), so that the data is downloaded.

Thereby, the PC 7 transmits the downloaded detailed printing data or the simplified image data to the PD 6. The PD 6 subjects the received printing data to the printing processing. The paper P printed/processed by the PD 6 is outputted (S167).

The timing of the downloading by the PC 7 is immediately after the printing request from the BD 2 is supplied, and the PODS 4 is interposed in the course of the data transmission to the BD 2 from the CS 3. The operation will be described with reference to the data transmission/reception state shown in FIG. 30.

For example, the site of map information is selected, and the outline map data linearly shown in FIG. 11 is transmitted to the BD 2 having transmitted the request from the CS 3 via the PODS 4 (S171, S172, S173). Thereby, the PODS 4 integrally performs the charging, security management, user management, printing history management, and the like with respect to the distribution processing/printing of the contents to be printed.

Thereby, the BD 2 displays the data of the outline map by the display 14. According to the display, the icon for the printing instruction is selected. In this case, based on the selection of the icon for the printing instruction, the printing request and the address of the home page as the link data are transmitted to the PC 7 by the data transfer function of the BD 2 (S174). Thereby, the PC 7 instructs the CS 3 to download the contents based on the address received together with the printing request (S175). The CS 3 reads the detailed printing data of the contents or the simplified image data based on the address from the database 3*d* and transmits the data to the PC 7 (S176), so that the data is downloaded.

Thereby, the PC 7 transmits the downloaded detailed printing data or the simplified image data to the PD 6. The PD 6 subjects the received printing data to the printing processing. The paper P printed/processed by the PD 6 is outputted (S177).

According to the thirteenth embodiment, there is provided the simple data PULL printing type via the PODS 4.

In the processing procedure of the main part, (1) the BD 2 receives/displays the information of the CS 3, or receives/displays the information of the CS 3 via the PODS 4, (2) the BD 2 instructs the PC 7 to print the data, and informs the PC 7 of the location/address of the data to be printed, (3) the PC 7 downloads the printing data from the CS 3 via the PODS 4, or downloads the printing data directly from the CS 3, (4) the PC 7 allows the PD 6 to execute the printing processing, and the information is printed.

The flow of the printing data is "CS 3→PODS 4→PC 7→PD 6, or CS 3→PC 7→PD 6".

Moreover, the communication of the BD 2 to PC 7 is possible both by radio and by wire (cable communication), and the printed data may be the information able to be displayed on the BD 2 or the information unable to be displayed on the BD 2.

In the thirteenth embodiment, it is unnecessary to store the printing data in the BD 2, and the charging and security function, and the like of the PODS 4 can advantageously be utilized.

Moreover, when the BD transmits the information (URL, and the like) for specifying the existence position of the received data to the PC, the PC acquires the data as the printing object based on the received information, and the data can be printed through the PD.

Furthermore, when the BD receives the data, the data is subjected to the processing in the PODS. Therefore, the function realized by the PODS can be utilized.

Additionally, when the PC receives the printing data from the CS, the data is subjected to the processing in the PODS. Therefore, the function realized by the PODS can be utilized.

Moreover, after receiving the information for specifying the existence position of the data from the BD, the PC cannot acquire the data as the printing object based on the received information. In this case, even when the connection of the BD to the PC is cut/terminated, the BD can be notified that it is impossible to acquire the data.

Furthermore, after receiving the information for specifying the existence position of the data from the BD, the PC immediately acquires the data as the printing object based on the received information. In this case, even when the data content is updated later, the previous information can be printed.

Additionally, after receiving the information for specifying the existence position of the data from the BD, instead of immediately obtaining the data as the printing object based on the received information, the PC acquires and prints the printing data on receiving the next printing request. Therefore, the (latest) information at the time of the printing request can be obtained as the printed matter.

Moreover, after receiving the information for specifying the existence position of the data from the BD, instead of immediately obtaining the data as the printing object based on the received information, the PC can acquire the printing data at the optimum time until the next printing request is received.

FOURTEENTH EMBODIMENT

Figure 31:
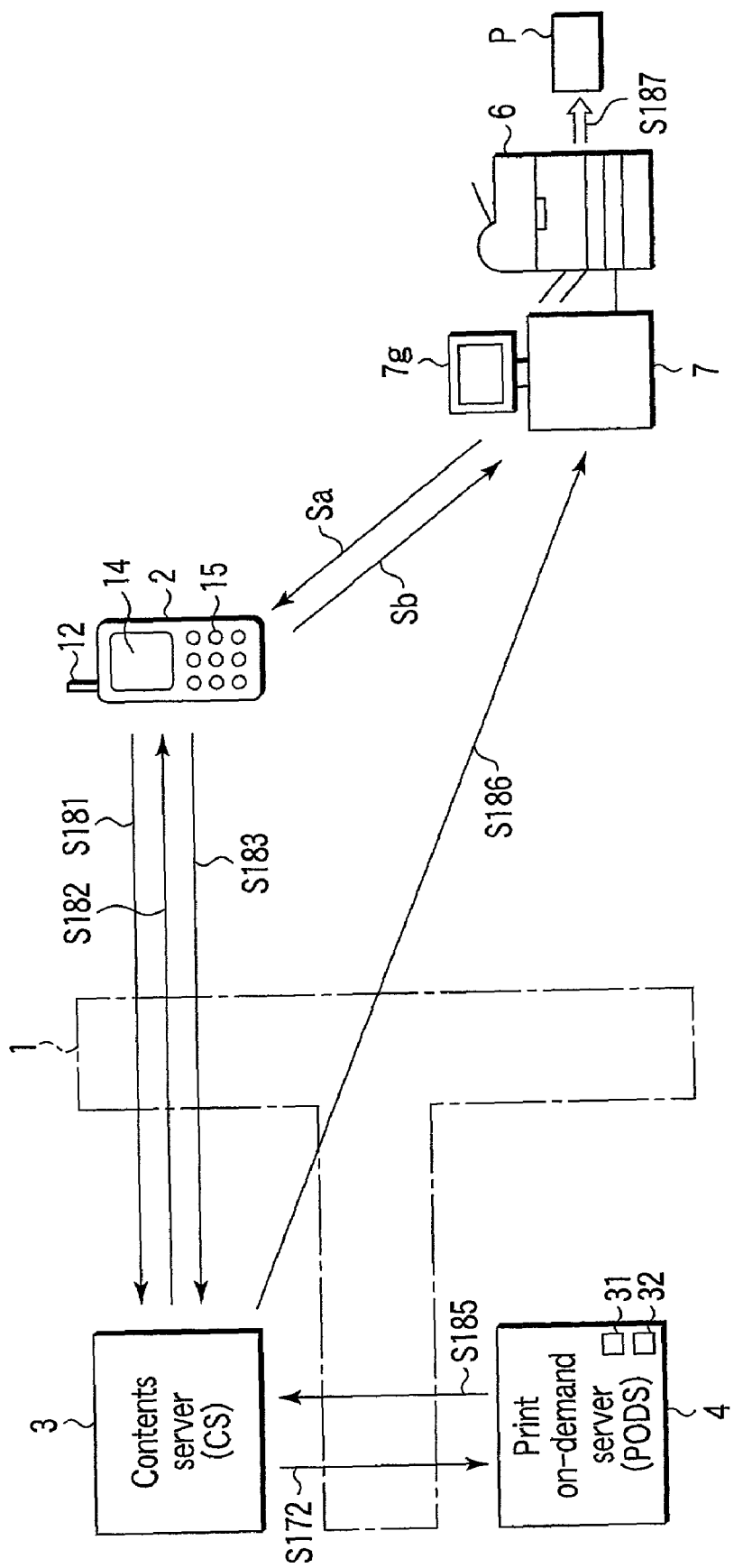
FIG. 31 is an explanatory view of the schematic constitution and the data transmission/reception state in a fourteenth embodiment.

As shown in FIG. 31, in the on-demand print system of a fourteenth embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to distribution processing/printing of the contents to be printed, and the printer controller (PC) 7 for controlling the printer device (PD) 6 are connected via the communication network such as Internet 1. Moreover, the BD 2 is connected to the PC 7 via radio by the Bluetooth function or via the cable. The fourteenth embodiment is constituted by omitting the PCDB 5 from the first embodiment.

In the fourteenth embodiment, the printing request from the BD 2 is transmitted to the CS 3 together with the address for designating the PD 6 (PC 7) for printing the data. The CS 3 having received the printing request reads the detailed printing data registered in the home page address corresponding to the printing request or the simplified image data from the database 3*d*. The detailed printing data or the simplified image data is downloaded, and printed with respect to the PD 6 (PC 7) corresponding to the address via Internet 1.

Moreover, the PODS 4 is notified of the transmission of the printing data to the PC 7 from the CS 3, and the PODS 4 is interposed in the course of the data transmission to the PC 7 from the CS 3. These two examples will be described.

The PD 6 (PC 7) for printing the data is designated automatically or manually before the printing request is transmitted.

The designation automatically performed beforehand will be described. In this case, the inquiry is made with respect to the PD 6 (PC 7) nearby by the Bluetooth function of the BD 2. The PD 6 (PC 7) responds to this inquiry, and returns its own address in Internet 1 to the BD 2 (Sa). Thereby, when the BD 2 transmits the printing request, the address is also transmitted together with the printing request.

Moreover, the printing destination setting mode is set in accordance with the instruction of the operator 15 of the BD 2, and the number of the arbitrary PD 6 (PC 7) nearby may be inputted and set.

Furthermore, when the printing data from the CS 3 is downloaded onto the PC 7, the printing processing is performed. However, the printing processing may be performed after the authentication processing.

That is, the phone number of the BD 2 having transmitted the printing request is added as the authentication number to the printing data to be downloaded to the PC 7 from the CS 3, and the printing data is downloaded to the PC 7 from the CS 3. In this case, the PC 7 requests the BD 2 to transmit the phone number of the BD 2. After the authentication processing is performed by judging that the returned phone number (Sb) meets the phone number added to the printing data, the printing processing is performed.

In this manner, after confirmation is made by authentication, the printing can be performed, so that the security is enhanced.

In the fourteenth embodiment, the PODS 4 is notified of the transmission of the printing data to the PC 7 from the CS 3, and the PODS 4 is interposed in the course of data transmission to the PC 7 from the CS 3. The operation of the fourteenth embodiment will be described with reference to the data transmission/reception state shown in FIG. 31.

For example, the site of map information is selected, and the outline map data linearly shown in FIG. 11 is transmitted to the BD 2 having transmitted the request from the CS 3 (S181, S182). Thereby, the BD 2 displays the outline map data by the display 14. According to the display, the icon for the printing instruction is selected. In this case, based on the selection of the icon for the printing instruction, the printing request and the address of the PC 7 as the predetermined printing destination are transmitted to the CS 3 (S183). The CS 3 transmits the printing request to the PODS 4 (S184). Thereby, the PODS 4 integrally performs the charging, security management, user management, printing history management, and the like with respect to the distribution processing/printing of the contents to be printed, and informs the CS 3 of an end of the processing (S185).

Thereby, the CS 3 reads the detailed printing data of the contents or the simplified image data based on the data (address) of the outline map from the database 3d and transmits the data to the PC 7 (S186), so that the data is downloaded.

Thereby, the PC 7 transmits the downloaded detailed printing data or the simplified image data to the PD 6. The PD 6 subjects the received printing data to the printing processing. The paper P printed/processed by the PD 6 is outputted (S187).

In the fourteenth embodiment, the PODS 4 is interposed in the course of data transmission to the PC 7 from the CS 3. The operation will be described with reference to the data transmission/reception state shown in FIG. 32.

For example, the site of map information is selected, and the outline map data linearly shown in FIG. 11 is transmitted to the BD 2 having transmitted the request from the CS 3 (S191, S192). Thereby, the BD 2 displays the outline map data by the display 14. According to the display, the icon for the printing instruction is selected. In this case, based on the selection of the icon for the printing instruction, the printing request and the address of the PC 7 as the predetermined printing destination are transmitted to the CS 3 (S193).

Thereby, the CS 3 reads the detailed printing data of the contents based on the data (address) of the outline map or the simplified image data from the database 3d, and transmits the data to the PODS 4 (S194). Thereby, the PODS 4 integrally performs the charging, security management, user management, printing history management, and the like with respect to the distribution processing/printing of the contents to be printed, and transmits the detailed printing data of the contents based on the data (address) of the outline map or the simplified image data to the PC 7 (S195), so that the data is downloaded.

Thereby, the PC 7 transmits the downloaded detailed printing data or the simplified image data to the PD 6. The PD 6 subjects the received printing data to the printing processing. The paper P printed/processed by the PD 6 is outputted (S196).

According to the fourteenth embodiment, there is provided the simple data PUSH printing type via the PODS 4.

In the processing procedure of the main part, (1) the BD 2 transmits the printing instruction to the CS 3, (2) the CS 3 communicates with the PODS 4, or the CS 3 transmits the printing data to the PODS 4, (3) the CS 3 transmits the printing data to the PC 7, or the PODS 4 transmits the printing data to the PC 7, (4) the PC 7 allows the PD 6 to execute the printing processing, and the information is printed.

The flow of the printing data is "CS 3→PC 7→PD 6 or CS 3→PODS 4→PC 7→PD 6".

Therefore, the printed data may be the information able to be displayed on the BD 2 or the information unable to be displayed on the BD 2. Moreover, the PC 7 transmits the information for specifying the PC 7 to the BD 2 before (1), or the start instruction of the printing processing is issued by operation on the PC 7 or transmission of the data to the PC 7 from the BD 2 before (4).

In the fourteenth embodiment, it is unnecessary to store the printing data in the BD 2, the existing BD 2 can be utilized as it is, and the charging and security function, and the like of the PODS 4 can advantageously be utilized.

Moreover, when the BD requests the cs to print the data, the printing data is transmitted to the PC from the CS 3, and can be printed through the PD.

Furthermore, when the CS transmits the data to the PC, the data is subjected to the processing in the PODS. Therefore, the function realized by the PODS can be utilized.

Additionally, instead of directly transmitting the data to the PC from the CS, the CS transmits the data to the PODS, and the PODS transmits the data to the PC, so that the function realized by the PODS can be utilized.

Moreover, after receiving the printing request from the BD, it is detected that the printing data cannot correctly be processed on the PC as the transmission address of the printing data (or cannot correctly be printed by the PD). In this case, the BD can be notified that it is impossible to print the data.

FIFTEENTH EMBODIMENT

Figure 33:
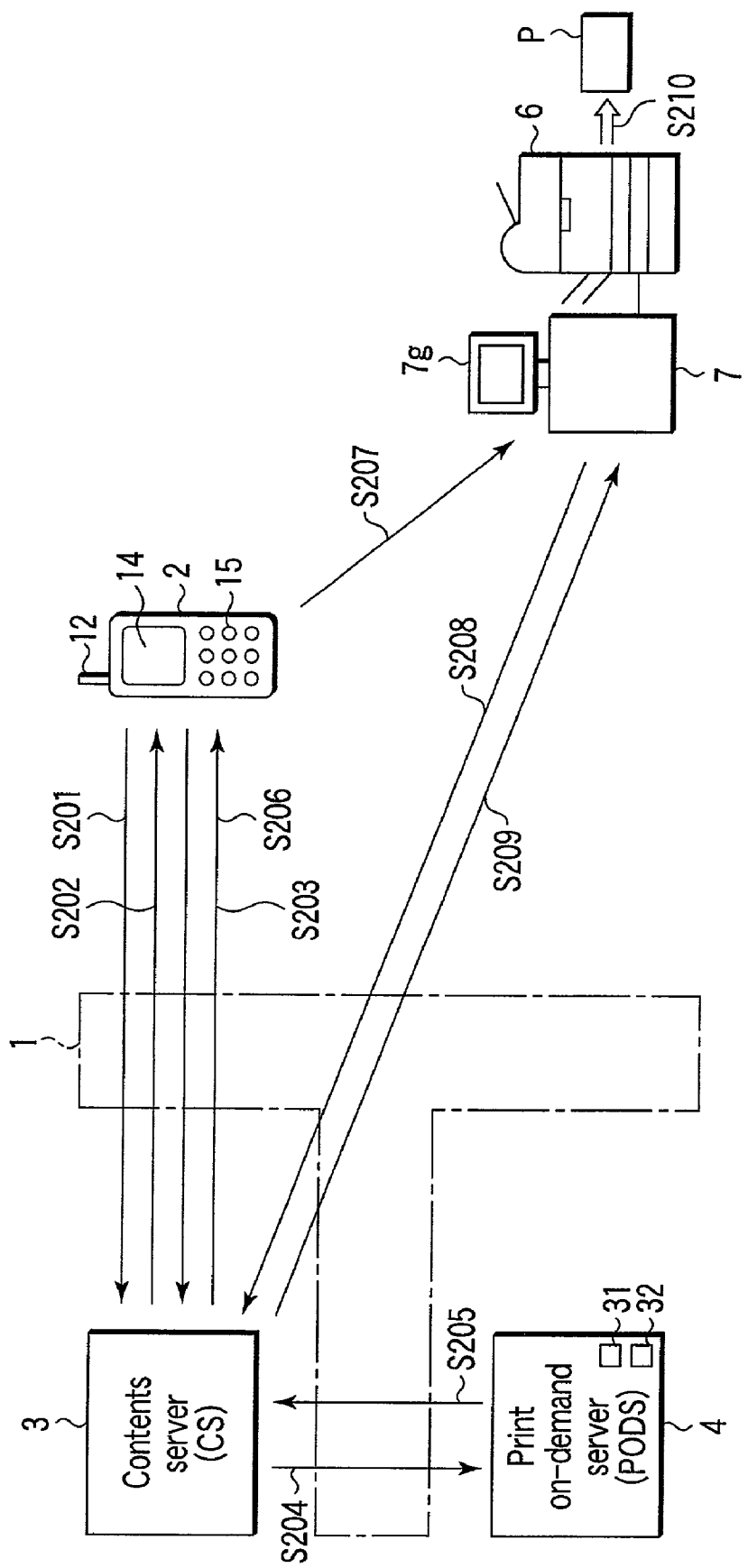
FIG. 33 is an explanatory view of the schematic constitution and the data transmission/reception state in a fifteenth embodiment.

As shown in FIG. 33, in the on-demand print system of a fifteenth embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to distribution processing/printing of the contents to be printed, and the printer controller (PC) 7 for controlling the printer device (PD) 6 are connected via the communication network such as Internet 1. Moreover, the BD 2 is connected to the PC 7 via radio by the Bluetooth function or via the cable. The fifteenth embodiment is constituted by omitting the PCDB 5 from the first embodiment.

In the fifteenth embodiment, the PODS 4 is notified that the printing data is transmitted to the PC 7 from the CS 3. The operation will be described with reference to the data transmission/reception state shown in FIG. 33.

For example, the site of map information is selected, and the data of outline map linearly shown in FIG. 11 is transmitted as the desired map information (map No. 1023: map ID) for the display 14 of the BD 2 to the BD 2 having transmitted the request from the CS 3 (S201, S202). Thereby, the display 14 of the BD 2 displays the outline map as linearly shown in FIG. 11. According to the display, the icon for printing instruction is selected. By the selection, the BD 2 transmits the "printing request from user 09012345678@abc.xyz with respect to map No. 1023" to the CS 3 (S203). The CS 3 transmits the printing request from the BD 2 to the PODS 4 (S204).

Thereby, the PODS 4 integrally performs the charging, security management, user management, printing history management, and the like with respect to the distribution processing/printing of the contents to be printed.

Moreover, PODS 4 generates the new PID "290167" as the number for this printing, and transmits the generated PID to the CS 3 (S205).

Thereby, the CS 3 registers association of the contents of the printing data with respect to the PID.

The CS 3 transmits the received PID to the BD 2 having transmitted the request (S206). Thereby, as shown in FIG. 12, the display 14 of the BD 2 displays "The printing registration is completed. You can print the next PID from the corresponding printer nearby. 290167" together with the PID storage icon.

In this case, when the PID storage icon is selected, the PID is registered in the memory 21 of the BD 2.

After the PID is acquired, the user goes to the nearby installation place of the corresponding printer, and selects the print mode based on the PID from the touch panel screen of the PC 7. Then, the PC 7 judges the print mode based on the PID, and the input guidance screen indicating "Please input the PID." is displayed in the touch panel screen of the operation display 7g as shown in FIG. 13. The user inputs the acquired PID "290167" based on the guidance.

Alternatively, the PID registered in the memory 21 is transmitted to the PC 7 by the data transfer function of the BD 2 such as Bluetooth (S207).

The PC 7 transmits the inputted PID to the CS 3 (S208).

The CS 3 judges the printing data based on the received PID, reads the data from the database 3d, and transmits the data to the PD 6 via the PC 7 (S209). The PD 6 subjects the received printing data to the printing processing. The paper P printed/processed by the PD 6 is outputted (S210).

As a result, as shown in FIG. 14, the guidance sentence "Office, Building 32, five minutes on foot from Kawasaki Station", and detailed map information are printed on the paper P.

In the fifteenth embodiment, the PODS 4 is disposed in the course of data transmission to the PC 7 from the CS 3. The operation will be described with reference to the data transmission/reception state shown in FIG. 34.

For example, the site of map information is selected, and the outline map data linearly shown in FIG. 11 is transmitted as the desired map information (map No. 1023: map ID) for the display 14 of the BD 2 to the BD 2 having transmitted the request from the CS 3 (S221, S222). Thereby, the BD 2 displays the outline map linearly shown in FIG. 11 by the display 14. According to the display, the icon for the printing instruction is selected. By the selection, the BD 2 transmits the "printing request from user 09012345678@abc.xyz with respect to map No. 1023" to the CS 3 (S223). The CS 3 transmits the printing request from the BD 2 to the PODS 4 (S224).

Thereby, the PODS 4 integrally performs the charging, security management, user management, printing history management, and the like with respect to the distribution processing/printing of the contents to be printed.

Moreover, PODS 4 generates the new PID "290167" as the number for this printing, and registers the correspondence of the generated PID, address of the BD 2 and printing data in the PID management table 32. Moreover, the PODS 4 transmits the generated new PID to the CS 3 (S225).

The CS 3 transmits the received PID to the BD 2 having transmitted the request (S226). Thereby, as shown in FIG. 12, the display 14 of the BD 2 displays "The printing registration is completed. You can print the next PID from the corresponding printer nearby. 290167" together with the PID storage icon.

In this case, when the PID storage icon is selected, the PID is registered in the memory 21 of the BD 2.

After the PID is acquired, the user goes to the nearby installation place of the corresponding printer, and selects the print mode based on the PID from the touch panel screen of the PC 7. Then, the PC 7 judges the print mode based on the PID, and the input guidance screen indicating "Please input the PID." is displayed in the touch panel screen of the operation display 7g as shown in FIG. 13. The user inputs the acquired PID "290167" based on the guidance.

Alternatively, the PID registered in the memory 21 is transmitted to the PC 7 by the data transfer function of the BD 2 such as Bluetooth (S227).

The PC 7 transmits the inputted PID to the PODS 4 (S228).

The PODS 4 judges the corresponding printing data from the PID management table 32 based on the received PID, and returns the judgment result to the CS 3 (S229). The CS 3 reads the printing data from the database 3d, and transmits the data to the PODS 4 (S230). Thereby, the PODS 4 transmits the printing data to the PD 6 via the PC 7 (S231). The PD 6 subjects the received printing data to the printing processing. The paper P printed/processed by the PD 6 is outputted (S232).

As a result, as shown in FIG. 14, the guidance sentence "Office, Building 32, five minutes on foot from Kawasaki Station", and detailed map information are printed on the paper P.

According to the fifteenth embodiment, there is provided a simple data PID issue type via the PODS 4.

In the processing procedure of the main part, (1) the BD 2 requests the CS 3 to print the data, (2) the PID corresponding to the printing request is issued by the PODS 4 and acquired by the CS 3, (3) the CS 3 transmits the PID to the BD 2, (4) the BD 2 transmits the PID to the PC 7, (5) the PC 7 transmits the PID received from the BD 2 to the CS 3, or the PID received from the BD 2 is transmitted to the PODS 4, (6) the CS 3 communicates with the PODS 4, or the PODS 4 communicates with the CS 3 to obtain the printing data from the CS 3, (7) the CS 3 transmits the printing data to the PC 7, or the PODS 4 transmits the printing data to the PC 7, (8) the PC 7 allows the PD 6 to execute the printing processing, and the information is printed.

The flow of PID is "PODS 4→CS 3→BD 2→PC 7→CS 3 or PODS 4→CS 3→BD 2→PC 7→PODS 4".

The flow of the printing data is "CS 3→PC 7→PD 6 or CS 3→PODS 4→PC 7→PD 6".

The data printed in this manner may be the information able to be displayed on the BD 2 or the information unable to be displayed on the BD 2.

Moreover, the PODS 4, the CS 3, or the PC 7 performs the collation processing (associating) of the issued PID with the printing data. Particularly, when the PC 7 performs the processing, the printing data can precedently be distributed after issuance of the PID.

In the fifteenth embodiment, it is unnecessary to store the printing data in the BD 2, the existing BD 2 can be utilized as it is, and the security function and charging can advantageously easily be realized by utilizing the PID.

Moreover, the BD obtains the printing ID (hereinafter referred to as PID) issued by the PODS via the CS, and transmits the PID to the PC. Then, the PC receives the printing data from the CS, and the data can be printed through the PD.

Furthermore, when the PC receives the data from the CS, the data is subjected to the processing in the PODS. Therefore, the function realized by the PODS can be utilized.

Additionally, instead of directly transmitting the data to the PC from the CS, the CS transmits the data to the PODS, and the PODS transmits the data to the PC, so that the function realized by the PODS can be utilized.

Moreover, the PC receives the PID from the BD, and it is subsequently detected that the printing data cannot correctly be acquired on the PC. In this case, the BD can be notified that it is impossible to acquire the data.

SIXTEENTH EMBODIMENT

As shown in FIG. 35, in the on-demand print system of a sixteenth embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to distribution processing/printing of the contents to be printed, the PCDB 5 for storing the printing contents (detailed printing data, print-only data) and the printer controller (PC) 7 for controlling the printer device (PD) 6 are connected via the communication network such as Internet 1. Moreover, the BD 2 is connected to the PC 7 via radio by the Bluetooth function or via the cable.

The PCDB 5 is a database for storing the printing contents (detailed printing data, print-only data), and is managed by the CS 3 in the sixteenth embodiment. Thereby, the CS 3 has the registered place table 31 in which the registered place of the printing data for each map ID in the PCDB 5 is stored.

The sixteenth embodiment is constituted by adding the PCDB 5 to the twelfth embodiment. As shown in FIG. 35, instead of reading the printing data from the database 3d in the CS 3 in FIG. 27, a processing of referring to the registered place table 31 based on the selection of the map information site (S141) and obtaining the printing data from the PCDB 5 is added (S242, S243).

Figure 36:
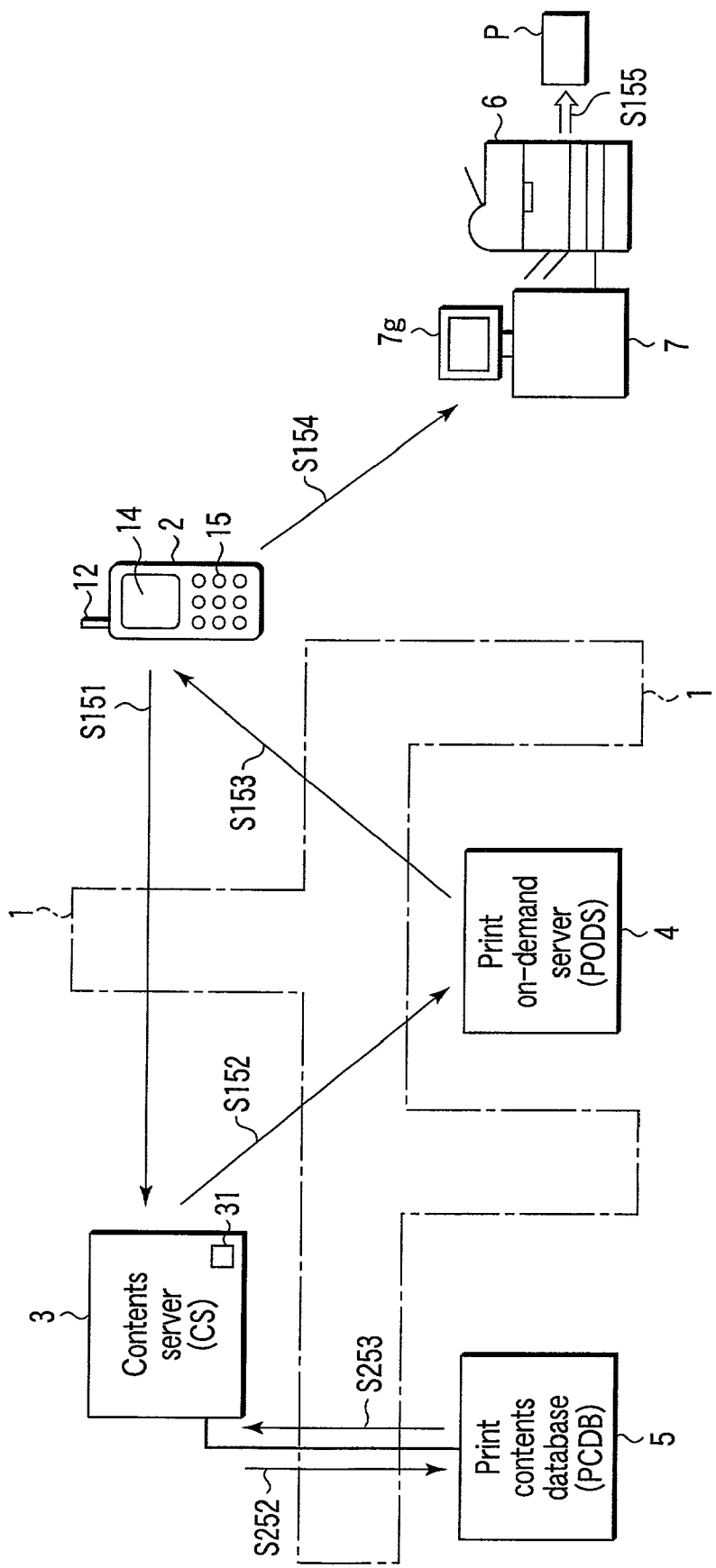
FIG. 36 is an explanatory view of the schematic constitution and the data transmission/reception state in the sixteenth embodiment.

Moreover, as shown in FIG. 36, instead of reading the printing data from the database 3d in the CS 3 in FIG. 28, a processing of referring to the registered place table 31 based on the selection of the map information site (S151) and obtaining the printing data from the PCDB 5 is added (S252, S253).

According to the sixteenth embodiment, there is provided an exclusive data transmission/printing type via the PODS 4.

In the processing procedure of the main part, (1) the BD 2 receives the information of the PCDB 5 via the CS 3, or receives the information of the PCDB 5 via the CS 3 and PODS 4, (2) the BD 2 instructs the PC 7 to print the data via the PODS 4, or the BD 2 directly instructs the PC 7 to print the data, and the printing data stored in the BD 2 is transferred to the PC 7, (3) the PC 7 allows the PD 6 to execute the printing processing, and the information is printed.

The flow of the printing data is "PCDB 5→CS 3→BD 2→PODS 4→PC 7→PD 6, or PCDB 5→CS 3→PODS 4→BD 2→PC 7→PD 6".

Therefore, the direct communication of the BD 2 to PC 7 is possible both by radio and by wire (cable communication), and the printed data is the print-only data (non-displayed data).

In the sixteenth embodiment, the BD 2 can be utilized as one type of mobile storage, and the charging and security function, and the like of the PODS 4 can be utilized, and the print-only output result is advantageously obtained.

Moreover, when the BD transmits the data received from the PCDB via the CS to the PC, the data can be printed through the PD.

Furthermore, when the BD receives the data from he PCDB via the CS, the data is subjected to the processing in the PODS. Therefore, the function realized by the PODS can be utilized.

Additionally, when the BD transmits the data to the PC, the data is subjected to the processing in the PODS. Therefore, the function realized by the PODS can be utilized.

Moreover, the PC receives the printing data from the BD, thereafter the PC judges whether the received data can be printed, and it is judged that the data cannot be printed. In this case, even when the connection of the BD to the PC is cut/terminated, the BD can be notified that the data cannot be printed.

SEVENTEENTH EMBODIMENT

Figure 37:
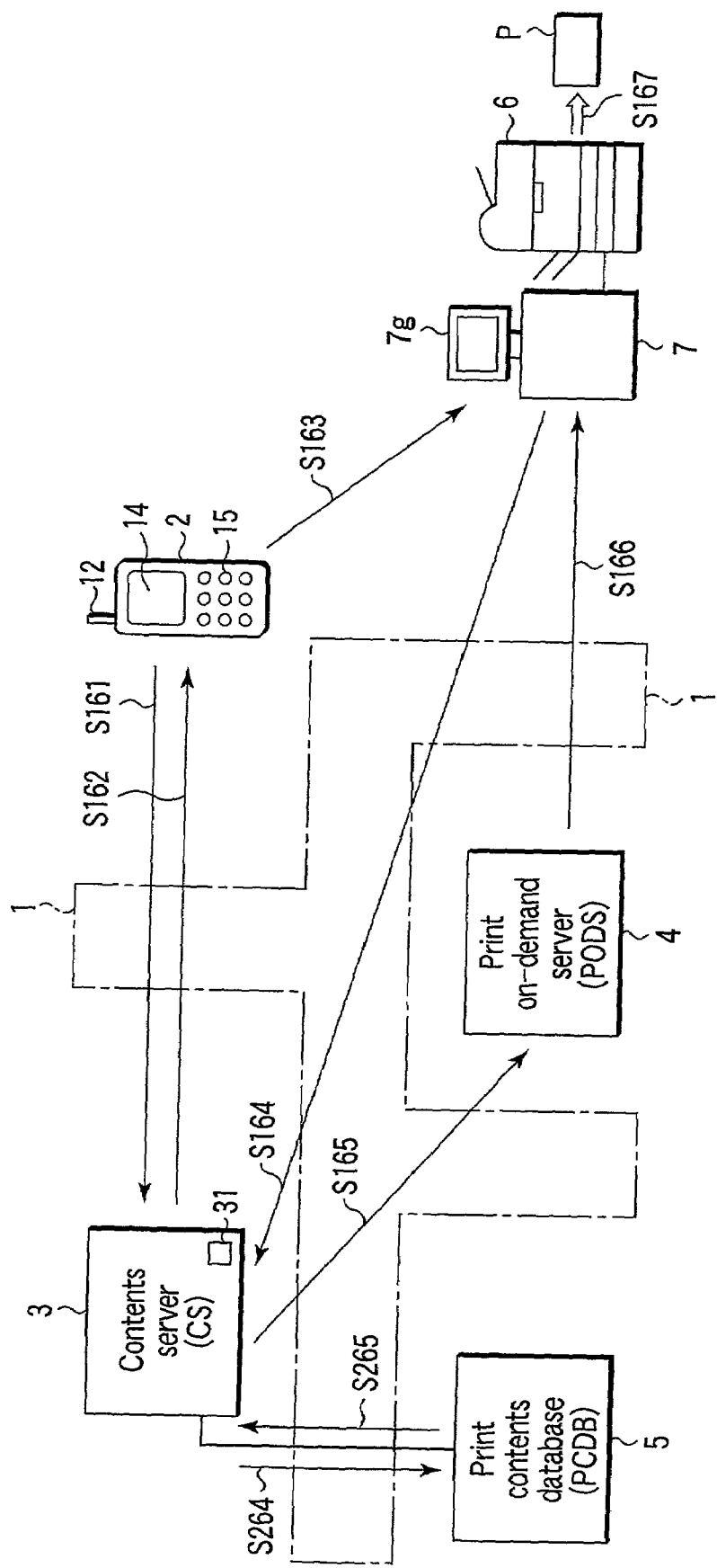
FIG. 37 is an explanatory view of the schematic constitution and the data transmission/reception state in a seventeenth embodiment.

As shown in FIG. 37, in the on-demand print system of a seventeenth embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to distribution processing/printing of the contents to be printed, the PCDB 5 for storing the printing contents (detailed printing data, print-only data) and the printer controller (PC) 7 for controlling the printer device (PD) 6 are connected via the communication network such as Internet 1. Moreover, the BD 2 is connected to the PC 7 via radio by the Bluetooth function or via the cable.

The PCDB 5 is a database for storing the printing contents (detailed printing data, print-only data), and is managed by the CS 3 in the seventeenth embodiment. Thereby, the CS 3 has the registered place table 31 in which the registered place of the printing data for each map ID in the PCDB 5 is stored.

The seventeenth embodiment is constituted by adding the PCDB 5 to the thirteenth embodiment. As shown in FIG. 37, instead of reading the printing data from the database 3d in the CS 3 in FIG. 29, a processing of referring to the registered place table 31 based on the selection of the map information site (S164) and obtaining the printing data from the PCDB 5 is added (S264, S265).

Figure 30:
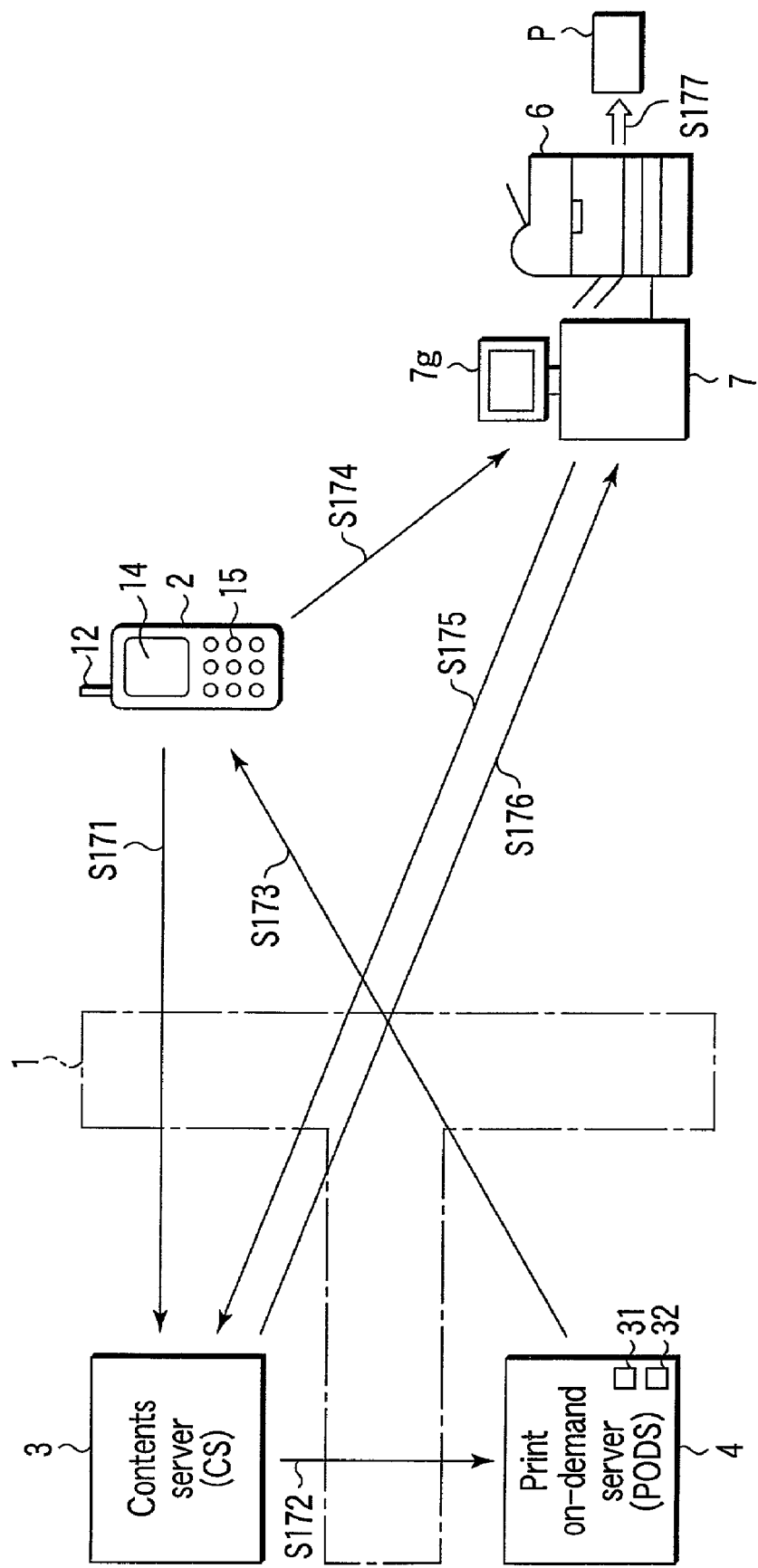
FIG. 30 is an explanatory view of the schematic constitution and the data transmission/reception state in the thirteenth embodiment.
Figure 38:
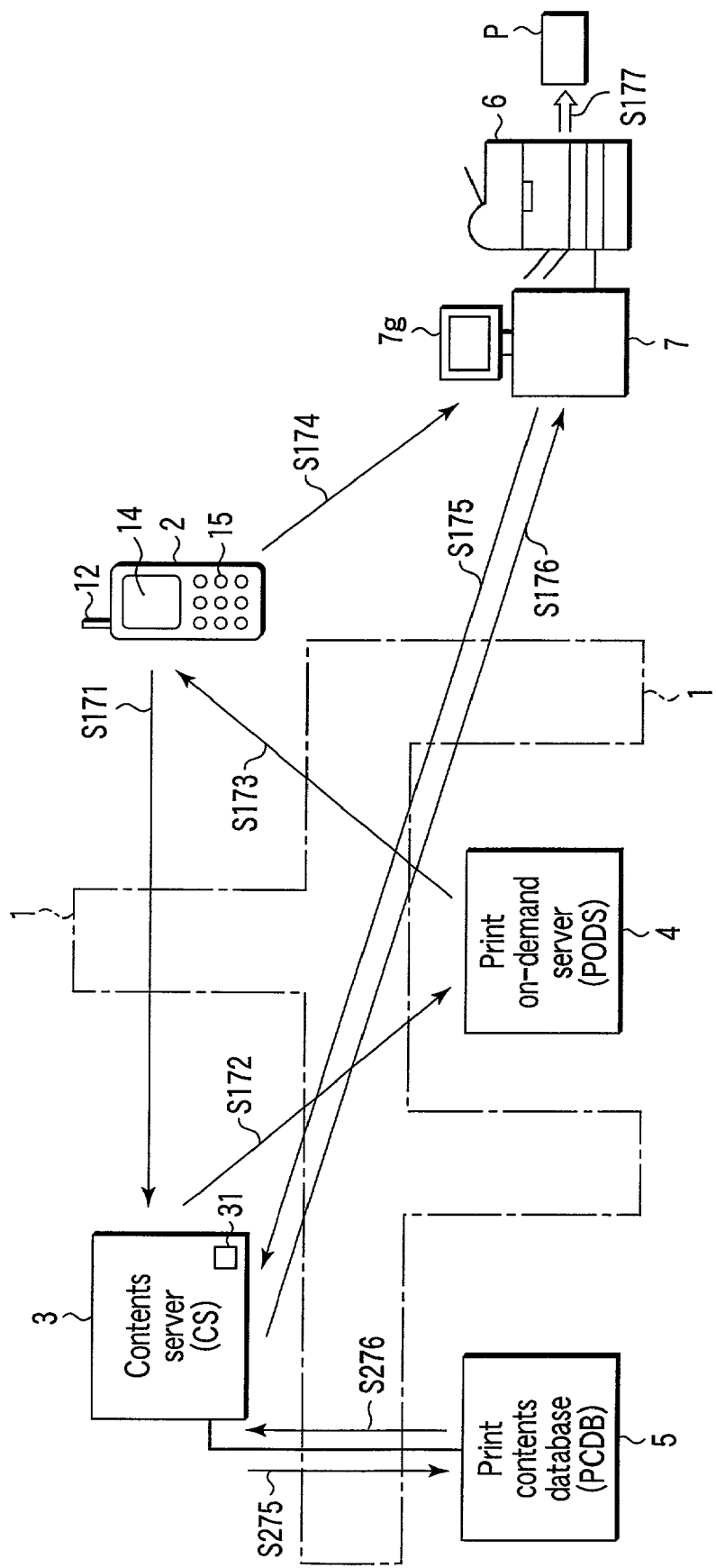
FIG. 38 is an explanatory view of the schematic constitution and the data transmission/reception state in the seventeenth embodiment.

Moreover, as shown in FIG. 38, instead of reading the printing data from the database 3d in the CS 3 in FIG. 30, a processing of referring to the registered place table 31 based on the selection of the map information site (S175) and obtaining the printing data from the PCDB 5 is added (S275, S276).

According to the seventeenth embodiment, there is provided an exclusive data PULL printing type via the PODS 4.

In the processing procedure of the main part, (1) the BD 2 receives/displays the information of the CS 3, or receives/displays the information of the CS 3 via the PODS 4, (2) the BD 2 instructs the PC 7 to print the data, and informs the PC 7 of the location/address of the data to be printed, (3) the PC 7 downloads the printing data from the PODS 4 via the CS 3 and PODS 4, or downloads the printing data from the PODS 4 via the CS 3, (4) the PC 7 allows the PD 6 to execute the printing processing, and the information is printed.

The flow of the printing data is "PCDB 5→CS 3→PODS 4→PC 7→PD 6, or PCDB 5→CS 3→PC 7→PD 6".

Moreover, the communication of the BD 2 to PC 7 is possible both by radio and by wire (cable communication), and the printed data is the print-only data (non-displayed data).

In the seventeenth embodiment, it is unnecessary to store the printing data in the BD 2, the charging and security function, and the like of the PODS 4 can be utilized, and the print-only output result is advantageously obtained.

Moreover, when the BD transmits the information (URL, and the like) for specifying the existence position of the received data to the PC, the PC acquires the data as the printing object based on the received information, and the data can be printed through the PD.

Furthermore, when the BD receives the data, the data is subjected to the processing in the PODS. Therefore, the function realized by the PODS can be utilized.

Additionally, when the PC receives the printing data from the PCDB via the CS, the data is subjected to the processing in the PODS. Therefore, the function realized by the PODS can be utilized.

Moreover, after receiving the information for specifying the existence position of the data from the BD, the PC cannot acquire the data as the printing object based on the received information. In this case, even when the connection of the BD to the PC is cut/terminated, the BD can be notified that it is impossible to acquire the data.

Furthermore, after receiving the information for specifying the existence position of the data from the BD, the PC immediately acquires the data as the printing object based on the received information. In this case, even when the data content is updated later, the previous information can be printed.

Additionally, after receiving the information for specifying the existence position of the data from the BD, instead of immediately obtaining the data as the printing object based on the received information, the PC acquires and prints the printing data on receiving the next printing request. Therefore, the (latest) information at the time of the printing request can be obtained as the printed matter.

Moreover, after receiving the information for specifying the existence position of the data from the BD, instead of immediately obtaining the data as the printing object based on the received information, the PC can acquire the printing data at the optimum time until the next printing request is received.

Furthermore, the BD displaying data on the CS is associated beforehand with the printing data on the PCDB, and the result is managed by the CS. In this case, the information for specifying the existence position of the BD displaying data can be converted to the information for specifying the position of the print-only data.

EIGHTEENTH EMBODIMENT

Figure 39:
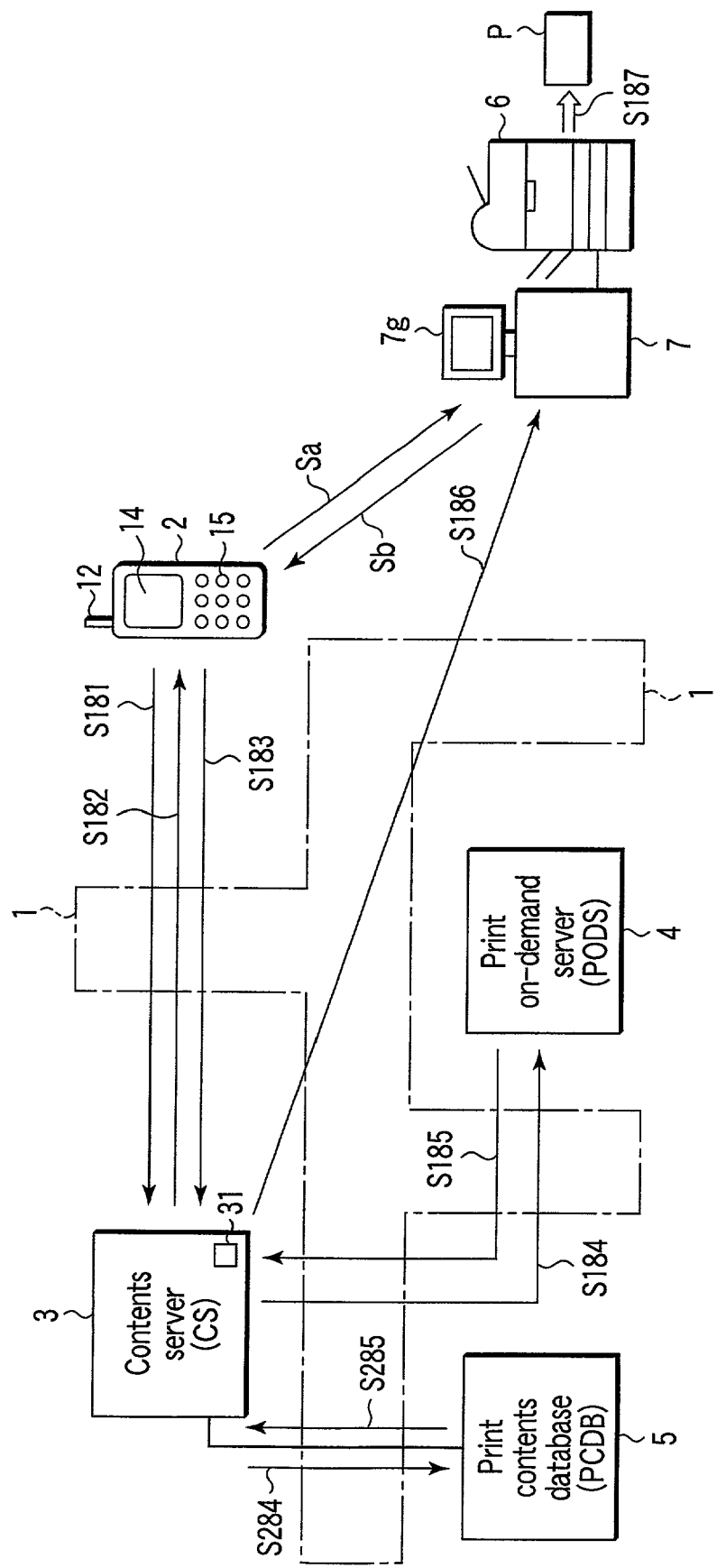
FIG. 39 is an explanatory view of the schematic constitution and the data transmission/reception state in an eighteenth embodiment.

As shown in FIG. 39, in the on-demand print system of an eighteenth embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to distribution processing/printing of the contents to be printed, the PCDB 5 for storing the printing contents (detailed printing data, print-only data) and the printer controller (PC) 7 for controlling the printer device (PD) 6 are connected via the communication network such as Internet 1. Moreover, the BD 2 is connected to the PC 7 via radio by the Bluetooth function or via the cable.

The PCDB 5 is a database for storing the printing contents (detailed printing data, print-only data), and is managed by the CS 3 in the eighteenth embodiment. Thereby, the CS 3 has the registered place table 31 in which the registered place of the printing data for each map ID in the PCDB 5 is stored.

The eighteenth embodiment is constituted by adding the PCDB 5 to the fourteenth embodiment. As shown in FIG. 39, instead of reading the printing data from the database 3*d* in the CS 3 in FIG. 31, a processing of referring to the registered place table 31 based on the selection of the map information site (S183) and obtaining the printing data from the PCDB 5 is added (S284, S285).

Figure 40:
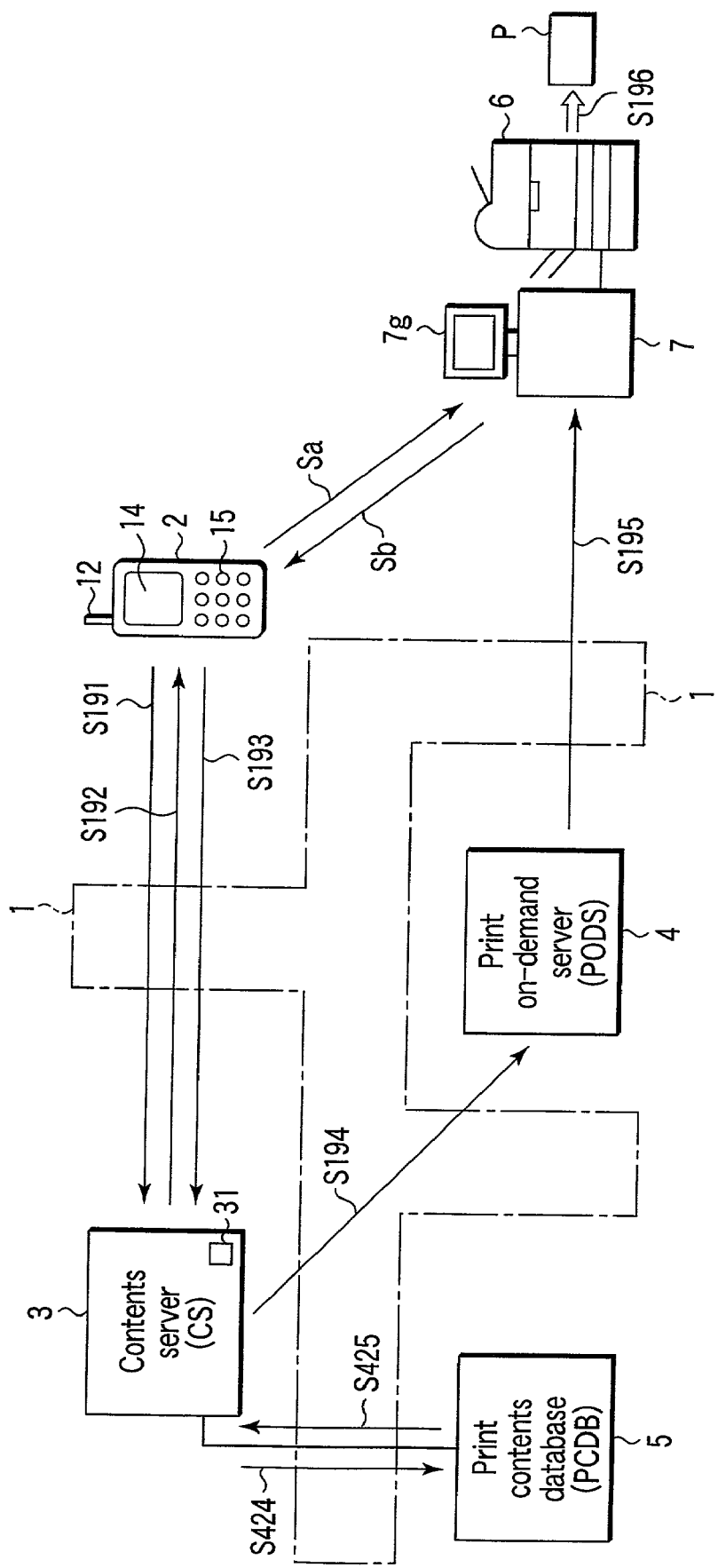
FIG. 40 is an explanatory view of the schematic constitution and the data transmission/reception state in the eighteenth embodiment.

Moreover, as shown in FIG. 40, instead of reading the printing data from the database 3*d* in the CS 3 in FIG. 32, a processing of referring to the registered place table 31 based on the selection of the map information site (S193) and obtaining the printing data from the PCDB 5 is added (S424, 425).

According to the eighteenth embodiment, there is provided the exclusive data PUSH printing type via the PODS 4.

In the processing procedure of the main part, (1) the BD 2 transmits the printing instruction to the CS 3, (2) the CS 3 acquires the printing data from the PCDB 5, (3) the CS 3 communicates with the PODS 4, or the CS 3 transmits the printing data to the PODS 4, (4) the CS 3 transmits the printing data to the PC 7, or the PODS 4 transmits the printing data to the PC 7, (5) the PC 7 allows the PD 6 to execute the printing processing, and the information is printed.

The flow of the printing data is "PCDB 5→CS 3→PC 7→PD 6, or PCDB 5→CS 3→PODS 4→PC 7→PD 6".

Therefore, the printed data is the print-only data (non-displayed data).

Moreover, the PC 7 transmits the information for specifying the PC 7 to the BD 2 before (1), or the start instruction of the printing processing is issued by the operation on the PC 7 or the transmission of the data to the PC 7 from the BD 2 before (5).

In the eighteenth embodiment, it is unnecessary to store the printing data in the BD 2, the existing BD 2 can be utilized as it is, the charging and security function, and the like of the PODS 4 can be utilized, and the print-only output result is advantageously obtained.

Moreover, when the BD requests the CS to print the data, the printing data is transmitted to the PC from the CS 3, and can be printed through the PD.

Furthermore, when the CS transmits the data to the PC, the data is subjected to the processing in the PODS. Therefore, the function realized by the PODS can be utilized.

Additionally, instead of directly transmitting the data to the PC from the CS, the CS transmits the data to the PODS, and the PODS transmits the data to the PC, so that the function realized by the PODS can be utilized.

Moreover, the CS receives the printing request from the BD, and it is then detected that the printing data cannot correctly be processed on the PC as the transmission address of the printing data (or cannot correctly be printed by the PD). In this case, the BD can be notified that it is impossible to print the data.

NINETEENTH EMBODIMENT

Figure 41:
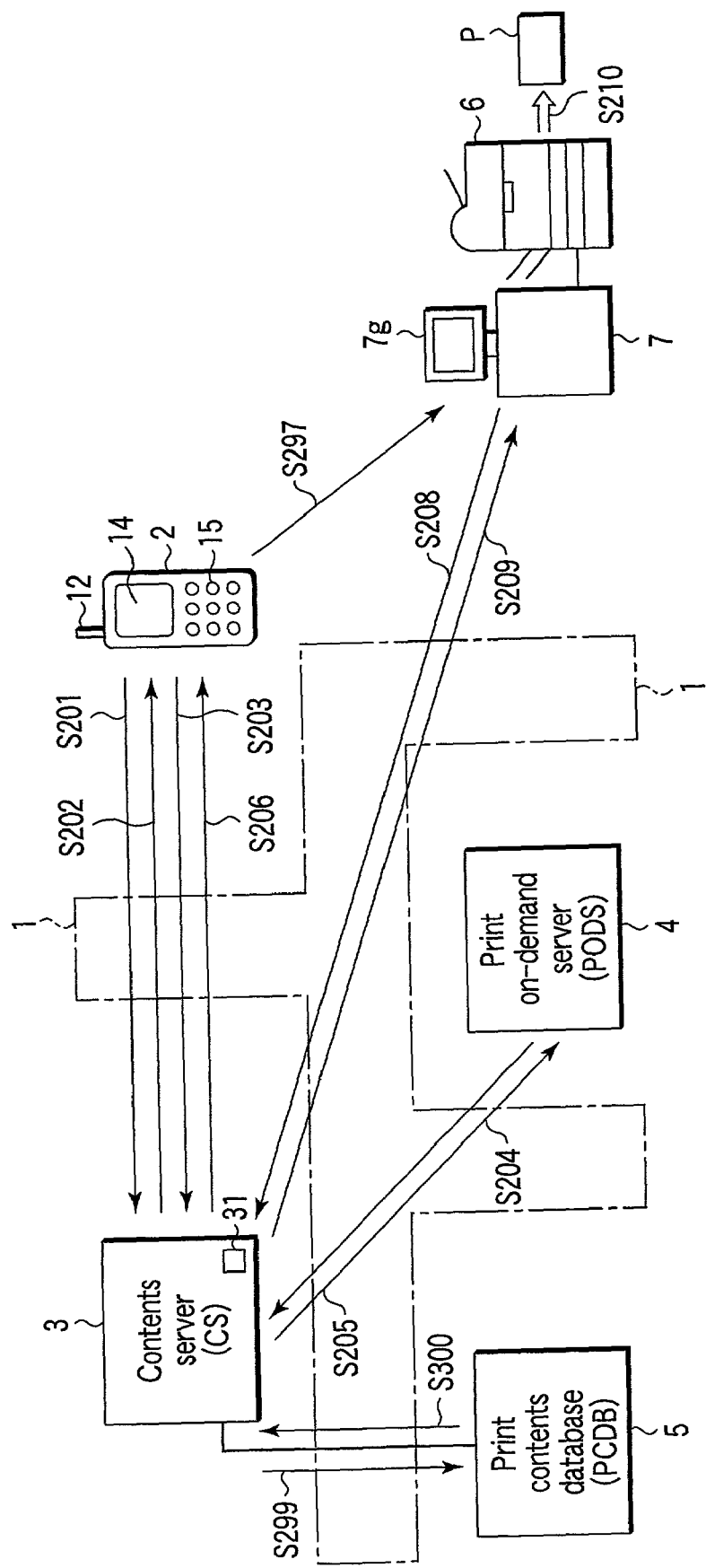
FIG. 41 is an explanatory view of the schematic constitution and the data transmission/reception state in a nineteenth embodiment.

As shown in FIG. 41, in the on-demand print system of a nineteenth embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to distribution processing/printing of the contents to be printed, the PCDB 5 for storing the printing contents (detailed printing data, print-only data) and the printer controller (PC) 7 for controlling the printer device (PD) 6 are connected via the communication network such as Internet 1. Moreover, the BD 2 is connected to the PC 7 via radio by the Bluetooth function or via the cable.

The PCDB 5 is a database for storing the printing contents (detailed printing data, print-only data), and is managed by the CS 3 in the nineteenth embodiment. Thereby, the CS 3 has the registered place table 31 in which the registered place of the printing data for each map ID in the PCDB 5 is stored.

The nineteenth embodiment is constituted by adding the PCDB 5 to the fifteenth embodiment. As shown in FIG. 41, instead of reading the printing data from the database 3d in the CS 3 in FIG. 33, a processing of referring to the registered place table 31 based on the selection of the map information site (S208) and obtaining the printing data from the PCDB 5 is added (S299, S300).

Figure 42:
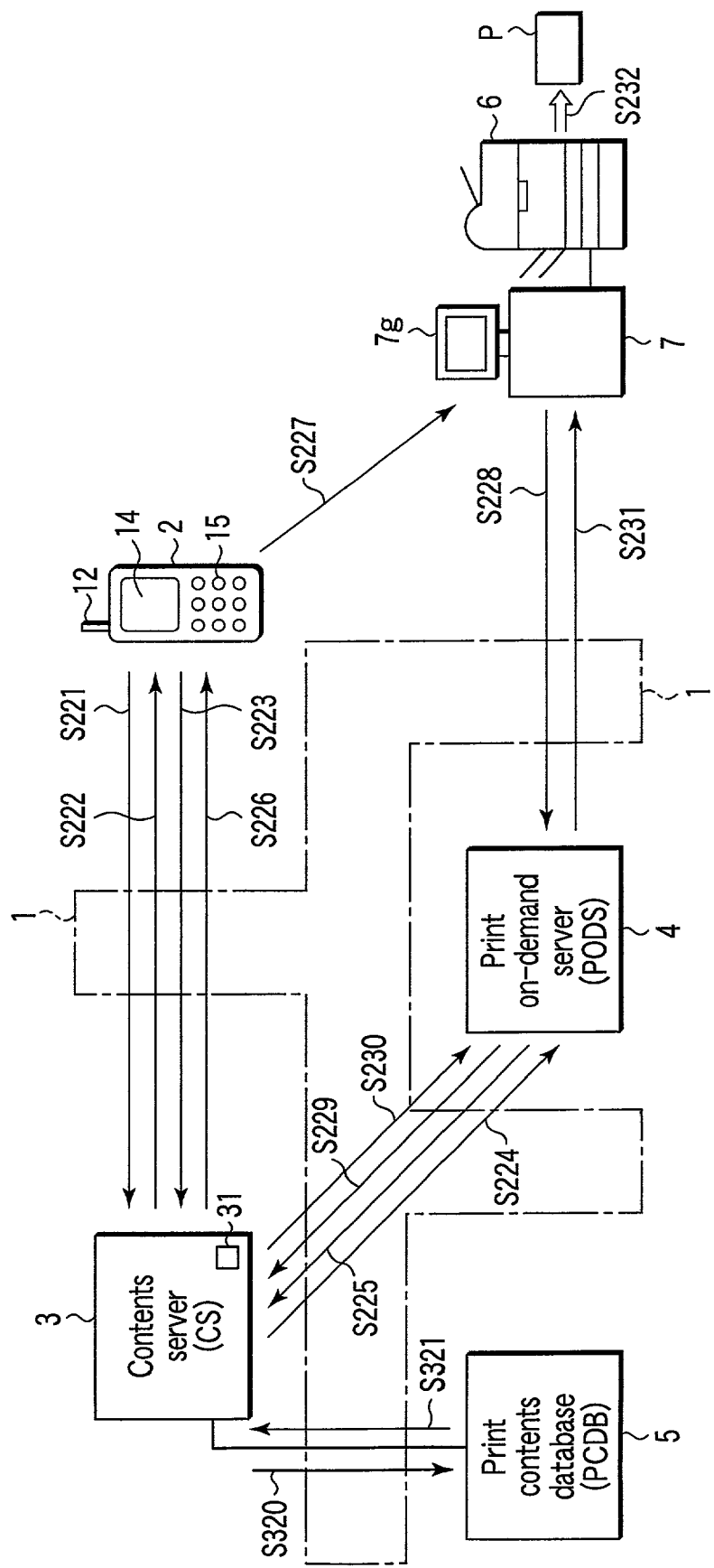
FIG. 42 is an explanatory view of the schematic constitution and the data transmission/reception state in the nineteenth embodiment.

Moreover, as shown in FIG. 42, instead of reading the printing data from the database 3d in the CS 3 in FIG. 34, a processing of referring to the registered place table 31 based on the selection of the map information site (S229) and obtaining the printing data from the PCDB 5 is added (S320, S321).

According to the nineteenth embodiment, there is provided an exclusive data PID issue type via the PODS 4.

In the processing procedure of the main part, (1) the BD 2 requests the CS 3 to print the data, (2) the PID corresponding to the printing request is issued by the PODS 4 and acquired by the CS 3, (3) the CS 3 transmits the PID to the BD 2, (4) the BD 2 transmits the PID to the PC 7, (5) the PC 7 transmits the PID received from the BD 2 to the CS 3, or the PID received from the BD 2 is transmitted to the PODS 4, (6) the CS 3 obtains the printing data from the PCDB 5, or the PCDB 5 transfers the printing data to the CS 3 in accordance with the request from the PODS 4, (7) the CS 3 communicates with the PODS 4, or the PODS 4 receives the data from the CS 3 to obtain the printing data from the CS 3, (8) the CS 3 transmits the printing data to the PC 7, or the PODS 4 transmits the printing data to the PC 7, (9) the PC 7 allows the PD 6 to execute the printing processing, and the information is printed.

The flow of PID is "PODS 4→CS 3→BD 2→PC 7→CS 3, or PODS 4→CS 3→BD 2→PC 7→PODS 4".

The flow of the printing data is "PCDB 5→CS 3→PC 7→PD 6, or PCDB 5→CS 3→PODS 4→PC 7→PD 6".

Moreover, the printed data is the print-only data (non-displayed data).

Moreover, the PODS 4, the CS 3, or the PC 7 performs the collation processing (associating) of the issued PID with the printing data. Particularly, when the PC 7 performs the processing, the printing data can precedently be distributed after issuance of the PID.

In the nineteenth embodiment, it is unnecessary to store the printing data in the BD 2, the existing BD 2 can be utilized as it is, the security function and charging can advantageously easily be realized by utilizing the PID, and the print-only output result is advantageously obtained.

Moreover, the BD obtains the printing ID (hereinafter referred to as PID) issued by the PODS via the CS, and transmits the PID to the PC. Then, the PC receives the printing data from the CS, and the data can be printed through the PD.

Furthermore, when the PC receives the data from the CS, the data is subjected to the processing in the PODS. Therefore, the function realized by the PODS can be utilized.

Additionally, instead of directly transmitting the data to the PC from the CS, the CS transmits the data to the PODS, and the PODS transmits the data to the PC, so that the function realized by the PODS can be utilized.

Moreover, the PC receives the PID from the BD, and it is subsequently detected that the printing data cannot Correctly be acquired on the PC. In this case, the BD can be notified that it is impossible to acquire the data.

TWENTIETH EMBODIMENT

Figure 43:
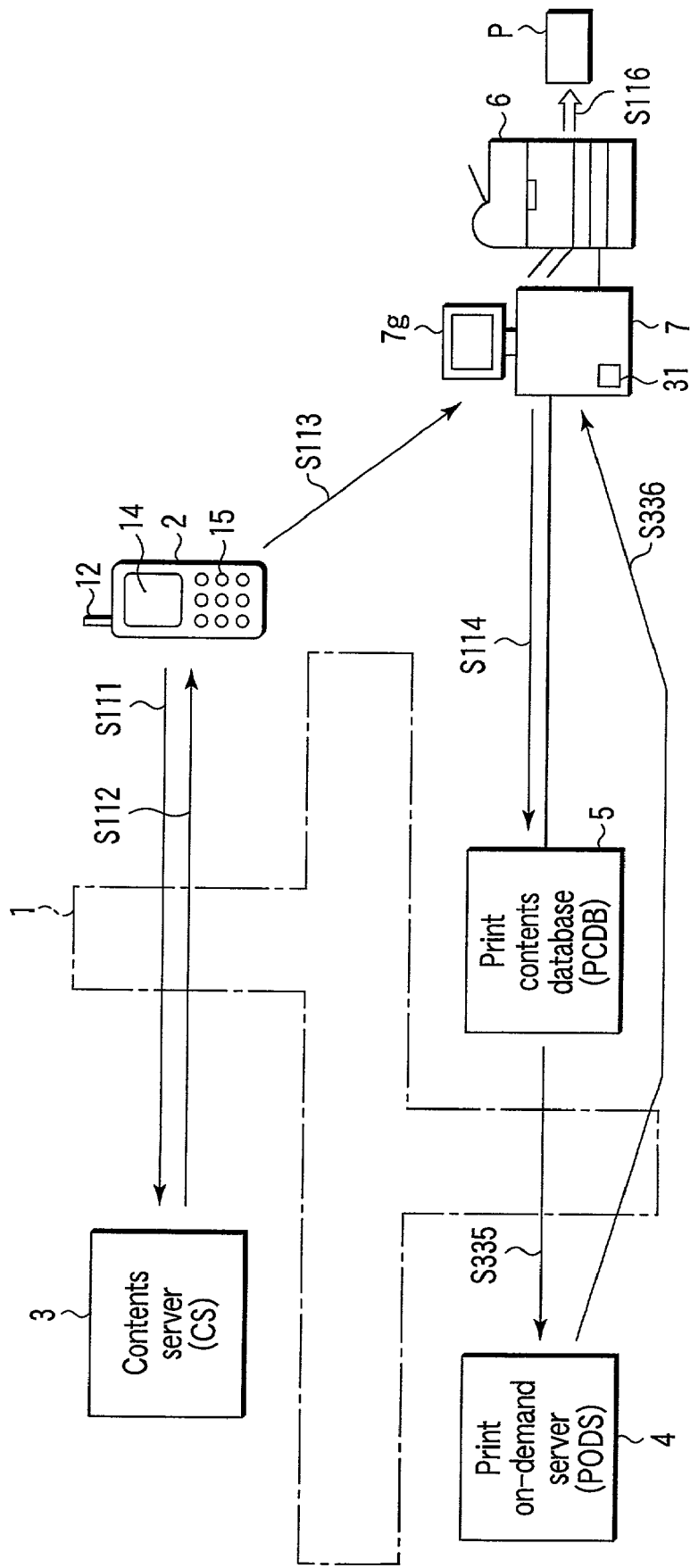
FIG. 43 is an explanatory view of the schematic constitution and the data transmission/reception state in a twentieth embodiment.

As shown in FIG. 43, in the on-demand print system of a twentieth embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to distribution processing/printing of the contents to be printed, the PCDB 5 for storing the printing contents (detailed printing data, print-only data) and the printer controller (PC) 7 for controlling the printer device (PD) 6 are connected via the communication network such as Internet 1. Moreover, the BD 2 is connected to the PC 7 via radio by the Bluetooth function or via the cable.

The PCDB 5 is a database for storing the printing contents (detailed printing data, print-only data), and is managed by the PC 7 in the twentieth embodiment. Thereby, the PC 7 has the registered place table 31.

The twentieth embodiment is constituted by adding the PODS 4 to the ninth embodiment. As shown in FIG. 43, when a processing of acquiring the printing data from the PCDB 5 in FIG. 24 is performed (S114), a processing of acquiring the printing data via the PODS 4 may be added (S335, S336).

Figure 44:
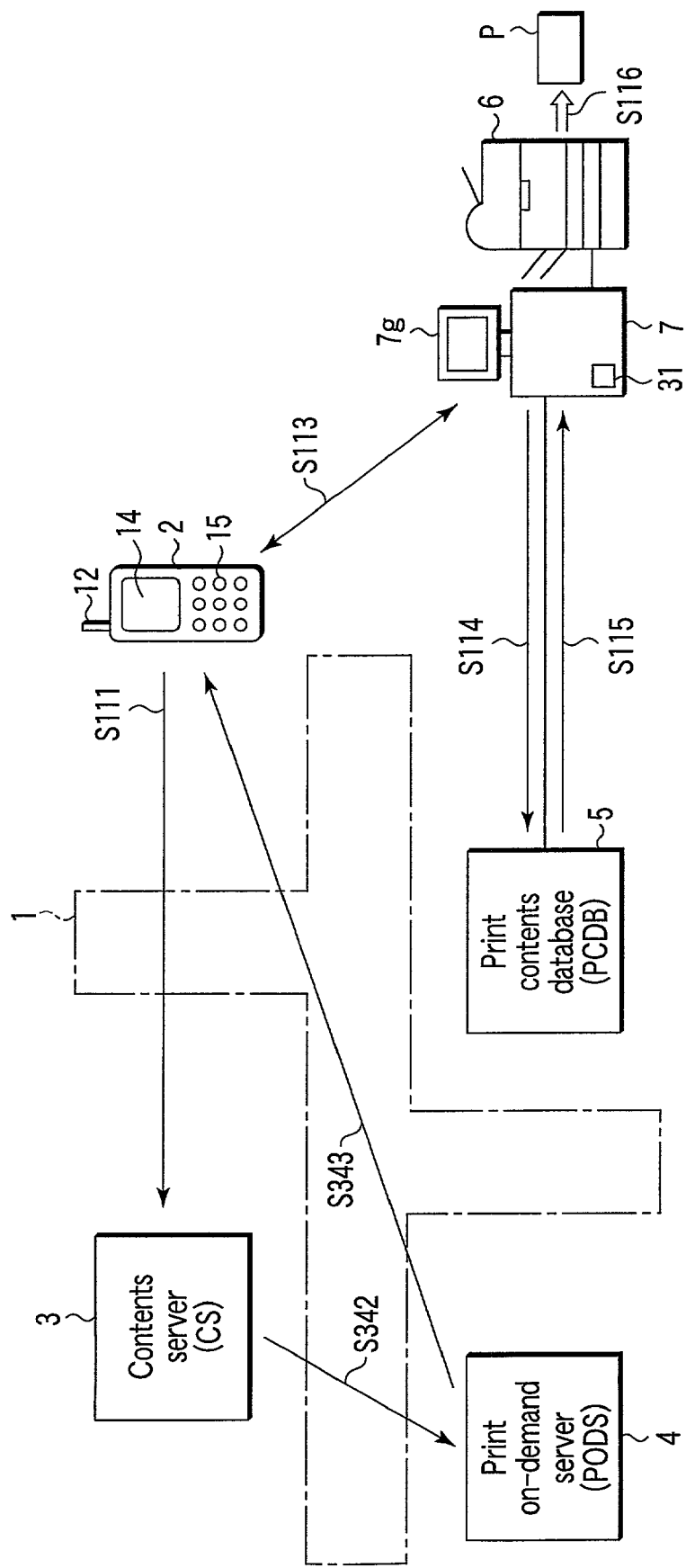
FIG. 44 is an explanatory view of the schematic constitution and the data transmission/reception state in the twentieth embodiment.

Moreover, as shown in FIG. 44, when a processing of acquiring the data from the CS 3 in FIG. 24 is performed (S111), the processing may be changed to a processing of acquiring the data via the PODS 4 (S342, S343).

Thereby, the PODS 4 integrally performs the charging, security management, user management, printing history management, and the like with respect to the distribution processing/printing of the contents to be printed.

According to the twentieth embodiment, there is provided an exclusive data PULL printing type led by the printer via the PODS 4.

In the processing procedure of the main part, (1) the BD 2 receives the information of the CS 3, or receives the information of the CS 3 via the PODS 4, (2) the BD 2 instructs the PC 7 to print the data, and informs the PC 7 of the location/address of the data to be printed, (3) the PC 7 downloads the printing data from the PCDB 5 via the PODS 4, or directly downloads the printing data from the PCDB 5, (4) the PC 7 allows the PD 6 to execute the printing processing, and the information is printed.

The flow of the printing data is "PCDB 5→PODS 4→PC 7→PD 6" or "PCDB 5→PC 7→PD 6".

Moreover, the communication of the BD 2 to PC 7 is possible both by radio and by wire (cable communication), and the printed data is the print-only data (non-displayed data).

In the twentieth embodiment, it is unnecessary to store the printing data in the BD 2, the print-only output result is obtained, and the charging and security function, and the like of the PODS 4 can advantageously be utilized.

Moreover, when the BD transmits the information (URL, and the like) for specifying the existence position of the data received by the BD to the PC, the PC acquires the data as the printing object based on the received information, and the data can be printed through the PD.

Furthermore, when the BD receives the data from the CS, the data is subjected to the processing in the PODS, and the function realized by the PODS can be utilized.

Additionally, when the PC receives the data from the PCDB, the data is subjected to the processing in the PODS, and the function realized by the PODS can be utilized.

Moreover, after the PC receives the information for specifying the existence position of the data from the BD, the PC cannot acquire the data as the printing object based on the received information. In this case, even when the connection of the BD to the PC is cut/terminated, the BD can be notified that the data cannot be acquired.

Furthermore, after receiving the information for specifying the existence position of the data from the BD, the PC immediately acquires the data as the printing object based on the received information. In this case, even when the data content is updated later, the previous information can be printed.

Additionally, after receiving the information for specifying the existence position of the data from the BD, instead of immediately obtaining the data as the printing object based on the received information, the PC acquires and prints the printing data on receiving the next printing request. Therefore, the (latest) information at the time of the printing request can be obtained as the printed matter.

Moreover, after receiving the information for specifying the existence position of the data from the BD, instead of immediately obtaining the data as the printing object based on the received information, the PC can acquire the printing data at the optimum time until the next printing request is received.

Furthermore, the data for BD display on the CS is associated beforehand with the printing data on the PCDB, and the result is managed by the PODS. In this case, the information for specifying the existence position of the BD displaying data can be converted to the information for specifying the position of the print-only data.

TWENTY-FIRST EMBODIMENT

Figure 45:
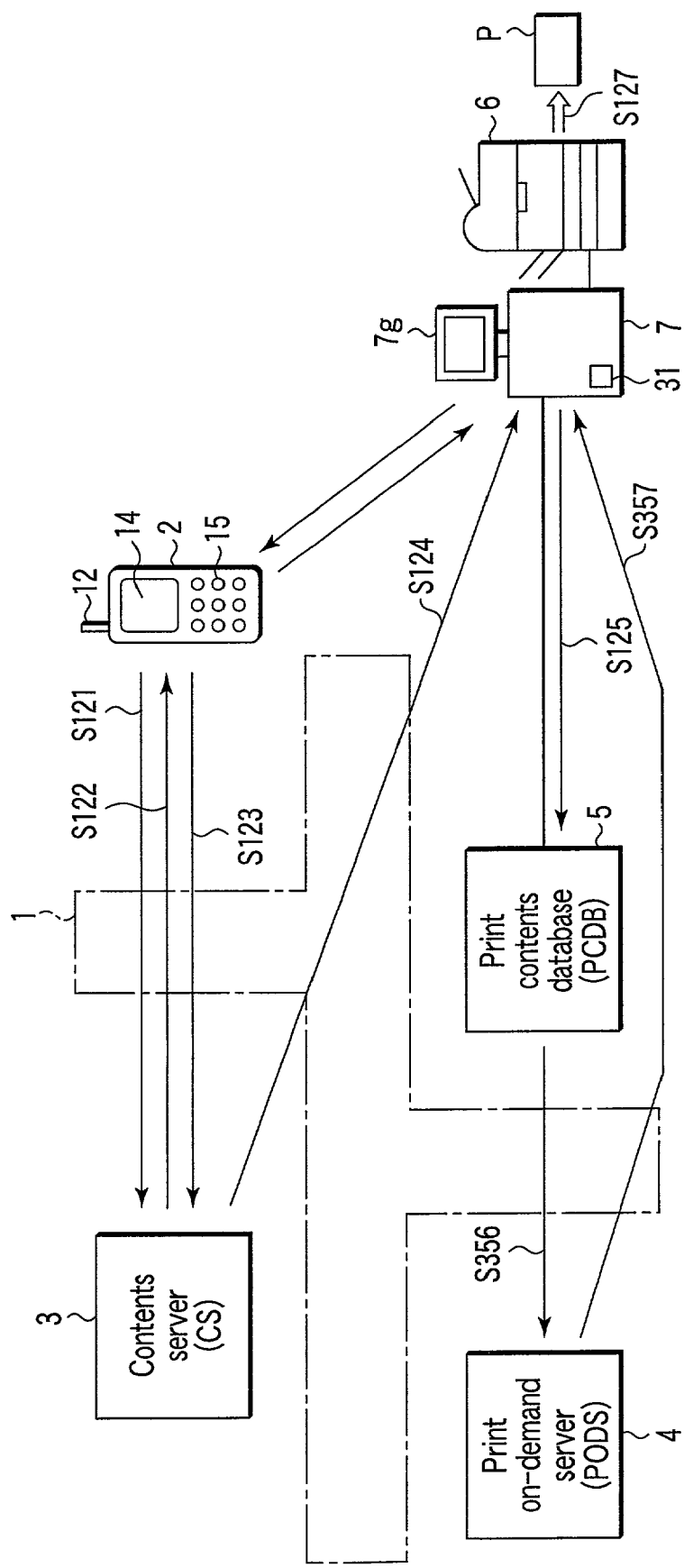
FIG. 45 is an explanatory view of the schematic constitution and the data transmission/reception state in a twenty-first embodiment.

As shown in FIG. 45, in the on-demand print system of a twenty-first embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to the distribution processing/printing of the contents to be printed, the PCDB 5 for storing the printing contents (detailed printing data, print-only data) and the printer controller (PC) 7 for controlling the printer device (PD) 6 are connected via the communication network such as Internet 1. Moreover, the BD 2 is connected to the PC 7 via radio by the Bluetooth function or via the cable.

The PCDB 5 is a database for storing the printing contents (detailed printing data, print-only data), and is managed by the PC 7 in the twenty-first embodiment. Thereby, the PC 7 has the registered place table 31.

The twenty-first embodiment is constituted by adding the PODS 4 to the tenth embodiment. As shown in FIG. 45, when the processing of acquiring the printing data from the PCDB 5 in FIG. 25 is performed (S125), the processing of acquiring the printing data via the PODS 4 may be added (S356, S357).

Moreover, as shown in FIG. 46, when a processing of transmitting the printing request and the address of the home page as the link data to the PC 7 from the CS 3 in FIG. 25 is performed (S124), the processing may be changed to a processing of transmitting the request and data via the PODS 4 (S364, S365).

Thereby, the PODS 4 integrally performs the charging, security management, user management, printing history management, and the like with respect to the distribution processing/printing of the contents to be printed.

According to the twenty-first embodiment, there is provided an exclusive data PUSH printing type lead by the printer via the PODS 4.

In the processing procedure of the main part, (1) the BD 2 transmits the printing instruction to the CS 3, (2) the CS 3 transmits the location/address of the printing data to the PC 7, or the CS 3 transmits the location/address of the printing data to the PC 7 via the PODS 4, (3) the PC 7 downloads the printing data from the PCDB 5 via the PODS 4, or directly downloads the printing data from the PCDB 5, (4) the PC 7 allows the PD 6 to execute the printing processing, and the information is printed.

The flow of the printing data is "PCDB 5→PODS 4→PC 7→PD 6 or PCDB 5→PC 7→PD 6".

The printed data is the print-only data (non-displayed data).

In some cases, the PC 7 transmits the information for specifying the PC 7 to the BD 2 before (1). In other cases, the start instruction of the printing processing is issued by the operation on the PC 7 or the transmission of the data to the PC 7 from the BD 2 before (3).

In the twenty-first embodiment, it is unnecessary to store the printing data in the BD 2, the existing BD 2 can be utilized as it is, the print-only output result is obtained, and the charging/security function, and the like of the PODS 4 can advantageously be utilized.

Moreover, when the BD requests the CS to print the data, the information (URL, and the like) for specifying the existence position of the data is transmitted to the PC from the CS, the PC receives the printing data from the PCDB based on the information, and the data can be printed through the PD.

Furthermore, when the PC receives the data from the CS, the data is subjected to the processing in the PODS, and the function realized by the PODS can be utilized.

Additionally, when the PC receives the printing data from the PCDB, the data is subjected to the processing in the PODS, and the function realized by the PODS can be utilized.

Moreover, the CS transmits the information (URL, and the like) for specifying the existence position of the data to the PC, and subsequently it is detected that the printing data on the corresponding PCDB cannot correctly be processed on the PC (or cannot correctly be printed by the PD). In this case, the BD can be notified that the data cannot be printed.

Furthermore, the BD displaying data on the CS is associated beforehand with the printing data on the PCDB, and the result is managed by the PODS. In this case, the information for specifying the existence position of the BD displaying data can be converted to the information for specifying the position of the print-only data.

TWENTY-SECOND EMBODIMENT

Figure 47:
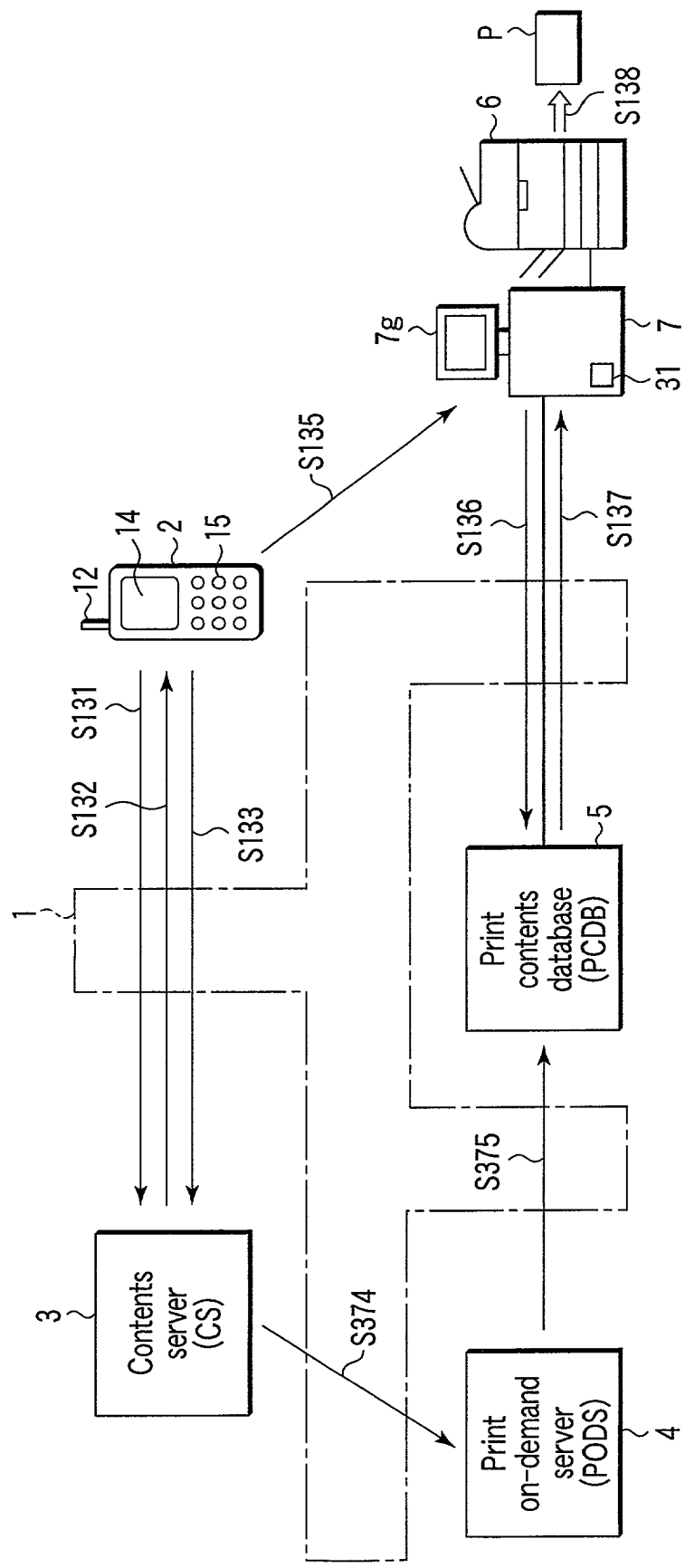
FIG. 47 is an explanatory view of the schematic constitution and the data transmission/reception state in a twenty-second embodiment.

As shown in FIG. 47, in the on-demand print system of a twenty-second embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to the distribution processing/printing of the contents to be printed, the PCDB 5 for storing the printing contents (detailed printing data, print-only data) and the printer controller (PC) 7 for controlling the printer device (PD) 6 are connected via the communication network such as Internet 1. Moreover, the BD 2 is connected to the PC 7 via radio by the Bluetooth function or via the cable.

The PCDB 5 is a database for storing the printing contents (detailed printing data, print-only data), and is managed by the PC 7 in the twenty-second embodiment. Thereby, the PC 7 has the registered place table 31.

The twenty-second embodiment is constituted by adding the PODS 4 to the eleventh embodiment. As shown in FIG. 47, when the CS 3 performs a processing of transmitting the printing request, the address of the home page, and the detailed printing data (or the simplified data in the BD 2) as the link data to the PCDB 5 from the BD 2 in FIG. 26 (S134), the processing of acquiring the printing data via the PODS 4 may be added (S374, S375).

Thereby, the PODS 4 integrally performs the charging, security management, user management, printing history management, and the like with respect to the distribution processing/printing of the contents to be printed.

According to the twenty-second embodiment, there is provided a priority distribution type via the PODS 4.

In the processing procedure of the main part, (1) the BD 2 transmits the printing instruction to the CS 3, (2) the CS 3 transmits the printing data to the PODS 4, (3) the PODS 4 transmits the printing data to the PCDB 5, (4) the BD 2 transmits the printing instruction to the PC 7, (5) the PC 7 downloads the printing data from the PCDB 5, (6) the PC 7 allows the PD 6 to execute the printing processing, and the information is printed.

The flow of the printing data is "CS 3→PODS 4→PCDB 5→PC 7→PD 6".

The printed data may be the information able to be displayed on the BD 2, the information unable to be displayed on the BD 2, and the print-only data.

For (4), the BD 2 notifies the PC 7 of the location/address of the printing data to designate the printing object, and the location/address is designated directly to the PC 7, or the location/address is selected from the content list of the PCDB 5 and designated.

In the twenty-second embodiment, it is unnecessary to accumulate the printing data in the BD 2. Since the printing data is transferred beforehand to the PCDB 5 (precedent distribution), the time for the printing processing in the PC 7 can be shortened, and the charging/security function, and the like of the PODS 4 can advantageously be utilized.

Moreover, when the BD requests the CS to print the data, the printing data or the information (URL, and the like) for specifying the existence position of the data is transmitted to the PCDB from the CS via the PODS. Thereafter, when the PC receives the printing executing request, the PC receives the printing data from the PCDB in accordance with the content of the printing executing request, and the data can be printed through the PD.

Furthermore, after the PC receives the information for specifying the existence position of the data from the BD, the PC cannot acquire the data as the printing object based on the received information. In this case, even when the connection of the BD to the PC is cut/terminated, the BD can be notified that the data cannot be acquired.

Additionally, the BD transmits the information for specifying the existence position of the data to the PC, the printing object can be designated.

Moreover, as the method of specifying the printing object on the PC, the method of directly inputting the information for specifying the printing object, or the method of selecting and designating the printing object from the list of printing objects can be used.

TWENTY-THIRD EMBODIMENT

Figure 48:
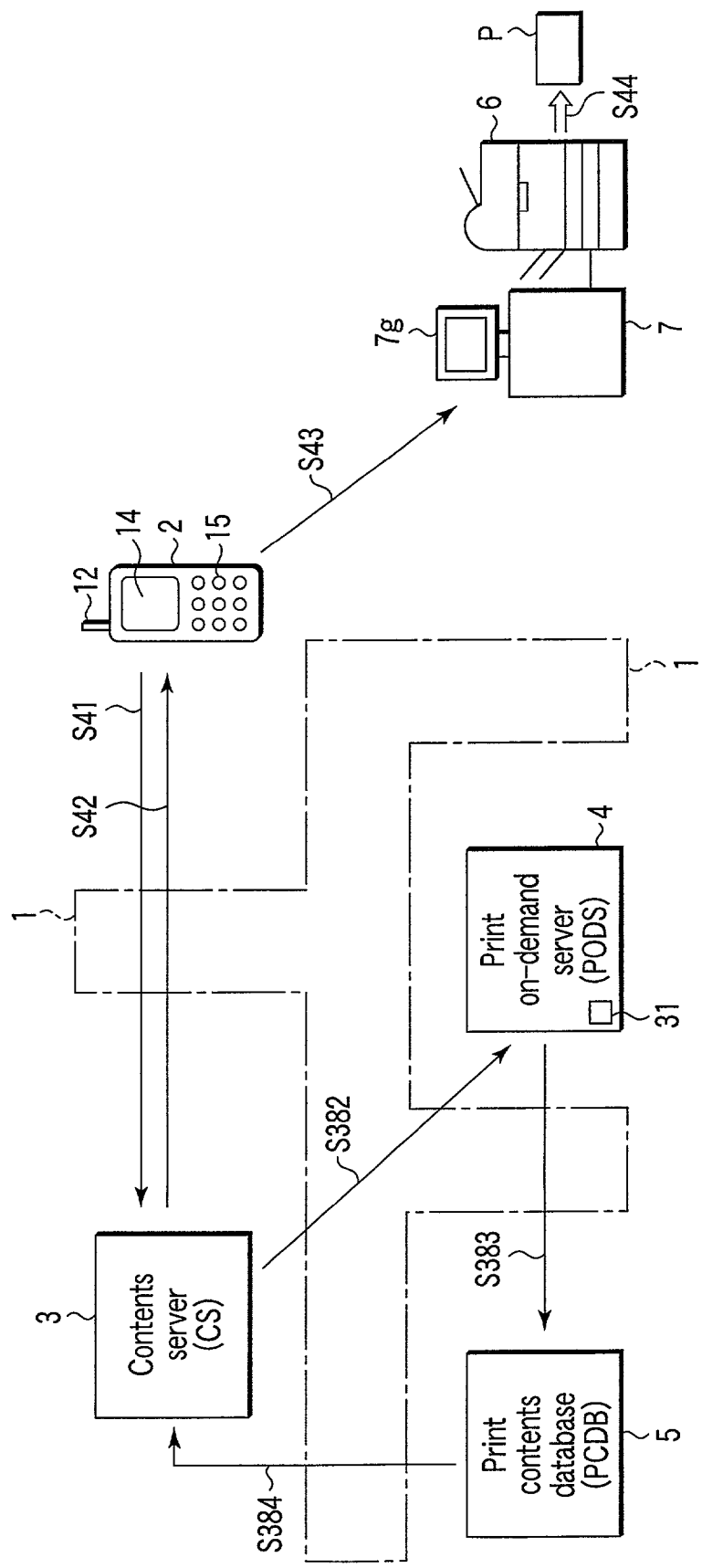
FIG. 48 is an explanatory view of the schematic constitution and the data transmission/reception state in a twenty-third embodiment.

As shown in FIG. 48, in the on-demand print system of a twenty-third embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to the distribution processing/printing of the contents to be printed, the PCDB 5 for storing the printing contents (detailed printing data, print-only data) and the printer controller (PC) 7 for controlling the printer device (PD) 6 are connected via the communication network such as Internet 1. Moreover, the BD 2 is connected to the PC 7 via radio by the Bluetooth function or via the cable.

The PCDB 5 is a database for storing the printing contents (detailed printing data, print-only data), and is managed by the PODS 4 in the twenty-third embodiment. Thereby, the PODS 4 has the registered place table 31.

The twenty-third embodiment is constituted by adding the PODS 4 and PCDB 5 to the third embodiment. As shown in FIG. 48, a processing of referring to the registered place table 31 and acquiring the printing data from the PCDB 5 via the PODS 4 based on the selection of the map information site in FIG. 16 (S41) may be added (S382, S383, S384).

Thereby, the PODS 4 integrally performs the charging, security management, user management, printing history management, and the like with respect to the distribution processing/printing of the contents to be printed.

According to the twenty-third embodiment, there is provided an exclusive data transmission/printing type led by the PODS 4.

In the processing procedure of the main part, (1) the BD 2 receives the information of the PCDB 5 via the CS 3, (2) the BD 2 instructs the PC 7 to print the data, and transfers the printing data stored in the BD 2 to the PC 7, (3) the PC 7 allows the PD 6 to execute the printing processing, and the information is printed.

The flow of the printing data is "PODS 4→PCDB 5→CS 3→BD 2→PC 7→PD 6".

Therefore, the direct communication of the BD 2 to PC 7 is possible both by radio and by wire (cable communication), and the printed data is the print-only data (non-displayed data).

In the twenty-third embodiment, the BD 2 can be utilized as one type of mobile storage, the charging/security function, and the like of the PODS 4 can be utilized, and the print-only output result is advantageously obtained.

Moreover, the BD transmits the data received from the PODS via the PCDB and CS to the PC, and the data can be printed through the PD.

Furthermore, the PC receives the printing data from the BD, the PC then judges whether the received data can be printed, and it is judged that the data cannot be printed. In this case, even when the connection of the BD to the PC is cut/terminated, the BD can be notified that the data cannot be printed.

TWENTY-FOURTH EMBODIMENT

Figure 49:
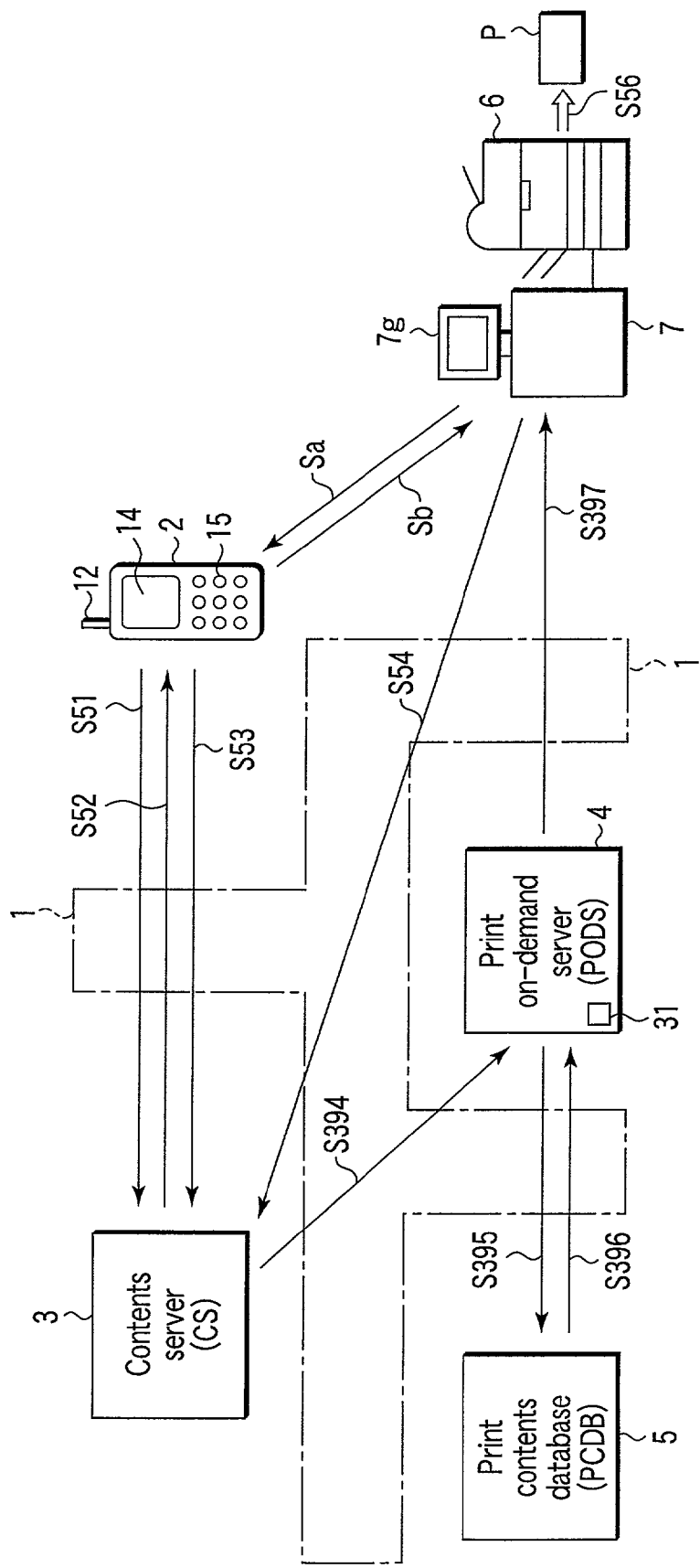
FIG. 49 is an explanatory view of the schematic constitution and the data transmission/reception state in a twenty-fourth embodiment.

As shown in FIG. 49, in the on-demand print system of a twenty-fourth embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to the distribution processing/printing of the contents to be printed, the PCDB 5 for storing the printing contents (detailed printing data, print-only data) and the printer controller (PC) 7 for controlling the printer device (PD) 6 are connected via the communication network such as Internet 1. Moreover, the BD 2 is connected to the PC 7 via radio by the Bluetooth function or via the cable.

The PCDB 5 is a database for storing the printing contents (detailed printing data, print-only data), and is managed by the PODS 4 in the twenty-fourth embodiment. Thereby, the PODS 4 has the registered place table 31.

The twenty-fourth embodiment is constituted by adding the PODS 4 and PCDB 5 to the fourth embodiment. As shown in FIG. 49, instead of reading the detailed printing data of the contents based on the data (address) of the outline map or the simplified image data from the database 3d and transmitting the data to the PC 7 from the CS 3 in FIG. 17 (S55), a processing of referring to the registered place table 31 and acquiring the printing data from the PCDB 5 via the PODS 4 may be added (S394 to S397).

Thereby, the PODS 4 integrally performs the charging, security management, user management, printing history management, and the like with respect to the distribution processing/printing of the contents to be printed.

According to the twenty-fourth embodiment, there is provided an exclusive data PULL printing type led by the PODS 4.

In the processing procedure of the main part, (1) the BD 2 receives/displays the information of the CS 3, (2) the BD 2 instructs the PC 7 to print the data, and informs the PC 7 of the location/address of the data to be printed, (3) the printing data of the PCDB 5 is transmitted to the PC 7 via the PODS 4 in accordance with the content transmitted to the CS 3 from the PC 7 based on the printing request, (4) the PC 7 allows the PD 6 to execute the printing processing, and the information is printed.

The flow of the printing data is "PCDB 5→PODS 4→PC 7→PD 6".

Moreover, the communication of the BD 2 to PC 7 is possible both by radio and by wire (cable communication), and the printed data is the print-only data (non-displayed data).

In the twenty-fourth embodiment, it is unnecessary to store the printing data in the BD 2, the charging/security function, and the like of the PODS 4 can be utilized, and the print-only output result is advantageously obtained.

Moreover, when the BD transmits the information (URL, and the like) for specifying the existence position of the data received by the BD to the PC, the PC acquires the data as the printing object based on the received information, and the data can be printed through the PD.

Furthermore, when the PC receives the printing data from the PCDB via the CS, the data is subjected to the processing in the PODS, and the function realized by the PODS can be utilized.

Additionally, after the PC receives the information for specifying the existence position of the data from the BD, the PC cannot acquire the data as the printing object based on the received information. In this case, even when the connection of the BD to the PC is cut/terminated, the BD can be notified that the data cannot be acquired.

Moreover, after receiving the information for specifying the existence position of the data from the BD, the PC immediately acquires the data as the printing object based on the received information. In this case, even when the data content is updated later, the previous information can be printed.

Furthermore, after receiving the information for specifying the existence position of the data from the BD, instead of immediately obtaining the data as the printing object based on the received information, the PC acquires and prints the printing data on receiving the next printing request. Therefore, the (latest) information at the time of the printing request can be obtained as the printed matter.

Additionally, after receiving the information for specifying the existence position of the data from the BD, instead of immediately obtaining the data as the printing object based on the received information, the PC can acquire the printing data at the optimum time until the next printing request is received.

Moreover, the BD displaying data on the CS is associated beforehand with the printing data on the PCDB, and the result is managed by the PODS. In this case, the information for specifying the existence position of the BD displaying data can be converted to the information for specifying the position of the print-only data.

TWENTY-FIFTH EMBODIMENT

As shown in FIG. 50, in the on-demand print system of a twenty-fourth embodiment, the browser device (BD) 2 as the mobile terminal on the information reception side, the contents server (CS) 3 as the information transmission apparatus on the information transmission side, the print on-demand server (PODS) 4 for integrally performing the charging, security management, user management, printing history management, and the like with respect to the distribution processing/printing of the contents to be printed, the PCDB 5 for storing the printing contents (detailed printing data, print-only data) and the printer controller (PC) 7 for controlling the printer device (PD) 6 are connected via the communication network such as Internet 1. Moreover, the BD 2 is connected to the PC 7 via radio by the Bluetooth function or via the cable.

The PCDB 5 is a database for storing the printing contents (detailed printing data, print-only data), and is managed by the PODS 4 in the twenty-fifth embodiment. Thereby, the PODS 4 has the registered place table 31.

The twenty-fifth embodiment is constituted by adding the PODS 4 and PCDB 5 to the fifth embodiment. As shown in FIG. 50, instead of reading the detailed printing data of the contents based on the data (address) of the outline map or the simplified image data from the database 3d and transmitting the data to the PC 7 from the CS 3 in FIG. 18 (S64), the processing of referring to the registered place table 31 and acquiring the printing data from the PCDB 5 via the PODS 4 may be added (S404 to S407).

Thereby, the PODS 4 integrally performs the charging, security management, user management, printing history management, and the like with respect to the distribution processing/printing of the contents to be printed.

According to the twenty-fifth embodiment, there is provided an exclusive data PUSH printing type led by the PODS 4.

In the processing procedure of the main part, (1) the BD 2 transmits the printing instruction to the CS 3, (2) the CS 3 transmits the content of the printing instruction to the PODS 4, (3) the PODS 4 acquires the printing data from the PCDB 5, and transmits the data to the PC 7, (4) the PC 7 allows the PD 6 to execute the printing processing, and the information is printed.

The flow of the printing data is "PCDB 5→PODS 4→PC 7→PD 6".

The printed data is the print-only data (non-displayed data).

In some cases, the PC 7 transmits the information for specifying the PC 7 to the BD 2 before (1).

In other cases, the start instruction of the printing processing is issued by operation on the PC 7 or transmission of the data to the PC 7 from the BD 2 before (4).

In the twenty-fifth embodiment, it is unnecessary to store the printing data in the BD 2, the existing BD 2 can be utilized as it is, the charging/security function, and the like of the PODS 4 can be utilized, and the print-only output result can advantageously be obtained.

Moreover, when the BD requests the CS to print the data, the printing data is transmitted to the PC from the PCDB via the PODS, and can be printed through the PD.

Furthermore, the CS receives the printing request from the BD, and subsequently the PODS detects that the printing data cannot correctly be processed on the PC as the transmission destination of the printing data (or the data cannot correctly be printed by the PD). In this case, the BD can be notified that it is impossible to print the data.

Figure 51:
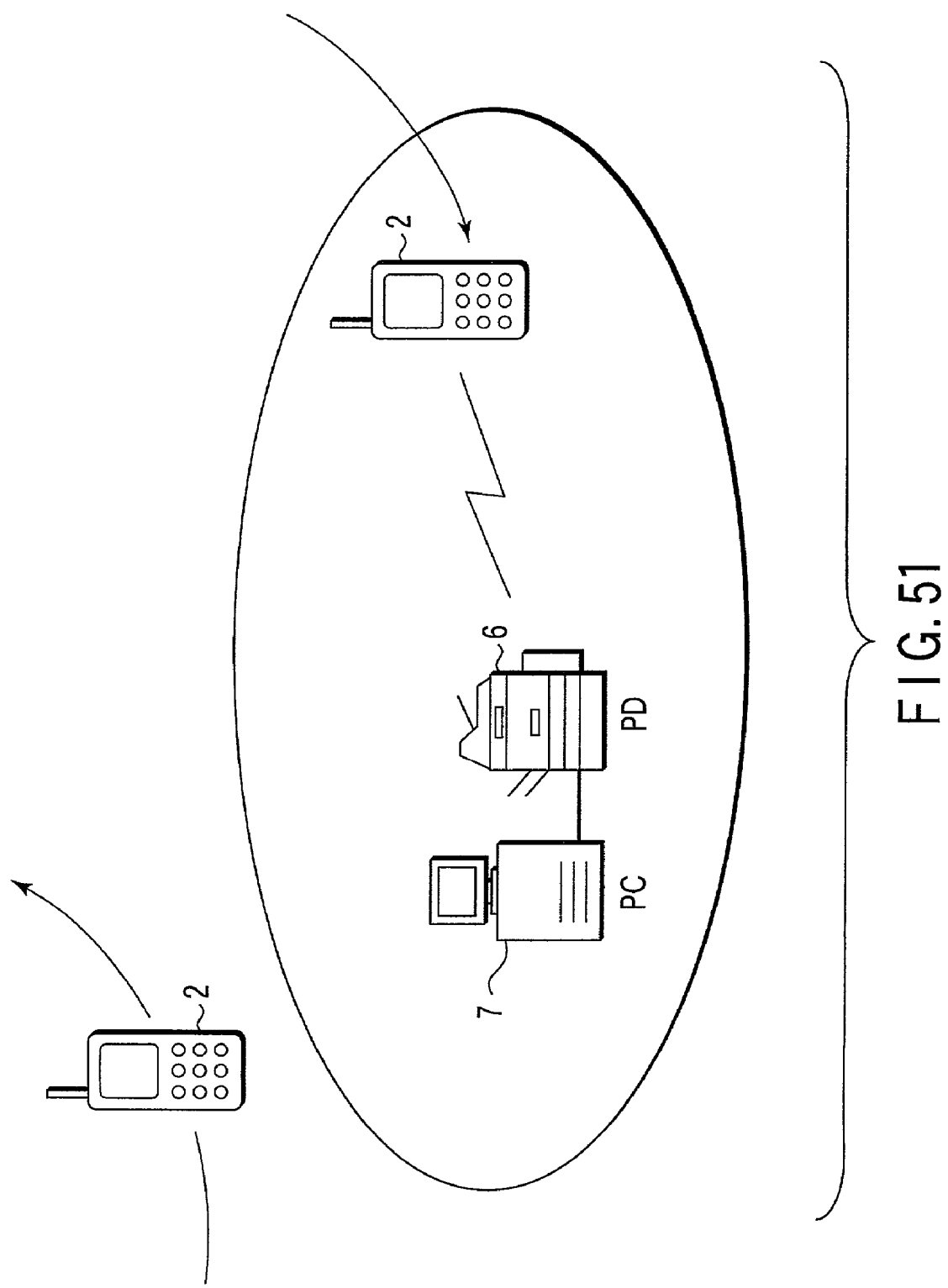
FIG. 51 is an explanatory view of an automatic processing by detection of approach of BD.

FIG. 51 shows an automatic processing by detection of approach of the BD (mobile terminal) 2.

The PC 7 or the PD 6 uses radio (Bluetooth function, and the like) to monitor a defined region around itself, detects that the BD 2 as an object exists in a range, and performs a corresponding processing. Examples of the corresponding processing include notifying the existence of the printer itself, starting the printing of the printing data requested by the BD 2, and the like.

This processing is used in the aforementioned respective embodiments.

FIG. 52 is a flowchart of the automatic processing by detection of approach, for example, by the controller 7a in the PC 7.

That is, when the BD 2 is detected in a monitor region (ST21), and a circuit with the BD 2 is connected, it is checked whether or not the BD 2 is the processing object (ST22). As a result of the check, the BD 2 is the processing object, and it is checked whether or not a notification to the BD 2 is required (ST23). When the notification is necessary as the result of the check, the notification is transmitted to the BD 2 (ST26).

On the other hand, the notification is unnecessary, or is already transmitted, and it is then checked whether or not a processing on a printer side is required (ST24). When the processing is necessary as a result of the check, the PC 7 or the PD 6 executes the processing (ST25).

Therefore, when the BD 2 enters a defined range around the PC 7, the PC 7 notifies the BD 2 that the printer can print the data. Alternatively, when there is data requested to be printed by the BD 2, the PC 7 can automatically start the printing processing (printing enable notification).

FIG. 53 shows a transmission of printer identification information to a peripheral region.

The PC 7 or the PD 6 transmits information (printer identification information) for identifying itself to the defined region around itself. The BD 2 is operated to set an acquirement processing mode of the printer identification information in a region in which the printer identification information can be acquired. The user can utilize the received printer identification information to designate the printer nearby without performing any special operation. This processing can be used in the aforementioned respective embodiments.

Therefore, when the PC 7 transmits the information for identifying itself to peripherals, and the BD 2 transmits an instruction for PUSH printing, the identification information from the PC 7 is automatically transmitted to the PUSH printing requester through the BD 2 (printer designating method during PUSH printing).

FIG. 54 shows a printing permitting method by self-proof of the PC 7.

During transmission of a request for receiving the printing data from the PC 7, information indicating that the PC 7 is for the corresponding system is simultaneously transmitted. On a printing data transmission side (CS 3, PODS 4, or PCDB 5), validity of the PC 7, adaptability to the printing data, and the like are confirmed based on self-proof information of the PC 7 Only when it is judged that the data can be printed, the printing data is transmitted to the PC 7. Thereby, a system in which the data is not utilized for a purpose other than the printing can be realized. This processing can be used in the aforementioned respective embodiments.

For example, printing permission in the CS 3 will be described.

First, when the printing request is transmitted from the PC 7 (ST31), it is checked whether or not there is self-proof information of the PC 7 (ST32). When there is the self-proof information of the PC 7 as a result of the check, it is checked whether or not self-proof of the PC 7 is proper (ST33). When the self-proof of the PC 7 is proper as a result of the check, it is check whether or not the PC 7 can print the object printing data (ST34). When the PC 7 can print the data as a result of the check, the printing data is transmitted to the PC 7 (ST35). When the respective check results are NG, the printing is not permitted (ST36).

Therefore, when the PC 7 receives the printing data, the self-proof information of the PC 7 is transmitted. When any correct self-proof information cannot be received on the printing data transmission side, the printing data is not transmitted. Therefore, the data cannot be utilized for a purpose other than the printing (application other than the printing is prohibited).

A method of specifying existence information (address) on a network from a data content are shown in (a), (b) and (c) of FIG. 55.

The method can be utilized for data having link information to another file (another data) as in an HTML file. The data on the network has mutual link information between the data present in the same server. When the link information is traced, the data can return to itself with a high possibility. This property is utilized.

The link information in the data is used to search the network (Internet 1), the same data as the original data is found, and the location can therefore be specified.

In a POD system, on the assumption that location information (address) on the network is utilized, even when correct location information can be obtained because of some trouble, the method can be adapted by analyzing the data itself.

Therefore, when the PC 7 having received the printing data itself analyzes the content of the printing data, the existence position of the printing data can be grasped (the position is specified from the data content).

Moreover, a distributing method of performing priority distribution of the printing data (selection of a distribution destination) is automatically judged in accordance with the content of the printing data, printing requester's (user's) past utilization history, properties of the printing apparatus, communication situation of the network, and the like, so that the transmission processing can be performed (priority distribution of the printing data).

Furthermore, a transmission timing for transmitting the printing data to the PC is automatically judged in accordance with the content of the printing data, printing requester's (user's) past utilization history, properties of the printing apparatus, communication situation of the network, and the like, so that the transmission processing can be performed (distribution timing of the printing data).

A printing ID may be issued/utilized which includes authentication information, charging information, and detailed setting information concerning the printing in addition to the information for specifying the printing object, which is allocated to each user or each document, and which can univocally specify the object.

Moreover, representation of the information to be printed may appropriately be changed in accordance with the content of the printing request.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A network system using a mobile terminal, comprising:
  a contents server comprising:
    a storage section to associate and store displaying simplified data with printing detailed data for each content,
    a first output section to output the simplified data for displaying contents, and a stored address of the corresponding printing detailed data to the mobile terminal having transmitted a request based on said request from the mobile terminal connected to the contents server via Internet; and
    a second output section to read the printing detailed data based on the stored address of the printing detailed data from a printing apparatus connected to the contents server via said Internet and outputting the printing detailed data to said printing apparatus;
  the mobile terminal comprising:
    a receiving section to receive the simplified data for displaying the contents supplied from the contents server via Internet and the stored address of the printing detailed data;
    a display section to display the simplified data for displaying the contents received by the receiving section,
    an instructing section to instruct the contents displayed by the display section to be printed; and
    a third output section to output a printing request of the printing detailed data and the stored address received by said receiving section in accordance with an instruction of the instructing section; and
  the printing apparatus connected to the mobile terminal by radio or via a cable, connected to the contents server via said Internet, and comprising;
    a receiving section to receive the printing request of the printing detailed data supplied from said mobile terminal and the stored address;
    a fourth output section to output the stored address received by the receiving section to the contents server via said Internet, and
    a printing section to print the detailed data supplied from said contents server via Internet in response to an output of the fourth output section.

2. A network system using a mobile terminal which is connected to a contents server and a printing apparatus via Internet and connected to the printing apparatus by radio or a cable,
  wherein said mobile terminal comprises:
    a first receiving section to receive simplified data for displaying contents supplied from said contents server;
    a display section to display the simplified data for displaying the contents received by the first receiving section;
    an instructing section to instruct the contents displayed by the display section to be printed;
    a second receiving section to receive an address of the printing apparatus in said Internet from said printing apparatus; and
    a first output section to output a printing instruction by said instructing section and the address received by said second receiving section to said contents server,
  said contents server associates and stores the displaying simplified data with printing detailed data for each content, and comprises:
    a second output section to output the simplified data for displaying the contents to the mobile terminal having transmitted a request based on said request from said mobile terminal; and
    a third output section to output the printing detailed data based on the printing instruction from said mobile terminal to the printing apparatus corresponding to said address, and
  said printing apparatus comprises:
    a fourth output section to output the address of the printing apparatus in said Internet to said mobile terminal; and
    a printing section to print the detailed data of the contents supplied from said contents server.

3. A network system using a mobile terminal which is connected to a contents server, a contents database and a printing apparatus via Internet and connected to the printing apparatus by radio or via a cable, wherein said contents server comprises:
- a first output section to request said contents database to supply detailed data for printing predetermined contents based on a request from said mobile terminal; and
- a second output section to output the printing detailed data supplied from said contents database in response to the first output section and simplified data for displaying the contents to the mobile terminal having transmitted said request based on the request from said mobile terminal, said contents database comprises:
- a storage section to store the detailed data for printing the contents; and
- a third output section to output the detailed data for printing the predetermined contents stored in said storage section to said contents server based on the request from said contents server, said mobile terminal comprises:
- a receiving section to receive the simplified data for displaying the contents supplied from said contents server and the printing detailed data;
- a display section to display the simplified data for displaying the contents received by the receiving section;
- an instructing section to instruct the contents displayed by the display section to be printed; and
- a fourth output section to output the detailed data of the contents received by said receiving section to said printing apparatus in accordance with an instruction of the instructing section, and said printing apparatus comprises:
- a printing section to print the detailed data of the contents supplied from said mobile terminal.

4. A network system using a mobile terminal which is connected to a contents server, a contents database and a printing apparatus via Internet and connected to the printing apparatus by radio or via a cable, wherein said contents server comprises:
- a first output section to output simplified data for displaying contents to the mobile terminal having transmitted a request based on said request from said mobile terminal;
- a second output section to request said contents database to supply detailed data for printing predetermined contents based on information indicating the printing detailed data from said printing apparatus; and
- a third output section to output the printing detailed data supplied from said contents database in response to the second output section to said printing apparatus having received said request, said contents database comprises:
- a storage section to store detailed data for printing the contents; and
- a fourth output section to output the detailed data for printing the predetermined contents stored in said storage section to said contents server based on the information indicating the printing detailed data from said contents server, said mobile terminal comprises:
- a receiving section to receive the simplified data for displaying the contents supplied from said contents server;
- a display section to display the simplified data for displaying the contents received by the receiving section;
- an instructing section to instruct the contents displayed by the display section to be printed; and
- a fifth output section to output information instructing printing of the contents and the information indicating the printing detailed data to said printing apparatus in accordance with an instruction of the instructing section, and said printing apparatus comprises:
- a sixth output section to output the information indicating the printing detailed data supplied from said mobile terminal to said contents server; and
- a printing section to print the detailed data of the contents supplied from said contents server in response to an output of the sixth output section.

5. A network system using a mobile terminal which is connected to a contents server, a contents database and a printing apparatus via Internet and connected to the printing apparatus by radio or via a cable, wherein said contents server comprises:
- a first output section to output simplified data for displaying contents to said mobile terminal having transmitted a request based on said request from said mobile terminal;
- a second output section to request said contents database to supply detailed data for printing predetermined contents based on a printing instruction from said mobile terminal; and
- a third output section to output the printing detailed data supplied from said contents database in response to the second output section to the printing apparatus based on information indicating the printing apparatus for printing the contents from said mobile terminal, said contents database comprises:
- a storage section to store the detailed data for printing the contents; and
- a fourth output section to output the detailed data for printing the predetermined contents stored in said storage section to said contents server based on the information indicating the printing detailed data from said contents server, said mobile terminal comprises:
- a receiving section to receive the simplified data for displaying the contents supplied from said contents server;
- a display section to display the simplified data for displaying the contents received by the receiving section;
- an instructing section to instruct the contents displayed by the display section to be printed; and
- a fifth output section to output information instructing the printing of the contents and the information indicating the printing apparatus for printing the contents to said contents server in accordance with an instruction of the instructing section, and said printing apparatus comprises:
- a printing section to print the detailed data of the contents supplied from said contents server.

6. A network system using a mobile terminal which is connected to a contents server, a contents database and a printing apparatus via Internet and connected to the printing apparatus by radio or via a cable, wherein said contents server comprises:
a first output section to output simplified data for displaying contents and information indicating printing detailed data to said mobile terminal having transmitted a request based on said request from said mobile terminal;

said contents database comprises:
a storage section to store the detailed data for printing the contents; and
a second output section to output the detailed data for printing predetermined contents stored in said storage section to said printing apparatus based on the information indicating the printing detailed data from said printing apparatus, said mobile terminal comprises:
a receiving section to receive the simplified data for displaying the contents supplied from said contents server and the information indicating the printing detailed data;
a display section to display the simplified data for displaying the contents received by the receiving section;
an instructing section to instruct the contents displayed by the display section to be printed; and
a third output section to output information instructing the printing of the contents and the information indicating the printing detailed data to said printing apparatus in accordance with an instruction of the instructing section, and said printing apparatus comprises:
a fourth output section to output the information indicating the printing detailed data supplied from said mobile terminal to said contents database; and
a printing section to print the detailed data of the contents supplied from said contents database in response to an output of the fourth output section.

7. A network system using a mobile terminal which is connected to a contents server, a contents database and a printing apparatus via Internet and connected to the printing apparatus by radio or via a cable, wherein said contents server comprises:
a first output section to output simplified data for displaying contents to said mobile terminal having transmitted a request based on said request from said mobile terminal; and
a second output section to output information indicating printing detailed data to the printing apparatus based on information indicating the printing apparatus for printing the contents from said mobile terminal based on a printing instruction from said mobile terminal, said contents database comprises:
a storage section to store the detailed data for printing the contents; and
a third output section to output the detailed data for printing predetermined contents stored in said storage section to said printing apparatus based on the information indicating the printing detailed data from said printing apparatus, said mobile terminal comprises:
a receiving section to receive the simplified data for displaying the contents supplied from said contents server;
a display section to display the simplified data for displaying the contents received by the receiving section;
an instructing section to instruct the contents displayed by the display section to be printed; and
a fourth output section to output information instructing the printing of the contents and the information indicating the printing apparatus for printing the contents to said contents server in accordance with an instruction of the instructing section, and said printing apparatus comprises:
a fifth output section to output the information indicating the printing detailed data supplied from said contents server to said contents database; and
a printing section to print the detailed data of the contents supplied from said contents database in response to an output of the fifth output section.

8. A network system using a mobile terminal which is connected to a contents server, a contents database and a printing apparatus via Internet and connected to the printing apparatus by radio or via a cable, wherein said contents server comprises:
a first output section to output simplified data for displaying contents to said mobile terminal having transmitted a request based on said request from said mobile terminal; and
a second output section to output information indicating printing detailed data and the printing detailed data to said contents database based on a printing instruction from said mobile terminal, said contents database comprises:
a storage section to associate and store the detailed data for printing various contents with the information indicating the printing detailed data; and
a processing section to associate the print detailed data supplied from said contents server with the information indicating the printing detailed data and storing the detailed data in said storage section; and
a third output section to output the detailed data for printing predetermined contents stored in said storage section to said printing apparatus based on the information indicating the printing detailed data from said printing apparatus, said mobile terminal comprises:
a receiving section to receive the simplified data for displaying the contents supplied from said contents server;
a display section to display the simplified data for displaying the contents received by the receiving section;
an instructing section to instruct the contents displayed by the display section to be printed; and
a fourth output section to output information instructing the printing of the contents and the information indicating the printing detailed data to said printing apparatus in accordance with an instruction of the instructing section, and said printing apparatus comprises:
a fifth output section to output the information indicating the printing detailed data supplied from said mobile terminal to said contents database; and
a printing section to print the detailed data of the contents supplied from said contents database in response to an output of the fifth output section.

* * * * *